(12) United States Patent
Takashima et al.

(10) Patent No.: US 8,547,341 B2
(45) Date of Patent: Oct. 1, 2013

(54) TOUCH-SENSITIVE SHEET MEMBER, INPUT DEVICE AND ELECTRONIC APPARATUS

(75) Inventors: Kouichiro Takashima, Tokyo (JP); Shun Kayama, Saitama (JP); Takashi Sawada, Kanagawa (JP); Yukiko Shimizu, Saitama (JP); Tsutomu Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1121 days.

(21) Appl. No.: 12/340,063

(22) Filed: Dec. 19, 2008

(65) Prior Publication Data

US 2009/0160813 A1 Jun. 25, 2009

(30) Foreign Application Priority Data

Dec. 21, 2007 (JP) ................................. 2007-330715

(51) Int. Cl.
*G06F 3/041* (2006.01)

(52) U.S. Cl.
USPC ........................................ 345/173; 340/407.2

(58) Field of Classification Search
None
See application file for complete search history.

(56) References Cited

U.S. PATENT DOCUMENTS

| | | | | |
|---|---|---|---|---|
| 5,104,607 A * | 4/1992 | Driska | ............................ | 264/536 |
| 6,354,839 B1 * | 3/2002 | Schmidt et al. | ................. | 434/113 |
| 7,009,595 B2 * | 3/2006 | Roberts et al. | ................. | 345/156 |
| 7,352,356 B2 * | 4/2008 | Roberts et al. | ................. | 345/156 |
| 7,863,822 B2 * | 1/2011 | Stoschek et al. | ................. | 315/77 |
| 2007/0080951 A1 | 4/2007 | Maruyama et al. | | |
| 2011/0128239 A1 * | 6/2011 | Polyakov et al. | ............. | 345/173 |

FOREIGN PATENT DOCUMENTS

| | | |
|---|---|---|
| JP | 02-230310 | 9/1990 |
| JP | 09-066476 | 3/1997 |
| JP | 10-293644 | 11/1998 |
| JP | 11-203021 | 7/1999 |
| JP | 2003-534620 | 11/2003 |
| JP | 2004-070505 | 3/2004 |
| JP | 2004-094389 | 3/2004 |
| JP | 2005-004580 | 1/2005 |
| JP | 2005-043385 | 2/2005 |
| JP | 2005-063227 | 3/2005 |
| JP | 2006-107140 | 4/2006 |
| JP | 2007-206640 | 8/2007 |
| JP | 2008-129835 | 6/2008 |
| WO | 2006/022140 | 3/2006 |

OTHER PUBLICATIONS

Japanese Patent Office, Decision of refusal issued in connection with Japanese Patent Application No. 2007-330715, dated Jul. 17, 2012. (2 pages).
Japanese Patent Office, Office Action issued in connection with Japanese Patent Application No. 2007-330715, dated Mar. 21, 2012. (5 pages).

* cited by examiner

*Primary Examiner* — Jason Olson
(74) *Attorney, Agent, or Firm* — K&L Gates LLP

(57) ABSTRACT

A touch-sensitive sheet member contains a body having predetermined hardness and a sheet shape and a sense-of-touch-representing unit that represents a sense of touch. The sense-of-touch-representing unit has a predetermined size and is arranged at positions of the body or at a predetermined position of the body. The touch-sensitive sheet member also contains a medium-supplying unit that supplies medium to the sense-of-touch-representing unit.

3 Claims, 44 Drawing Sheets

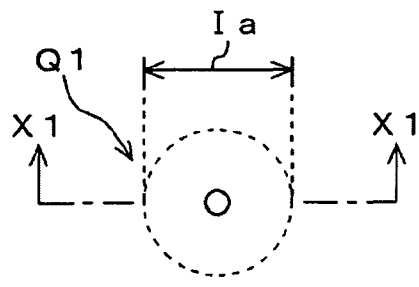
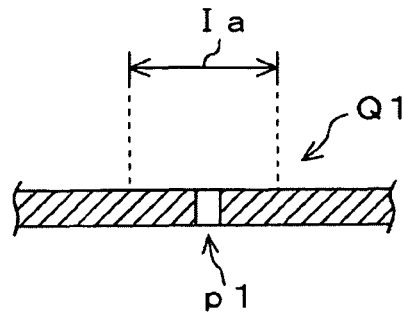
FIG. 5A          FIG. 5B
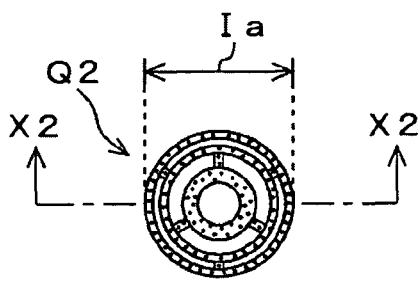
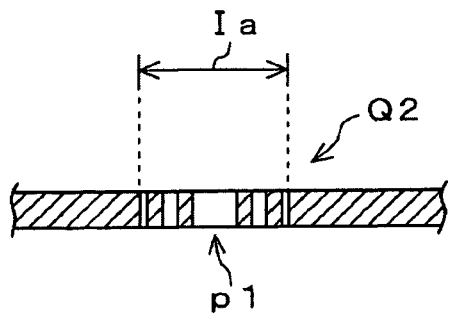
FIG. 6A          FIG. 6B
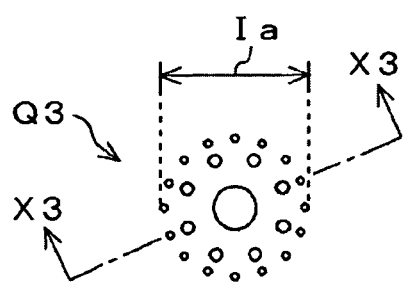
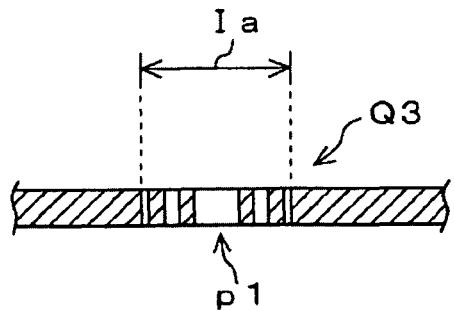
FIG. 7A          FIG. 7B

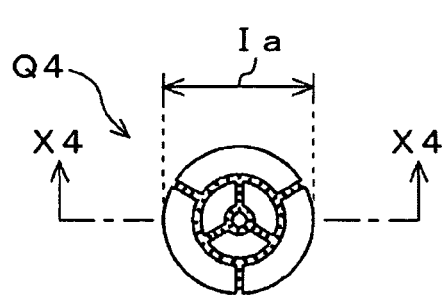 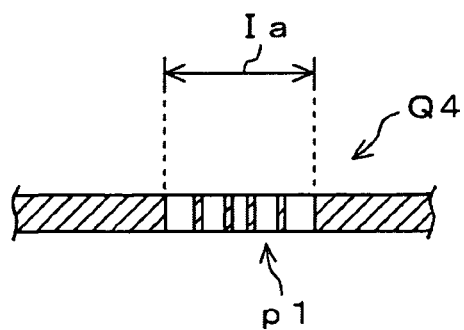
FIG. 8A  FIG. 8B
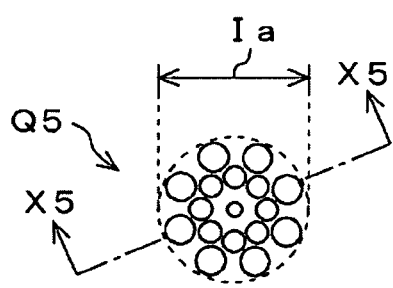 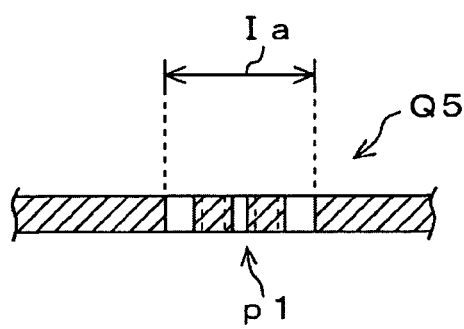
FIG. 9A  FIG. 9B
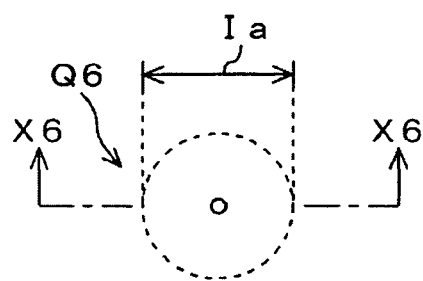 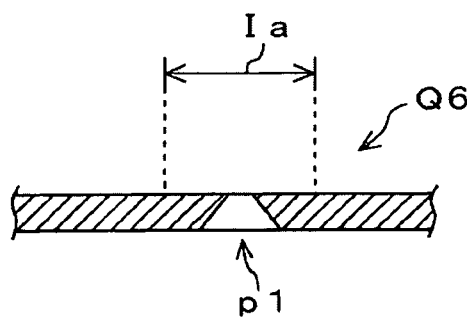
FIG. 10A  FIG. 10B

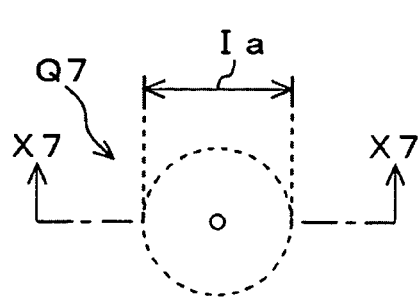 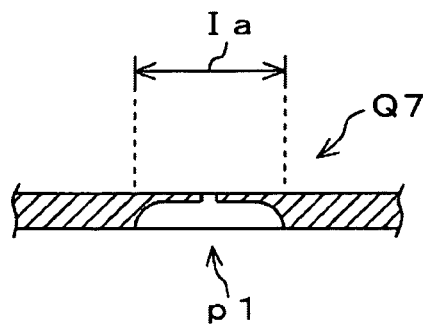
FIG. 11A  FIG. 11B
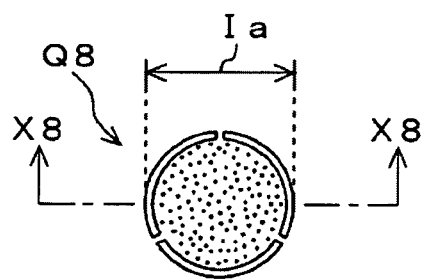 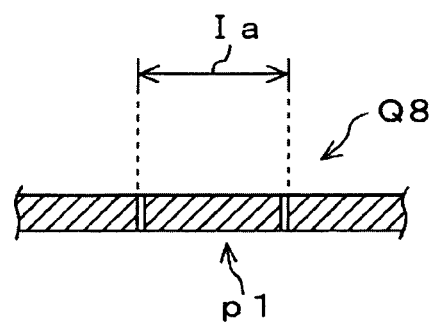
FIG. 12A  FIG. 12B
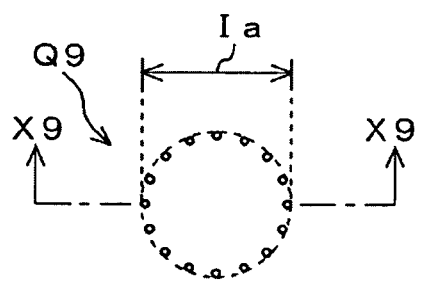 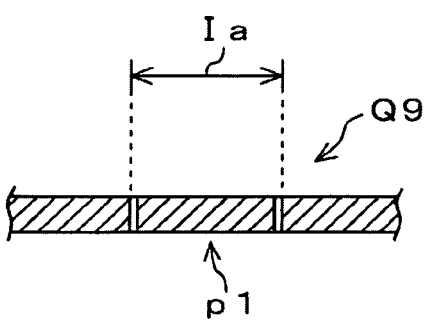
FIG. 13A  FIG. 13B

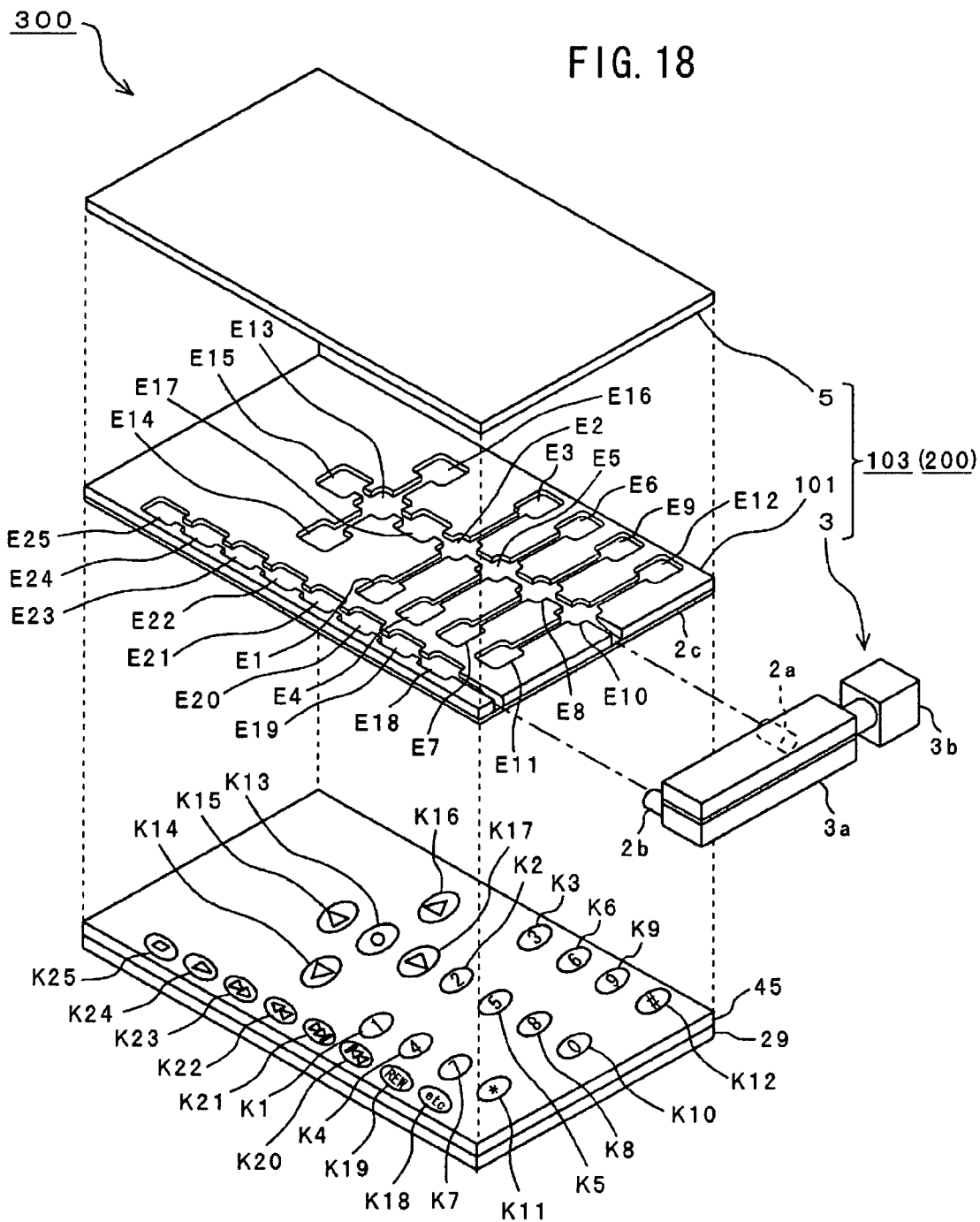

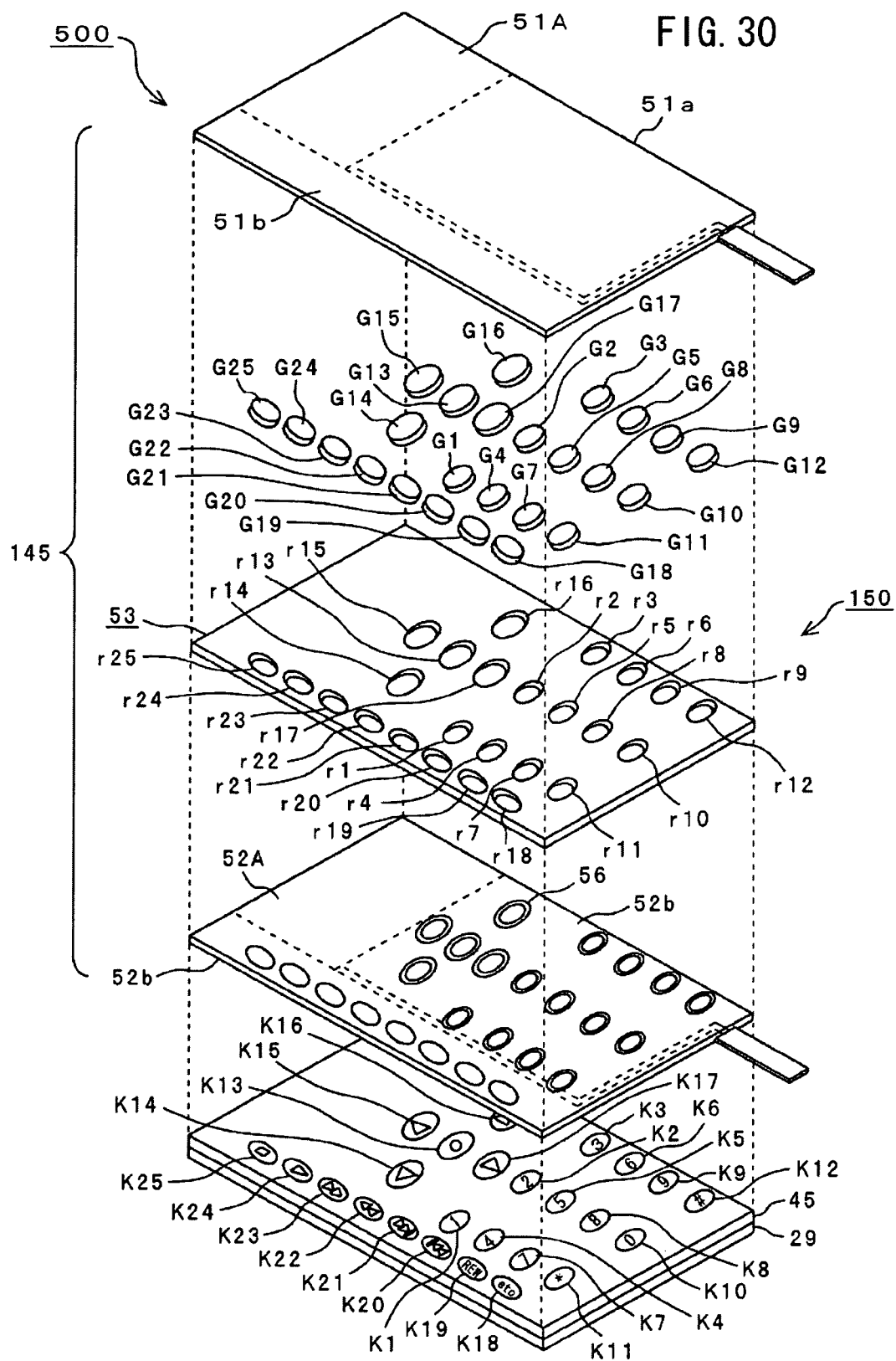

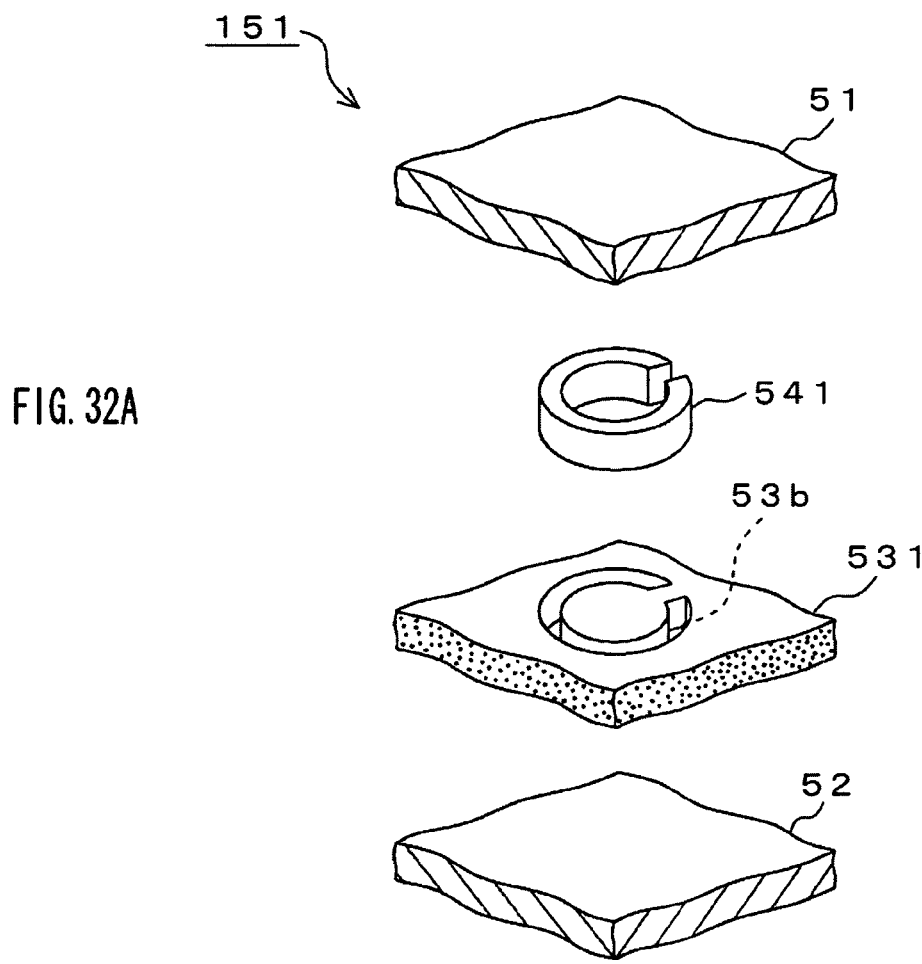
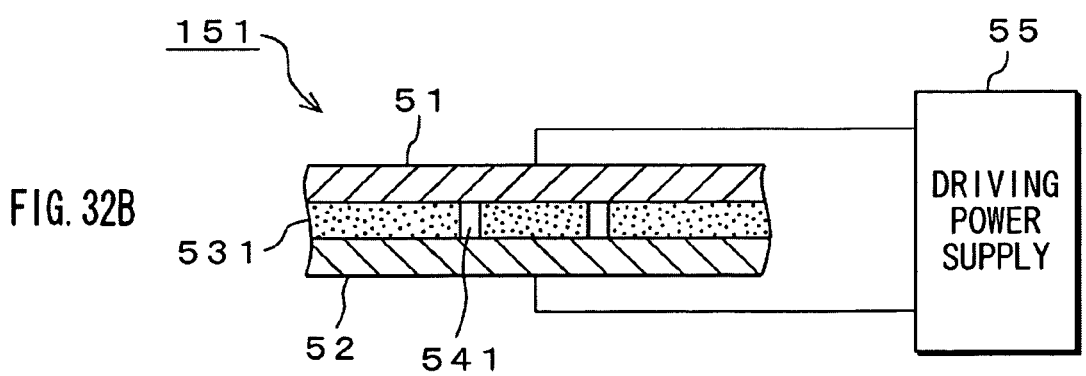
FIG. 32A
FIG. 32B

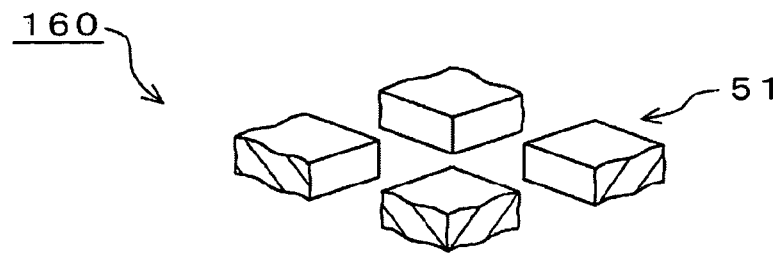
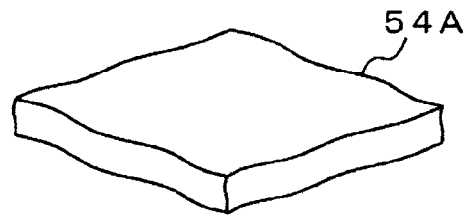
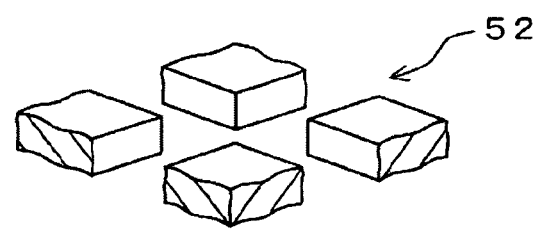
FIG. 35A
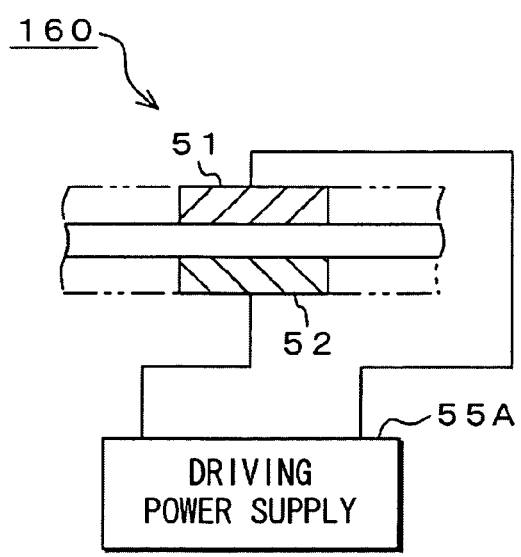
FIG. 35B
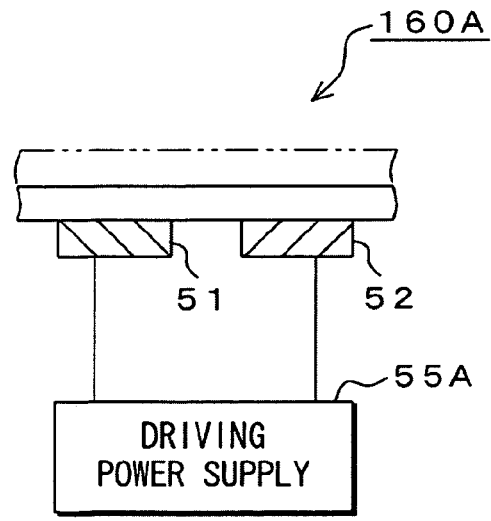
FIG. 35C

DF1 | D1 | S1 | D2 | S2 | D3 | S3 | D4 | S4 | D5 | S5 | D6 | S6 | D7 |

DF2 {
| | S1a | | S2a | | S3 | | S4 | | S5 | | S6 | |
| S1a | S2a | S3 | S4 | S5 | S6 | |
}

DF3 {
| D1 | | D2 | | D3 | | D4 | | D5 | | D6 | | D7 |
| D1 | D2 | D3 | D4 | D5 | D6 | |
} fm

TOUCH-SENSITIVE SHEET MEMBER, INPUT DEVICE AND ELECTRONIC APPARATUS

CROSS REFERENCE TO RELATED APPLICATION

The present application claims priority to Japanese Patent Application JP 2007-330715 filed in the Japanese Patent Office on Dec. 21, 2007, the entire contents of which is being incorporated herein by reference.

BACKGROUND

In resent years, a user (the operator) has often used a digital camera equipped with various kinds of operation modes to shoot a subject and has often taken various kinds of contents in a mobile phone or an information mobile terminal such as a Personal Digital Assistants (PDA) to utilize them. The digital camera, mobile terminal device and the like have their input devices. An input unit such as a key board and a JOG dial, a touch panel formed by combining a display unit, and the like has been often used for the input device. Further, an input device in which display contents are changed over when the user's finger slides on a display screen has developed.

Japanese Patent Application Publication No. H02-230310 has disclosed on page 2 and FIG. 1 thereof a menu selection device relating to a function of the above-mentioned input device. This menu selection device has an item selection means and an item input means. The item input means is provided on the item selection means, selection and input of the item are assigned to the same key, and an item display key and an item selection and input key are provided in parallel.

Japanese Patent Application Publication No. 2005-063227 has disclosed on page 8 and FIG. 15 thereof another input device. This input device has a window aperture that is provided at a predetermined position of a casing. The item selection is executed by sliding an operation button exposed from this window aperture. A predetermined region in a specified item election screen is expanded and displayed by pressing the other operation knob.

Japanese Patent Application Publication No. 2004-070505 has disclosed on page 5 and FIG. 3 thereof an input device accompanied with vibration, which is mountable on an electronic apparatus such as an air-conditioner, an audio or the like. This input device is provided with an operation member that is used concurrently as functions of a rotary switch, a push switch and a slide switch. Selection of the operation item or the input determination operation is executed by rotating, sliding or pushing down the operation member and any vibration is accompanied at a time of the input determination operation.

An input device combined with an actuator has been also developed. The actuator is made by bonding piezoelectric devices having two layers or more which have different distortion amounts or by bonding a piezoelectric device and a non-piezoelectric device. When a vibration control voltage is applied to the bonded piezoelectric devices and the like, the actuator dynamically utilizes bending deformation of the bonded piezoelectric devices and the like, which occurs based on any difference in the distortion amounts between them (vibration body function thereof).

Japanese Patent Application Publication No. 2004-094389 has disclosed on page 9 and FIG. 4 thereof an input-output device and an electronic apparatus, which are provided with such a piezoelectric actuator. This electronic apparatus is provided with an input-output device including a multi-layer piezoelectric actuator of bi-morph type and a touch panel, and this piezoelectric actuator feeds back different senses of touch corresponding to kinds of information through the touch panel to the user. The input-output device has a piezoelectric-member-supporting structure in which a piezoelectric actuator is mounted on the support frame through a support portion. The support portion is bonded on a center upper portion of the piezoelectric actuator and/or this support portion is attached to the touch panel. Supplying a vibration control voltage to the piezoelectric actuator allows a vibration to be transmitted to the touch panel.

The electronic apparatuses disclosed in Japanese Patent Application Publication No. H02-230310 mounts an input device with the touch input function in which the touch panel and the display unit are combined, but when an icon is selected on the display unit, the sense of touch synchronized with the selection thereof is not given to the operator.

Also, the input devices disclosed in Japanese Patent Application Publications Nos. 2005-063227 and 2004-070505 give a key operation feeling to an operator based on a sense of touch that a finger of the operator feels when a dome-shaped switch is pushed down. However, the sense of touch that the finger of the operator feels is given by only a uniform vibration or a force change mainly within a contact surface of the finger and an input surface.

The input device disclosed in Japanese Patent Application Publication No. 2004-094389 introduces a plurality of piezoelectric actuators with respect to improvement of input operability using the touch-sensitive device to reinforce the representation based on the sense of touch. However, an effective contact area of an operator's finger and an input surface for receiving vibration is small with respect to a size (outside one) of each of the piezoelectric actuators. It is difficult to represent a great variety of force changes in the input surface thereof.

It is desirable to provide a touch-sensitive sheet member, an input device and an electronic apparatus in which concave shapes or convex shapes for representing sense of touch are built at predetermined positions by devising a structure and a function of an touch sheet member and by which it is possible to improve operability in the touch sheet or compatibility in the nonskid sheet.

SUMMARY

The present application relates to a touch-sensitive sheet member and an input device using the same, which are applicable to an electronic apparatus such as a digital camera, a video camera, a mobile phone, a mobile terminal device, a desk-top type personal computer (hereinafter referred to as PC), a note type PC, and a braille block apparatus including a touch-sensitive input function for presenting a sense of touch when touching an icon screen with an operator's finger or the like.

According to an embodiment, there is provided a touch-sensitive sheet member including a body having predetermined hardness and a sheet shape and a sense-of-touch-representing unit that represents a sense of touch. The sense-of-touch-representing unit has a predetermined size and is arranged at positions of the body or at a predetermined position of the body. The touch-sensitive sheet member also includes a medium-supplying unit that supplies medium to the sense-of-touch-representing unit.

According to the embodiment of the touch-sensitive sheet member, the medium-supplying unit supplies the medium to the sense-of-touch-representing unit that represents the sense of touch, which has a predetermined size and is arranged at positions of the body or at a predetermined position of the body. For example, the air-circulating unit constituting the medium-supplying unit sends air to the aperture of the body or takes in air from the aperture of the body.

Consequently, the sense-of-touch-representing unit comes to give the concave and convex feeling to the operation body by air blown out of the aperture and by air flowed into the aperture at positions of the body or at a predetermined position of the body. In this manner, even if the member surface is observed to be a flat shape, when the member surface is touched actually with a hand or a finger and a slide is executed from the body to the sense-of-touch-representing unit, it is possible to represent the sense of touch which gives the concave and convex touch feeling to the operation body at positions of the body or at a predetermined position of the body. Thus, the embodiment of the touch-sensitive sheet member may be applied to a programmable nonskid sheet at a grip portion of various kinds of electronic apparatus housings or the programmable touch-sensitive input sheet or the like for icon touch in the input device.

According to another embodiment, there is provided an input device that inputs information by any one of a slide operation and a press operation of an operation body. The input device contains a display unit having an operation surface, a detection unit that detects any one of a slide position and a press position of the operation body, the detection unit being provided at the display unit having the operation surface, and a transparent touch-sensitive sheet member on which any one of slide operation along the operation surface of the display unit and the press operation to the operation surface of the display unit is executed, the touch-sensitive sheet member covering at least a portion of the detection unit. This touch-sensitive sheet member includes a body having predetermined hardness and a sheet shape, a sense-of-touch-representing unit that represents a sense of touch, the sense-of-touch-representing unit having a predetermined size and being arranged at positions of the body or at a predetermined position of the body, and a medium-supplying unit that supplies medium to the sense-of-touch-representing unit.

The embodiment of the input device is provided with the embodiment of the touch-sensitive sheet member. Even if the display surface is observed to be a flat shape, when the icon image or the like displayed on the display unit is touched with a hand or a finger and a slide is executed from the body to the sense-of-touch-representing unit, it is possible to represent the input operation accompanied with the concave and convex feeling. This enables the input device with the programmable touch-sensitive input sheet for icon touch to be provided.

According to a further embodiment, there is provided an electronic apparatus containing a housing and an input device that inputs information by any one of a slide operation and a press operation of an operation body. The input device is provided at the housing. The input device contains a display unit having an operation surface, a detection unit that detects any one of a slide position and a press position of the operation body, the detection unit being provided at the display unit, and a transparent touch-sensitive sheet member on which any one of slide operation along the operation surface of the display unit and the press operation to the operation surface of the display unit is executed, the touch-sensitive sheet member covering at least a portion of the detection unit. The touch-sensitive sheet member includes a body having predetermined hardness and a sheet shape, a sense-of-touch-representing unit that represents a sense of touch, the sense-of-touch-representing unit having a predetermined size and being arranged at positions of the body or at a predetermined position of the body, and a medium-supplying unit that supplies medium to the sense-of-touch-representing unit.

The embodiment of the electronic apparatus is provided with the embodiment of the input device, so that it is possible to provide the electronic apparatus with the programmable touch-sensitive input sheet for icon touch linked with the display contents.

Moreover, it is possible to improve miniaturization and operability of the input device, thereby enabling the reductions of the miss-operation, the cost down and the simplification of the manufacturing process of the electronic apparatus to be realized.

Additional features and advantages are described herein, and will be apparent from the following Detailed Description and the figures.

BRIEF DESCRIPTION OF THE FIGURES

FIG. 5A is a plan view of a flow-out port and FIG. 5B is a cross-sectional view thereof taken along an arrow of X1-X1 shown in FIG. 5A;

FIG. 6A is a plan view of a flow-out port showing a modification example (No. 1) thereof and FIG. 6B is a cross-sectional view thereof taken along an arrow of X2-X2 shown in FIG. 6A;

FIG. 7A is a plan view of a flow-out port showing a modification example (No. 2) thereof and FIG. 7B is a cross-sectional view thereof taken along an arrow of X3-X3 shown in FIG. 7A;

FIG. 8A is a plan view of a flow-out port showing a modification example (No. 3) thereof and FIG. 8B is a cross-sectional view thereof taken along an arrow of X4-X4 shown in FIG. 8A;

FIG. 9A is a plan view of a flow-out port showing a modification example (No. 4) thereof and FIG. 9B is a cross-sectional view thereof taken along an arrow of X5-X5 shown in FIG. 9A;

FIG. 10A is a plan view of a flow-out port showing a modification example (No. 5) thereof and FIG. 10B is a cross-sectional view thereof taken along an arrow of X6-X6 shown in FIG. 10A;

FIG. 11A is a plan view of a flow-out port showing a modification example (No. 6) thereof and FIG. 11B is a cross-sectional view thereof taken along an arrow of X7-X7 shown in FIG. 11A;

FIG. 12A is a plan view of a flow-out port showing a modification example (No. 7) thereof and FIG. 12B is a cross-sectional view thereof taken along an arrow of X8-X8 shown in FIG. 12A;

FIG. 13A is a plan view of a flow-out port showing a modification example (No. 8) thereof and FIG. 13B is a cross-sectional view thereof taken along an arrow of X9-X9 shown in FIG. 13A;

FIG. 18 is an exploded perspective view of an input device 300 as a third, to which the touch-sensitive sheet member 200 is applied, for showing a configuration of the input device 300;

FIG. 30 is an exploded perspective view of an input device 500, to which the touch-sensitive sheet member 150 is applied, for showing a configuration of the input device 500;

FIG. 32A is an exploded perspective view of a touch-sensitive sheet member 151 that is applicable to the input device 500 for showing a configuration thereof and FIG. 32B is a diagram showing the driving example thereof;

FIG. 35A is an exploded perspective view of a touch-sensitive sheet member 160 as a sixth embodiment for showing a configuration thereof and FIGS. 35B and 35C are diagrams showing the driving examples thereof;

DETAILED DESCRIPTION

The following will describe embodiments of a touch-sensitive sheet member, an input device and an electronic apparatus with reference to drawings.

Embodiment 1

Figure 1:
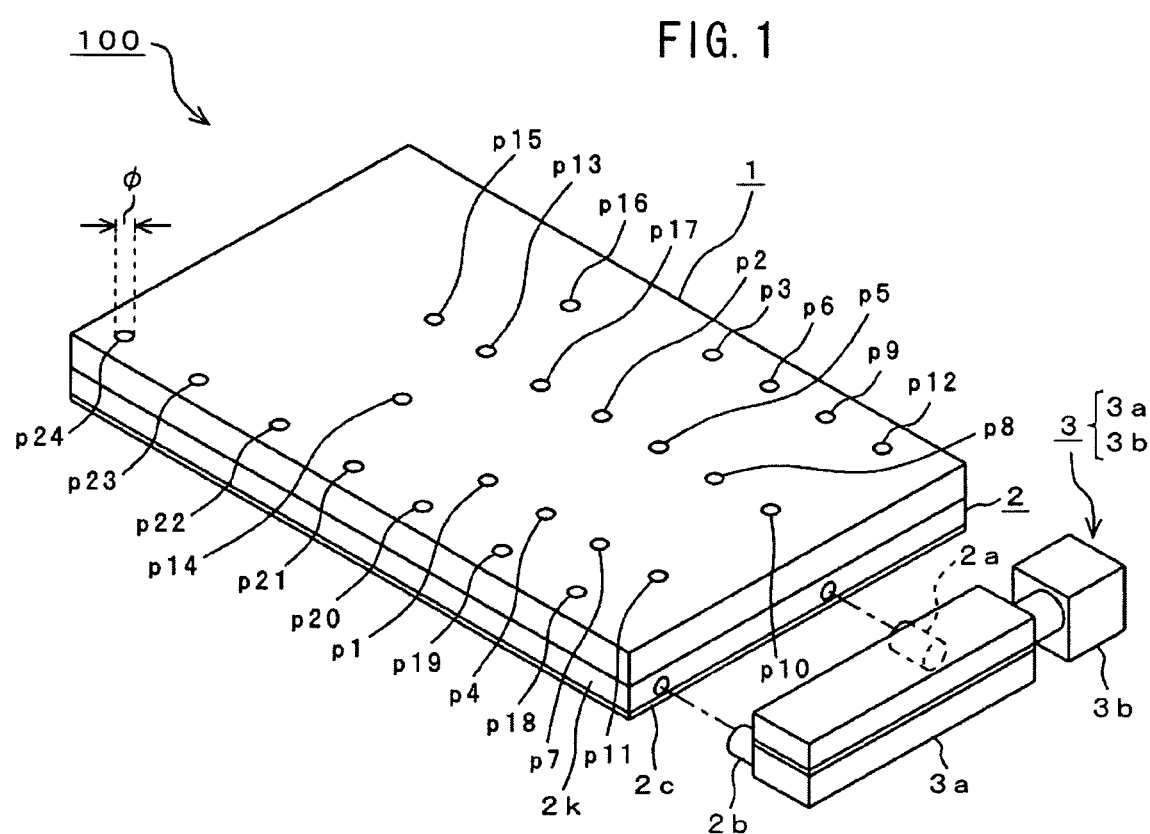
FIG. 1 is a perspective view of a touch-sensitive sheet member 100 as a first embodiment for showing a configuration thereof.

FIG. 1 shows a configuration of a touch-sensitive sheet member 100 as a first embodiment. The touch-sensitive sheet member 100 shown in FIG. 1 is applicable to an electronic apparatus such as a digital camera, a video camera, a mobile phone, a mobile terminal device, a desk-top type PC, a note type PC, an automatic teller machine, and a braille block apparatus. The touch-sensitive sheet member 100 includes a base member 1, a flow channel panel 2 and an air-circulation unit 3. The base member 1 constitutes a body and has a sheet shape and predetermined hardness. For the base member 1, for example, a transparent and soft silicon rubber member having hardness 20° to 40° is used.

In spots or predetermined positions of base member 1, apertures pi (i=1 to 24) for representing a sense of touch are arranged. The apertures p1 to p24 constitute a sense-of-touch-representing unit and have predetermined size(s). In this embodiment, the plural apertures p1 to p24 each having an aperture diameter $\phi$ of a predetermined size are perforated in the predetermined positions of the base member 1, which constitute the sense-of-touch-representing unit that represents a sense of touch. The apertures p1 to p12, for example, are arranged like an array pattern in a lower region of a surface of the base member 1, the apertures p13 to p17 are arranged like a cross pattern in an upper region of the surface thereof and the apertures p18 to p24 are aligned along the right end side.

The flow channel panel 2 is provided in the downward of the base member 1 and introduces air to a plurality of the apertures p1 to p17 and/or p18 to p24 which are perforated in the base member 1. The flow channel panel 2 contains a substrate 2c and a panel body 2k having flow channels 2a and 2c. The flow channel 2a communicates to the apertures p1 to p12 which are arranged like an array pattern in a lower region of a surface of the base member 1 and the apertures p13 to p17 which are arranged like a cross pattern in an upper region of the surface thereof. The flow channel 2b communicates to the apertures p18 to p24 which are aligned along the right end side thereof (referred to as FIG. 4). The substrate 2c is provided in the downward of the flow channel panel 2, but this substrate 2c may be omitted if sufficient strength of a bottom portion of the panel body 2k can be secured.

An air-circulation unit 3 constituting a medium-supplying unit is connected to the flow channel panel 2 and the air-circulation unit 3 sends air to the apertures p1 to p17 and/or p18 to p24 or takes in air from the apertures p1 to p17 and/or p18 to p24. The air-circulation unit 3 includes a flow channel changeover unit 3a and a blower 3b. The air-circulation unit 3 has a programmable function for sending air to the apertures for every group such as the group of apertures p1 to p17 and the group of apertures p18 to p24 which are perforated in the base member 1 or for taking in air from the apertures for every group such as the group of apertures p1 to p17 and the group of apertures p18 to p24. The air-circulation unit 3 may send air to the apertures p1 to p24 individually or may take in air from the apertures p1 to p24 individually.

In the embodiment, the apertures p1 to p12 which are arranged like an array pattern in the lower region of the surface of the base member 1 and the apertures p13 to p17 which are arranged like a cross pattern in the upper region of the surface thereof are treated as a first group, to which the air is sent. The apertures p18 to p24 which are aligned along the right end side are treated as a second group.

The flow channel changeover unit 3a is connected to the flow channel panel 2 and changes over the flow channels 2a, 2b which communicate to the apertures p1 to p17 of the first group and the apertures p18 to p24 of the second group, which are mentioned above, corresponding to another function. As a drive-power of the changeover use, for example, a sheet coil type motor or a solenoid member applied with the same principle as that of the sheet coil type motor may be used.

The blower 3b constituting an air pressure adjustor is connected to the flow channel changeover unit 3a. The blower 3b sends the air (medium) to the seventeen apertures p1 to p17 and the seven apertures p18 to p24 of the base member 1 for every group through the flow channel changeover unit 3a and the flow channel panel 2, or takes in the air from the apertures p1 to p17 and p18 to p24 for every group. In this embodiment, the blower 3b supplies the air to the apertures. Alternatively, the blower may send the air to the apertures p1 to p24 individually or takes in the air from the apertures p1 to p24 individually. As the blower 3b, a blower using a piezoelectric device is used.

Figure 2A:
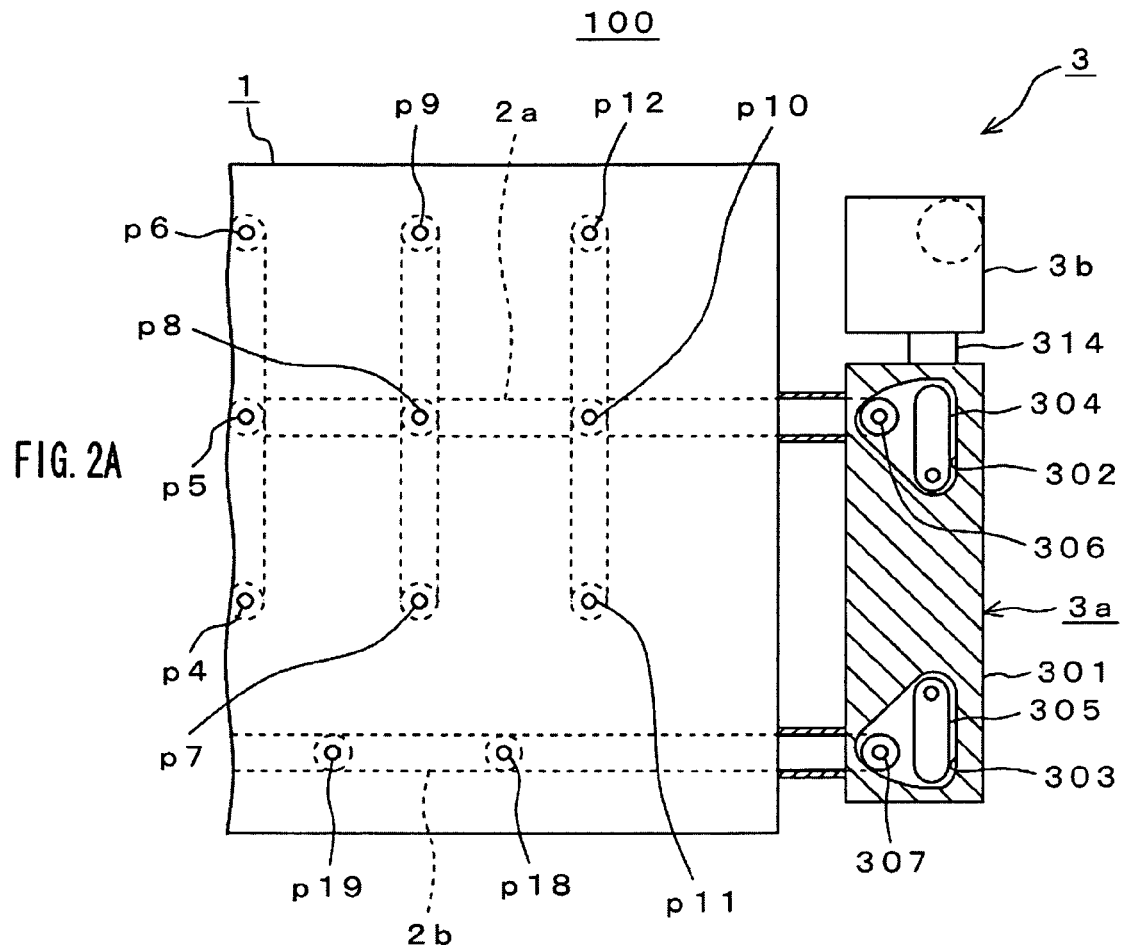
FIGS. 2A and 2B are plan and front views of the touch-sensitive sheet member 100 including partial cross-sections for showing an air supply example in the touch-sensitive sheet member 100.
Figure 2B:
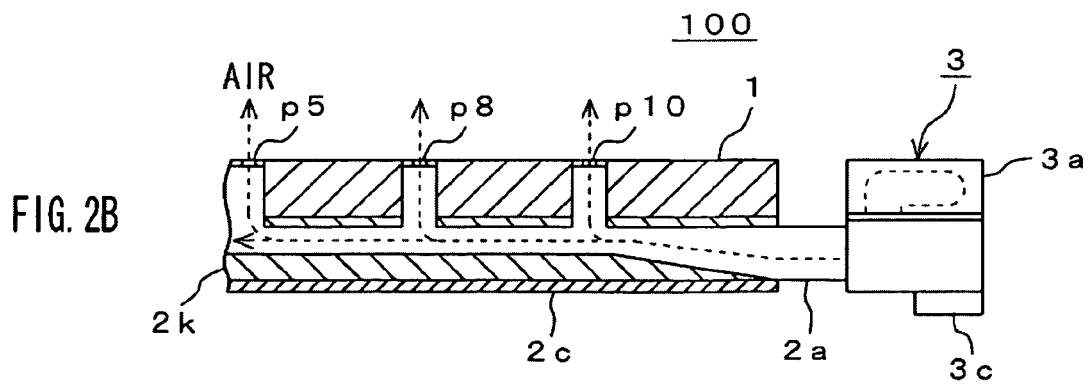

FIGS. 2A and 2B show an air supply example in the touch-sensitive sheet member 100. According to the touch-sensitive sheet member 100 shown in FIG. 2A, the blower 3b supplies the air to the plurality of apertures p1 to p24 of the base member 1 through the flow channel changeover unit 3a and the flow channel panel 2. The flow channel changeover unit 3a contains a valve core portion 301, valve changeover units 302, 303, valve bodies 304, 305 and the like. The valve core portion 301 has, for example, a rectangle sectional shape and is made of a core member that is formed by molding a resin or a light metal by a die.

Each of the valve changeover units 302, 303 is provided so as to form room having a fan shape within the valve core portion 301. An air-intake tube 314 is provided in the valve changeover units 302, 303 with it communicating to the blower 3b and takes in the air from the blower 3b. In the valve changeover unit 302, the valve body 304 and an air-exhaust port 306 are provided. The valve body 304 operates so as to shut off or open the air-exhaust port 306 by obtaining a drive-power of a driving unit 3c of a motor, a solenoid or the like. The air-exhaust port 306 communicates to the flow channel 2a. The driving unit 3c is provided, for example, on the rear surface side of the valve core portion 301.

In the valve changeover unit 303, the valve body 305 and an air-exhaust port 307 are provided. The valve body 305 operates so as to shut off or open the air-exhaust port 307 by obtaining the drive-power of the driving unit 3c. The air-exhaust port 307 communicates to the flow channel 2b. As the valve body 304 or 305, a plate rubber sheet member having a long oval shape is used.

In the above-mentioned embodiment, when the valve body 304 is opened through the driving unit 3c, the air supplied from the blower 3b is passed through the air-exhaust port 306 and the flow channel 2a and is introduced to the apertures p1 to p3 (not shown in FIG. 2A), the apertures p4 to p12 and the apertures p13 to p17 (not shown in FIG. 2A). Also, when the valve body 305 is opened, the air supplied from the blower 3b is passed through the air-exhaust port 307 and the flow channel 2b and is introduced to the apertures P18, p19, and the apertures p20 to p24 (not shown in FIG. 2A).

When the valve bodies 304, 305 are opened at the same time, the air supplied from the blower 3b is passed through the air-exhaust port 306 and the flow channel 2a and is introduced to the apertures p1 to p17 and at the same time, the air supplied from the blower 3b is passed through the air-exhaust port 307 and the flow channel 2b and is introduced to the apertures p18 to p24. Also, when the valve bodies 304,305 are closed at the same time, the air supply to the apertures p1 to p24 stops.

Accordingly, the programmable air-circulation unit 3 is constituted to send the air to the apertures for every group such as the plurality of apertures p1 to p17 and the plurality of apertures p18 to p24 which are perforated in the base member 1, or to take in the air from the apertures for every group such as the apertures p1 to p17 and the apertures p18 to p24. AS shown in FIG. 2B, in the touch-sensitive sheet member 100, the air supplied from the air-circulation unit 3 by passing it through the flow channel 2a and the like can be blown out to the outside from the aperture p5, the aperture p8, the aperture p10 or the like. It should be noted that realizing air-taking from the apertures p1 to p17 and the apertures p18 to p24 is allowed by exchanging the connections of the flow channels 2a, 2b and the air-exhaust ports 306, 307.

Figure 3:
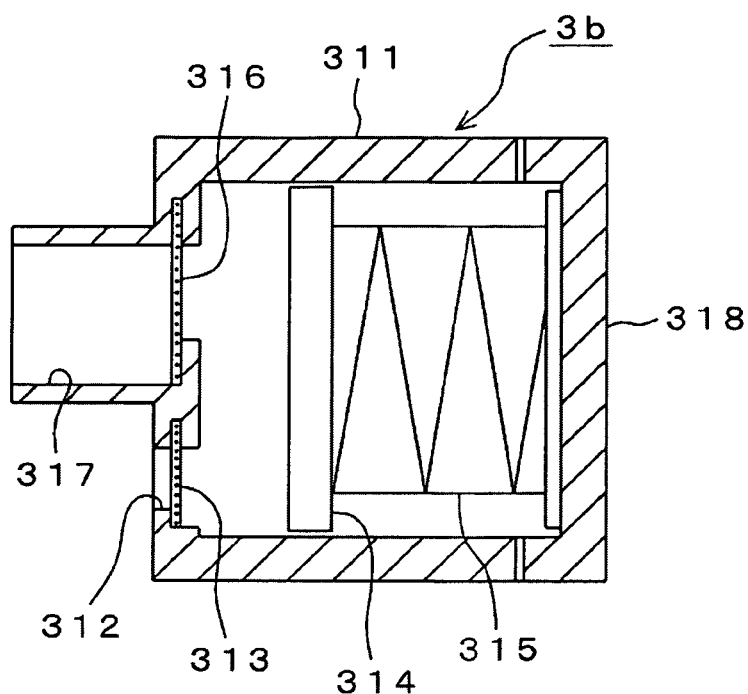
FIG. 3 is a cross-sectional view of a blower 3b showing a configuration thereof.

FIG. 3 shows a configuration of the blower 3b. The blower 3b shown in FIG. 3 is a blower having a piston type structure and contains an apparatus main body 311, an air-intake port 312, a valve body 313, a piston unit 314, a piezoelectric unit 315, a valve body 316, an air-exhaust port 317 and a pedestal 318 in concurrent use of a lid. The apparatus main body 311 has a rectangular sectional shape and has internal volume in which the piston unit 314 is reciprocated. The apparatus main body 311 is constituted, for example, by a housing member formed by molding a resin or a light metal using a die.

In the apparatus main body 311, the air-intake port 312 and the air-exhaust port 317 are provided which have predetermined sizes (aperture diameters). The air-intake port 312 and the air-exhaust port 317 are provided together in parallel in, for example, the up/down on one of the side surfaces of the apparatus main body 311. The aperture diameters of the air-intake port 312 and the air-exhaust port 317 are set to have the same diameter, or are set so that the aperture diameter of the air-exhaust port 317 is larger than that of the air-intake port 312. The reason why the aperture diameter of the air-exhaust port 317 is set larger is because the air-exhaust resistance is decreased.

The valve body 313 is movably mounted on the air-intake port 312, and is opened when the air is taken in the apparatus main body 311. The valve body 313 is closed when the air is released to the outside from the inside of the apparatus main body 311. In the inside of the apparatus main body 311, the piston unit 314 having a predetermined shape is provided. The piezoelectric unit 315 is mounted on one side of the piston unit 314 and the piston unit reciprocates by obtaining a driving force of the piezoelectric unit 315.

The valve body 316 is movably mounted on the air-exhaust port 317 and is opened when the air is released to the outside from the inside of the apparatus main body 311. The valve body 316 is closed when the air is taken in the apparatus main body 311. As the valve body 313 or 316, a plate shaped rubber sheet member is used. The piezoelectric unit 315 is mounted on the pedestal 318 concurrent used as the lid body. For the piezoelectric unit 315, a piezoelectric device (PZT: Actuator) is used. The pedestal 318 concurrent used as the lid body is assembled so as to close the apparatus main body 311. In this manner, the blower 3b is constituted which can supply the air to the flow channel panel 2 through the flow channel changeover unit 3a.

Although, in this embodiment, the blower 3b of a piston type has been described, the blower is not limited to this; a blower in which a Venturi effect is used may be used. A blower of Venturi type includes a diaphragm in a pump room and a Venturi tube unit is communicated to one end of the pump room. The Venturi tube unit is provided with an intake port and an exhaust port.

According to this blower, the diaphragm pushes air in the pump room out, so that the high speed air current occurs toward the Venturi tube unit from the pump room. The Venturi tube unit is designed to have an aperture diameter smaller than ones of the intake port or the exhaust port, so that the current speed of air (gas) becomes very high speed as compared with ones of the outside of the exhaust port.

On the other hand, the outside of the exhaust port is an atmospheric pressure (one atm), but the Venturi tube unit becomes negative pressure because the air current speed is big. Here, Bernoulli's theorem is formed between the Venturi tube unit and the outside of the exhaust port. When an air density is made as $\rho$, the speed of the air in the Venturi tube unit is made as $v1$, the pressure thereof is made as $P1$, the speed of the air at the outside of the exhaust port is made as $v2$ and the pressure thereof is made as $P2$, a formula (1) is obtained from the relationship of $v1>v2$, $P1<P2$, specifically as follows.

$$\rho*v1^2+2*P1=\rho*v2^2+2*P2 \qquad (1)$$

The P2 is an atmospheric pressure and P1 is lower than an atmospheric pressure, so that air is taken from the intake port through the flow channel. Specifically, the air having volume more than volume of the pushed air in the pump room is blown out of the exhaust port.

Further, when the diaphragm pulls air in the pump room, high speed air current occurs toward the pump room from the Venturi tube unit. In this case, similarly as the above, negative pressure occurs because the current speed of air of the Venturi tube unit is larger as compared with that of air of the outside of the exhaust port. This enables air to be taken from the intake port through the flow channel. It is also possible to apply a blower employed with such a Venturi effect to the air-circulation unit 3.

Figure 4:
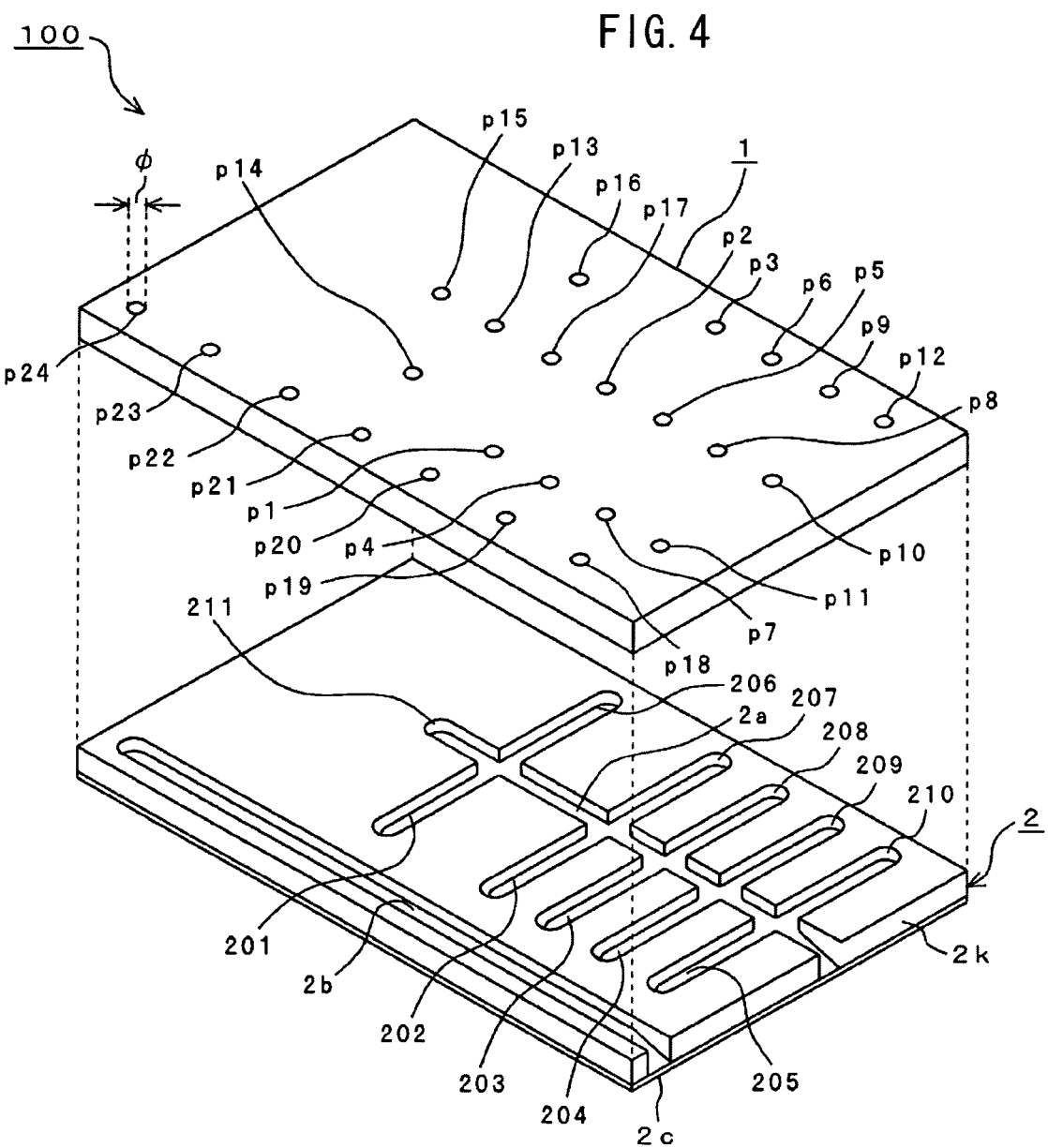
FIG. 4 is an exploded perspective view of the touch-sensitive sheet member 100 showing an assembly of a base member 1 and a flow channel panel 2 in the touch-sensitive sheet member 100.

FIG. 4 shows an assembly of a base member 1 and a flow channel panel 2 in the touch-sensitive sheet member 100. According to the assembly in the touch-sensitive sheet member 100 shown in FIG. 4, the base member 1 and the flow channel panel 2 are prepared. The base member 1 is formed by perforating the apertures p1 to p24 in the body for base member. For example, in a case in which the touch-sensitive sheet member 100 is used as an input detection unit, which constitutes the input device, of a ten-key, a cross key function, a selection key or the like of a mobile phone, the aperture p1 is perforated on the region of the base member 1 in conformity with a position on which a key of numeral "1" is displayed and the aperture p2 is perforated on the region of the base member 1 in conformity with a position on which a key of numeral "2" is displayed. Further, the aperture p3 is perforated on the region of the base member 1 in conformity with a position on which a key of numeral "3" is displayed and the aperture p4 is perforated on the region of the base member 1 in conformity with a position on which a key of numeral "4" is displayed. The aperture p5 is perforated on the region of the base member 1 in conformity with a position on which a key of numeral "5" is displayed and the aperture p6 is perforated on the region of the base member 1 in conformity with a position on which a key of numeral "6" is displayed.

Further, the aperture p7 is perforated on the region of the base member 1 in conformity with a position on which a key of numeral "7" is displayed and the aperture p8 is perforated on the region of the base member 1 in conformity with a position on which a key of numeral "8" is displayed. The aperture p9 is perforated on the region of the base member 1 in conformity with a position on which a key of numeral "9" is displayed and the aperture p10 is perforated on the region of the base member 1 in conformity with a position on which a key of numeral "0" is displayed.

The aperture p11 is perforated on the region of the base member 1 in conformity with a position on which a key of numeral "#" is displayed and the aperture p12 is perforated on the region of the base member 1 in conformity with a position on which a key of numeral "*" is displayed.

Also, the aperture p13 constituting a cross key is perforated on the region of the base member 1 in conformity with a position which a key of determination "O" is displayed. The aperture p14 is perforated on the region of the base member 1 in conformity with a position on which a left facing arrow key is displayed and the aperture p15 is perforated on the region of the base member 1 in conformity with a position on which an upward facing arrow key is displayed. Further, the aperture p16 is perforated on the region of the base member 1 in conformity with a position on which a right facing arrow key is displayed and the aperture p17 is perforated on the region of the base member 1 in conformity with a position on which a downward facing arrow key is displayed.

Further, the aperture p18 constituting a function selection key is perforated on the region of the base member 1 in conformity with a position on which a key of "etc" is displayed and the aperture portion p19 is perforated on the region of the base member 1 in conformity with a position on which a key of "REW" is displayed. The aperture portion p20 is perforated on the region of the base member 1 in conformity with a position on which a left facing arrow stop key is displayed and the aperture portion p21 is perforated on the region of the base member 1 in conformity with a position on which a right facing arrow stop key is displayed. The aperture portion p22 is perforated on the region of the base member 1 in conformity with a position on which a left facing fast-forward key is displayed and the aperture portion p23 is perforated on the region of the base member 1 in conformity with a position on which a right facing fast-forward key is displayed. The aperture portion p24 is perforated on the region of the base member 1 in conformity with a position on which a stop key is displayed (see FIG. 18). Each of the apertures p1 to p24 has an aperture diameter φ.

The flow channel panel 2 is formed so that the panel body 2k having the flow channels 2a, 2b is provided on the substrate 2c. For example, a core and cavity forming a tree shaped flow channel 2a and a linear shaped flow channel 2b is processed. The flow channel 2a is constituted, for example, by flow channels 201 to 211. The flow channel 2a is formed so that the flow channels 201, 206, the flow channels 202, 207, the flow channels 203, 208, the flow channels 204, 208 and the flow channels 205, 210 are arranged from the upward region of the flow channel 211 of the center region in order with them being perpendicular to the flow channel 211.

At a time of the mounting, the flow channel 211 of the center region introduces the air to the seven apertures p15, p13, p17, p2, p5, p8, p10 the flow channel 201 introduces the air to the aperture p14, the flow channel 202 introduces the air to the aperture p1, the flow channel 203 introduces the air to the aperture p4, the flow channel 204 introduces the air to the aperture p7, and the flow channel 205 introduces the air to the aperture p11.

Also, at a time of the mounting, the flow channel 206 introduces the air to the aperture p16, the flow channel 207 introduces the air to the aperture p3, the flow channel 208 introduces the air to the aperture p6, the flow channel 209 introduces the air to the aperture p9, and the flow channel 210 introduces the air to the aperture p12. The flow channel panel 2 is formed by die-tightening a die having such a core and cavity and by sealing a transparent resin material thereinto.

The substrate 2c may be formed at the same time of molding the panel body 2k with the flow channels 2a, 2b using the same die.

When the base member 1 and the flow channel panel 2 are prepared, the base member 1 and the flow channel panel 2 are bonded. The base member 1 is bonded onto the upper portion of the flow channel panel 2 with it covering the flow channel panel 2. As an adhesive agent, for example, a hot melt-based resin adhesive agent, a double sided tape or the like is used to keep air-tightness. This enables a touch-sensitive sheet member as an intermediate component in which the base member 1 is provided on the flow channel panel 2 to be obtained. Thereafter, the air-circulation unit 3 is mounted thereon and the touch-sensitive sheet member 100 is completed. In this embodiment, the flow channel changeover unit 3a and the flow channel panel 2 are connected so that an extended portion of the air-exhaust port 306 of the flow channel changeover unit 3a communicates to the flow channel 2a of the flow channel panel 2 and also an extended portion of the air-exhaust port 307 communicates to the flow channel 2b of the flow channel panel 2. A structure of the air-circulation unit 3 should be referred to FIG. 2A and FIG. 3.

It should be noted that for the base member 1 and the flow channel panel 2, a transparent material is used in which the refractive index is near approximately 1.4 and all light transmittances is around of 70 to 95%, when a refractive index of air is made as 1 and the light transmittance thereof is made as 100%. The base member 1 preferably has thickness of 0.01 to 5 mm.

As the above-mentioned base member 1, there can be used an acrylic-based transparent material (hereinafter, referred to as transparent material), a polycarbonate-based (PC-based) transparent material, a polyethylene terephthalate-based (PET-based) transparent material, a polyether sulfone-based (PES-based) transparent material, a polyarylate-based (PAR-based) transparent material, a polyether ether ketone-based (PEEK-based) transparent material, a liquid crystal polymer-based (LCP-based) transparent material, a polytetrafluoroethylene-based (PTFE-based) transparent material, a polystyrene-based transparent material, a styrene-based transparent material, and an urethane-based transparent material, a silicon-based transparent material. As the above-mentioned base member 1, there can be also used a transparent material formed by mutual synthesis or the like of all the materials of a polytetrafluorothylene-based (PTFE-based) material, a fluorine-based resin material, a cycloolefin polymer-based (COP-based) material, an acrylonitrile-butadiene-styrene-based (ABS-based) material and the like. Further, as the above-mentioned base member 1, there can be used a transparent material derived from one of all the above-mentioned materials, a non-transparent material of all the above-mentioned materials and a polymer alloy which is formed by mixing a material within all the above-mentioned materials and rubber or the like.

Also, as the base member 1 and the flow channel panel 2, the following synthetic resins may be used in general (there exist materials overlapped with the contents mentioned above): a phenol resin (PF), an epoxy resin (EP), a melamine resin (MF), an urea resin (UF), an unsaturated polyester resin (UP), an alkyd resin, polyurethane (PUR), thermoset polyimide (PI), polyethylene (PE), high density polyethylene (HDPE), medium density polyethylene (MDPE), low density polyethylene (LDPE), polypropylene (PP), polyvinylchloride (PVC), polyvinylidene chloride, polystyrene (PS), and polyvinyl acetate (PVAc), polytetrafluoroethylene (PTFE) (Teflon-trademark), an acrylonitrile butadiene styrene resin (ABS), an AS resin, an acrylic resin (PMMA), polyamide (PA), nylon, polyacetal (POM), polycarbonate (polycarbonate-based transparent material), modified polyphenylen ether (m-PPE, modified PPE, PPO), polybutylene terephthalate (PBT), polyethylene terephthalate (polyethylene terephthalate-based transparent material), a polyethylene terephthalate material including a glass resin (polyethylene terephthalate-based transparent material-G), glass-fiber reinforced polyethylene terephthalate (GF-polyethylene terephthalate-based transparent material), cyclic polyolefin (COP), polyphenylene sulfide (PPS), polysulfone (PSF), polyether sulfone (polyethersulfone-based transparent material), amorphous polyarylate (PAR), a liquid crystal polymer (LCP), polyether ether ketone (PEEK), thermoplastic polyimide (PI), polyamide-imide (PAI), a transparent material formed by mutual synthesis or the like of all the above-mentioned materials, a transparent material derived from one of all the above-mentioned materials, a non-transparent material (which is used as nonskid sheet) of all the above-mentioned materials, and a polymer alloy which is formed by mixing a material within all the above-mentioned materials and rubber or the like.

The following will describe shapes of the flow-out ports of the aperture p1 and the like with reference to FIG. 5 to FIG. 13. FIG. 5A shows a shape example of a flow-out port Q1 and FIG. 5B is a cross-section view thereof taken along an arrow of X1-X1 shown in FIG. 5A. The flow-out port Q1 shown in FIG. 5A is formed at each of the terminal portions of the apertures p1 to p24 as shown in FIG. 4 and the shape thereof has a base circle. The aperture p1 or the like is formed by perforating it in the base member 1 shown in FIG. 5B.

In this embodiment, it is possible to obtain a sense of touch by a mass of air blown out of the aperture p1 or the like in a single manner. In FIG. 5 to FIG. 13, each Ia is a display region which can display one element of the input key, for example, the key of numeral "1", the determination key of the cross key or the like. On this display region Ia displaying the key of numeral "1", the determination key of the cross key or the like, slide operation or press operation is executed.

FIG. 6A shows a shape example of a flow-out port Q2 as a modification example (No. 1) and FIG. 6B is a cross-section view thereof taken along an arrow of X2-X2 shown in FIG. 6A. The flow-out port Q2 shown in FIG. 6A has a circular shape in which triple circular members are formed. The flow-out port Q2 is constituted by including, for example, a circular opening region of the center region, arc shaped opening regions on the concentric circle thereof and arc shaped opening regions of the outside thereof. Each of the triple circular members is mutually engaged and supported by beam portions.

It should be noted that as shown in FIG. 6B, it is set such that the opening width of the outside is narrower than the opening width of the inside. In this embodiment, it is possible to obtain a multiple sense of touch by dividing a mass of air blown out of the flow-out port Q2 in three as compared with the sense of touch by a mass of air blown out of the base flow-out port Q1 in a single manner.

FIG. 7A shows a shape example of a flow-out port Q3 as a modification example (No. 2) and FIG. 7B is a cross-section view thereof taken along an arrow of X3-X3 shown in FIG. 7A. The flow-out port Q3 shown in FIG. 7A has many holes which are dispersed. The flow-out port Q3 is constituted by including, for example, a large hole at the center region, a plurality of radially arranged holes on its concentric circle and a plurality of further radially arranged holes on the periphery thereof. It should be noted that as shown in FIG. 7B, they are set such that a diameter of the outside hole becomes smaller than that of the inside hole. In this embodiment, it is possible to obtain a unique sense of touch by a mass of air blown out of the flow-out port Q3 in the plural dispersing manner as compared with a mass of air blown out of the base flow-out port Q1 in a single manner.

FIG. 8A shows a shape example of a flow-out port Q4 as a modification example (No. 3) and FIG. 8B is a cross-section view thereof taken along an arrow of X4-X4 shown in FIG. 8A. The flow-out port Q4 shown in FIG. 8A has a triple concentric circle members. The flow-out port Q4 is constituted by including, for example, small circular opening at a center region, arc shaped openings on the concentric circle thereof and arc shaped openings on the outside thereof. The concentric circle members is respectively engaged and supported to the base member 1 by beam portions. It should be noted that as shown in FIG. 8B, the opening width of the inside is narrower than the opening width of the outside. In this embodiment, it is possible to obtain a multiple sense of touch by a mass of air blown out of the flow-out port Q4 in the plural dispersing manner as compared with a mass of air blown out of the base flow-out port Q1 in a single manner.

FIG. 9A shows a shape example of a flow-out port Q5 as a modification example (No. 4) and FIG. 9B is a cross-section view thereof taken along an arrow of X5-X5 shown in FIG. 9A. The flow-out port Q5 shown in FIG. 9A has many holes which are dispersed. The flow-out port Q5 is constituted by including, for example, a small hole at a center region, a plurality of radially arranged holes on the concentric circle thereof and, a plurality of further radially arranged holes in the periphery thereof. It should be noted that as shown in FIG. 9B, they are set such that the aperture diameter of the outside hole becomes larger than the aperture diameter of the inside hole. In this embodiment, it is possible to obtain a unique sense of touch by a mass of air blown out of the flow-out port Q5 in the plural dispersing manner as compared with a mass of air blown out of the base flow-out port Q1 in a single manner.

FIG. 10A shows a shape example of a flow-out port Q6 as a modification example (No. 5) and FIG. 10B is a cross-section view thereof taken along an arrow of X6-X6 shown in FIG. 10A. The flow-out port Q6 shown in FIG. 10A has a single hole which has a conical shaped inner section. In this embodiment, it is possible to obtain a unique sense of touch by a mass of air blown out of the flow-out port Q6 at high speed as compared with a mass of air blown out of the base flow-out port Q1 in a single manner.

FIG. 11A shows a shape example of a flow-out port Q7 as a modification example (No. 6) and FIG. 11B is a cross-section view thereof taken along an arrow of X7-X7 shown in FIG. 11A. The flow-out port Q7 shown in FIG. 11A has a single hole which has a reverse dish shaped inner section. In this embodiment, it is possible to obtain a unique sense of touch by the raised base member 1 in addition to a mass of air blown out of the flow-out port Q7 at high speed as compared with a mass of air blown out of the base flow-out port Q1 in a single manner.

FIG. 12A shows a shape example of a flow-out port Q8 as a modification example (No. 7) and FIG. 12B is a cross-section view thereof taken along an arrow of X8-X8 shown in FIG. 12A. The flow-out port Q8 shown in FIG. 12A has a shape of circular arcs. A center member C1 is engaged and supported to the base member 1 by beam portions. The aperture p1 or the like is formed by perforating it in the base member 1 shown in FIG. 12B. In this embodiment, it is possible to obtain a unique sense of touch by a mass of air blown out of the flow-out port Q8 in the circular shape as compared with a mass of air blown out of the base flow-out port Q1 in a single manner.

FIG. 13A shows a shape example of a flow-out port Q9 as a modification example (No. 8) and FIG. 13B is a cross-section view thereof taken along an arrow of X9-X9 shown in FIG. 13A. The flow-out port Q9 shown in FIG. 13A has many holes which are arranged as being a circle. The aperture p1 or the like is formed by perforating a plurality of small holes in the base member 1 shown in FIG. 13B. In this embodiment, it is possible to obtain a unique sense of touch by a plurality of masses of air blown out of the flow-out port Q9 as the circle as compared with a mass of air blown out from the base flow-out port Q1 in a single manner.

In this manner, according to the touch-sensitive sheet member 100 as the first embodiment, the flow channel panel 2 is provided which introduces the air to twenty four apertures p1 to p24 perforated in the base member 1 and the blower 3b utilizing the piezoelectric device is used as the air-circulation unit 3 and is connected to the flow channel panel 2 so that the blower 3b sends the air to the apertures p1 to p24 of the base member 1 through the flow channel panel 2 for every group.

Consequently, even if the surface of the base member 1 is observed to be a flat shape, when the operator's hand (finger) touches the surface thereof actually and slides from the base member 1 to the apertures p1 or the like for representing a sense of touch, in the predetermined position of the base member 1, the apertures p1 to p24 can represent the sense of touch which gives the concave and convex touch feeling by the air blown out of the apertures p1 to p24 with respect to the operator's finger or the like (operation body). Such a touch-sensitive sheet member 100 may be applied to a programmable nonskid sheet at the grip portion of various kinds of electronic apparatus housing, a programmable touch-sensitive input sheet for icon touch in an input device or the like. Thus, it becomes possible to provide the input device including the programmable touch-sensitive input sheet.

Embodiment 2

Figure 14A:
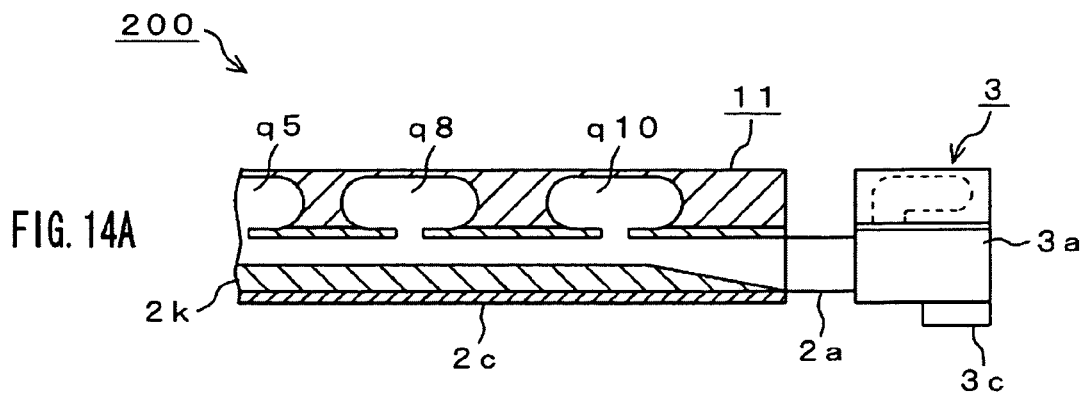
FIGS. 14A and 14B are front and plan views of a touch-sensitive sheet member 200 as a second embodiment including partial cross-sections for showing a configuration thereof.
Figure 14B:
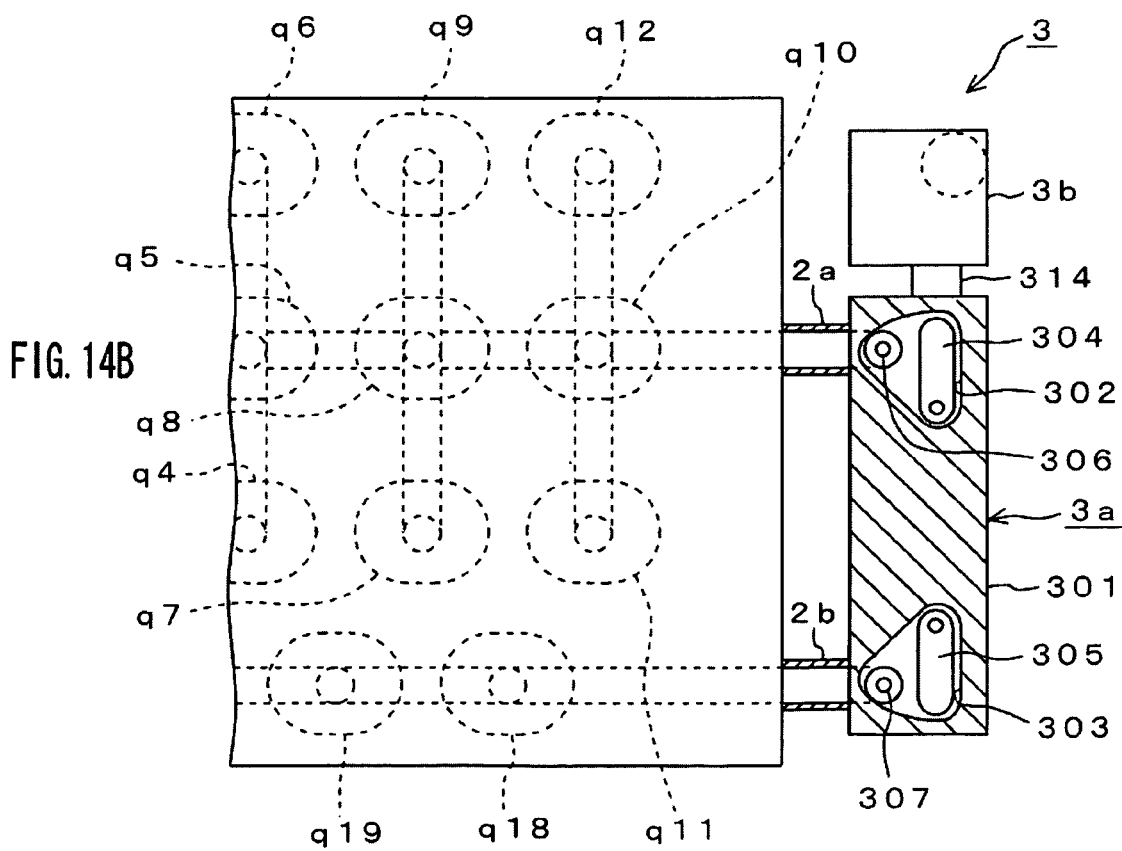

FIGS. 14A and 14B show a configuration of a touch-sensitive sheet member 200 as a second embodiment. In this embodiment, the sense-of-touch-representing unit contains bag portions q1 to q24 for representing a sense of touch, each bag portion having a predetermined size and being arranged at a predetermined position of a base member 11.

The touch-sensitive sheet member 200 shown in FIG. 14A is applicable to an input device which is mounted on an electronic apparatus such as a digital camera, a video camera, a mobile phone, a mobile terminal device, a desk-top type PC, a note type PC, an automatic teller machine or the like. The touch-sensitive sheet member 200 includes the base member 11, the flow channel panel 2 and the air-circulation unit 3.

The air-circulation unit 3 constitutes the medium-supplying unit and operates such that the air is sent to the bag portions q1 to q24 (only q5, q8, q10 are shown in FIG. 14A). In this embodiment, the air-circulation unit 3 has a programmable function for sending the air to the plurality of bag portions q1 to q24 arranged in the base member 11 individually or for every group. In this embodiment, the flow channel panel 2 which introduces the air to the plurality of bag portions q1 to q24 arranged in the base member 11 is also provided. The air-circulation unit 3 contains a blower 3b (air pressure generator) utilizing a piezoelectric device.

The blower 3b is connected to the flow channel panel 2 through a flow channel changeover unit 3a shown in the FIG. 14B. The blower 3b sends compressed air to the plurality of bag portions q1 to q24 in the base member 11 by dividing those into two groups through the flow channel panel 2. It should be noted that in this embodiment, the members having the same name and numeral as those used in the first embodiment have also the same function, so that the explanation thereof will be omitted.

In the above-mentioned embodiment, when the valve body 304 is opened through the driving unit 3c, the air supplied from the blower 3b is introduced to the bag portions q1 to q3 (not shown in drawings), the bag portions q4 to q12 and the bag portions q13 to q17 (not shown in drawings) by passing through the air-exhaust port 306 and the flow channel 2a. Also, when the valve body 305 is opened, the air supplied from the blower 3b is introduced to the bag portions q18, q19, the bag portions q20 to q24 (not shown in the drawings) by passing through the air-exhaust port 307 and the flow channel 2b.

When the valve bodies 304, 305 are opened at the same time, the air supplied from the blower 3b is introduced to the bag portions q1 to q17 by passing through the air-exhaust port 306 and the flow channel 2a and at the same time, is introduced to the bag portions q18 to q24 by passing through the air-exhaust port 307 and the flow channel 2b. Also, when the valve bodies 304, 305 are closed at the same time, the air supply to the bag portions q1 to q24 is stopped.

In this manner, the programmable air-circulation unit 3 is constituted to send the air to the plurality of bag portions q1 to q17 and the plurality of bag portions q18 to q24, which are arranged in the base member 11, for every group or to take the air from the bag portions q1 to q17 and the bag portions q18 to q24. In the touch-sensitive sheet member 200 shown in FIG. 14A, it is possible to fill the bag portion q5, the bag portion q8, the bag portion q10 and the like up with the air supplied from the air-circulation unit 3 by passing through the flow channel 2a and the like.

Figure 15A:
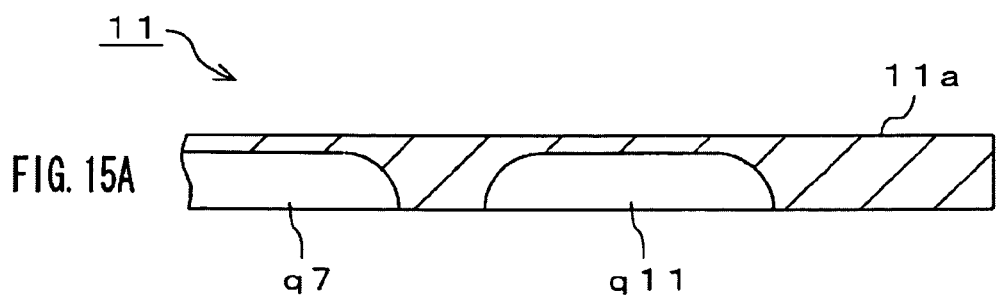
FIGS. 15A to 15C are process diagrams of a base member 11 showing a formation example thereof.
Figure 15B:
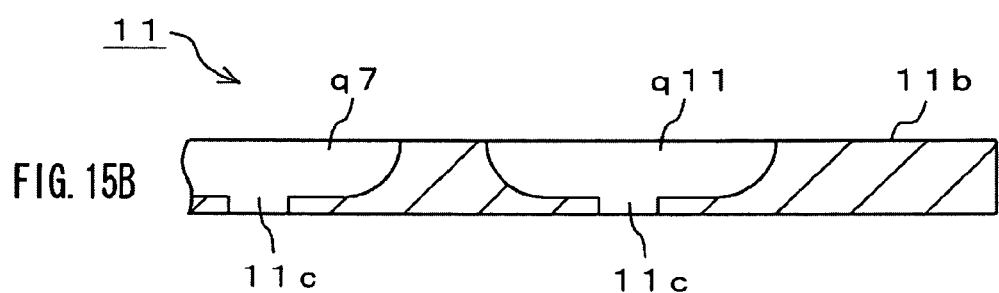
Figure 15C:
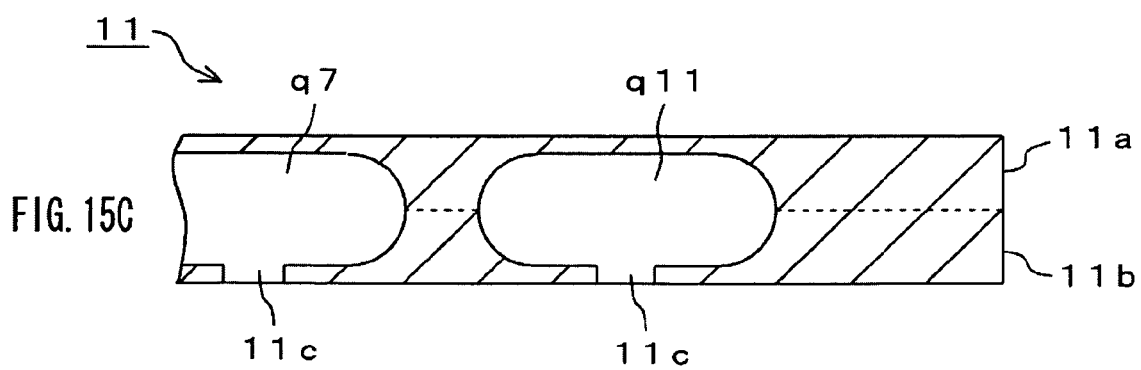

The following will describe a formation method of the base member 11 with reference to FIGS. 15A to 15C. FIGS. 15A to 15C show a formation example of the base member 11. In this example, there are formed a first sheet member 11a in which the bag portions q7, q11 and the like shown in FIG. 14B are halved in the horizontal direction and a second sheet member 11b in which the bag portions q7, q11 and the like shown in FIG. 14B are also halved in the horizontal direction. For example, by processing a die member, a core and a cavity are prepared which form dish shapes modeling the bag portions q7, q11 and the like. By die-tightening a die having such a core and cavity and by sealing a transparent resin material therein, there is formed the first sheet member 11a having the concave shaped half-cut bag portions q7, q11 as shown in FIG. 15A in which the bag portions q7, q11 and the like shown in FIG. 14B are halved in the horizontal direction.

Next, there is formed the second sheet member 11b having air insertion portions 11c and the concave shaped half-cut bag portions q7, q11 which become partners of the concave shaped half-cut bag portions q7, q11 and the like shown in FIG. 15A. For example, by processing a die member, a core and a cavity are prepared which form dish shapes modeling the half-cut bag portions q7, q11 and the like and shapes of the air insertion portions 11c. By die-tightening a die having such a core and cavity and by sealing a transparent resin material therein, there is formed the second sheet member 11b having the air insertion portions 11c and the concave shaped half-cut bag portions q7, q11 shown in FIG. 15B.

Thereafter, the base member 11 having the bag portions q1 to q24 is formed by bonding the first and second concave shaped sheet members 11a, 11b. At that time, the concave region of the half-cut bag portions q7, q11 of the first sheet member 11a and the concave region of the half-cut bag portions q7, q11 of the second sheet member 11b are bonded with them being positioned. For the bonding of the first sheet member 11a and the second sheet member 11b, a hot melt-based resin adhesive agent or a double-sided tape is used. Thus, the base member 11 having the plurality of bag portions q1 to q24 as shown in FIG. 14A is completed.

Figure 16A:
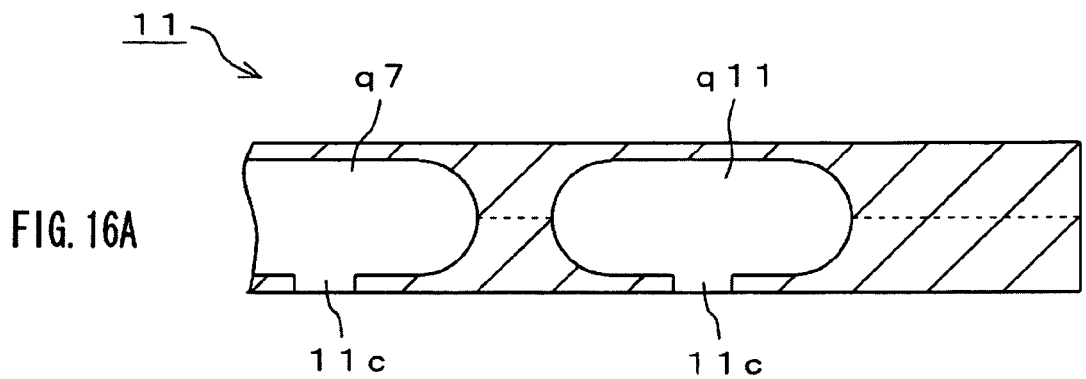
FIGS. 16A to 16C are state transition diagrams of the base member 11 showing a function example thereof.
Figure 16B:
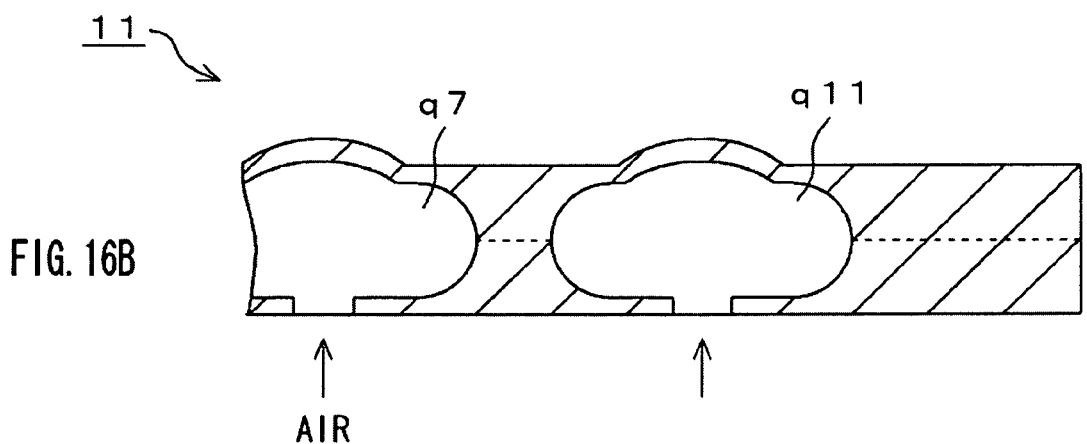
Figure 16C:
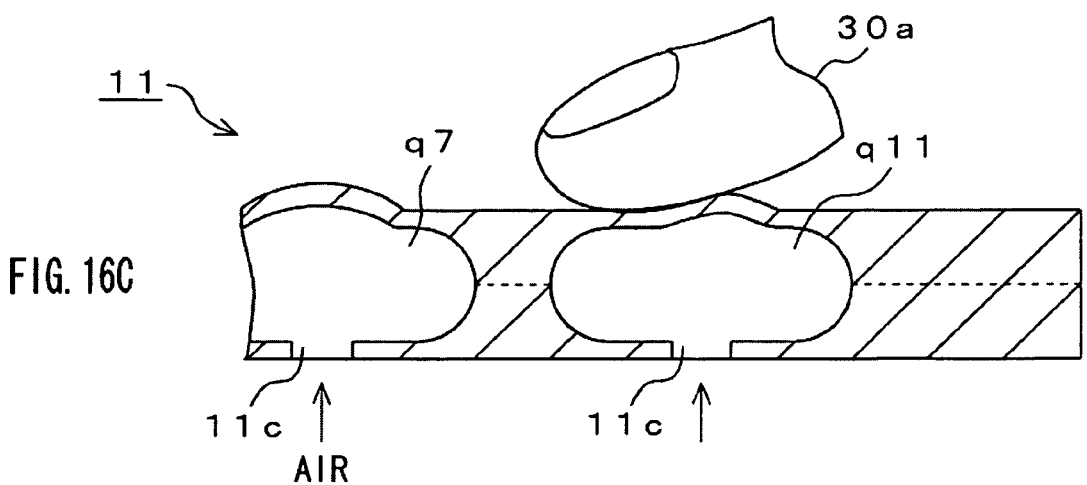

The following will describe a function example of the base member 11 with reference to FIGS. 16A to 16C. FIGS. 16A to 16C show a function example of the base member 11. The bag portion q11 or the like shown in FIG. 16A is a state in which the air is not filled up. In this state, when an operator presses the bag portion q11 or the like, he or she can obtain any sense of touch of concave feeling. The bag portion q11 or the like shown in FIG. 16B is a state in which the air is filled up. The bag portion q11 or the like is filled up with compressed air constantly from the air-circulation unit 3 shown in FIG. 14B through the flow channel changeover unit 3b.

In this example, when the operator touches the bag portion q11 or the like of a state of being filled up with the air shown in FIG. 16C with the finger or the like (operation body), he or she can obtain any sense of touch of concave and convex feeling by a protuberant shape depending on the swelled-up bag portion q11 or the like with respect to the operator's finger 30a. Thus, it is possible to execute the slide operation and the press operation accompanied with an elastic feeling.

Figure 17A:
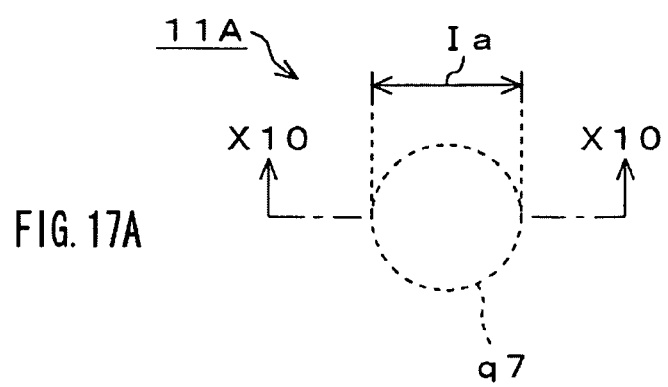
FIG. 17A is a plan view of a base member 11A as a modification example of the base member 11 and FIG. 17B is a cross-sectional view thereof taken along an arrow of X10-X10 shown in FIG. 17A.
Figure 17B:
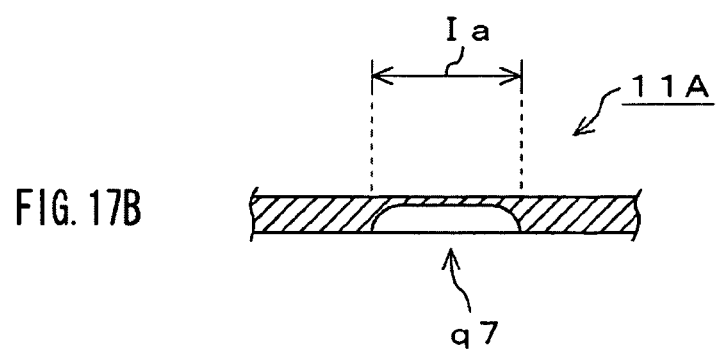

FIGS. 17A and 17B show a modification example of the base member 11. The base member 11A as shown in FIG. 17A is equal to a reverse dish shaped bag body which does not have the flow-out port Q7 shown in FIG. 11A. The sheet shaped base member 11A having such a half-cut bag portion q7 shown in FIG. 17B is formed so as to be formed as being shown in FIG. 15A and is bonded to the panel body 2k of the flow channel panel 2 shown in FIG. 14A without forming the half-cut bag portion q7 or the like of the partner as shown in FIG. 15B, thereby enabling a touch-sensitive sheet member. This touch-sensitive sheet member, not shown, is the device in which the sheet shaped base member 11A having the half-cut bag portion q7 shown in FIG. 17B is bonded to the panel body 2k of the flow channel panel 2 shown in FIG. 14A. It should be noted that each of the signs, "Ia" in FIGS. 17A and 17B indicates a display region of the key of numeral "1" or the like which forms the icon image. Even by this structure, it is possible to obtain a unique sense of touch by the swelled-up base member 11A.

In this manner, according to the touch-sensitive sheet member 200 as the second embodiment, the blower 3b comes to send the compressed air to the bag portions q1 to q24 for every group through the flow channel changeover unit 3a. Consequently, in the spots of the base member 11 or the predetermined positions of the base member 11, it becomes possible to represent the sense of touch for giving the concave and convex feeling by the protuberant shape depending on each of the swelled-up bag portions q1 to q24 or by the original shape in a case of no ventilation with respect to the operator's finger or the like (operation body). Thus, it becomes possible to provide the input device having the programmable touch-sensitive input sheet.

Embodiment 3

FIG. 18 shows a configuration of a third embodiment of an input device 300 according to the embodiment to which the touch-sensitive sheet member 200 is applied. In this embodiment, the input device 300 which can carry out an operation panel building mode is provided. The input device 300 can select a first group of seventeen element bag portions E1 to E17 and/or a second group of eight element bag portions E18 to E25, which are provided on the same plane of a base member 101.

The input device 300 shown in FIG. 18 inputs any information by the slide and/or press operation depending on the finger or the like of the operator 30 (operation body). The input device 300 includes a display unit 29, an input detection unit 45 and a touch-sensitive variable sheet unit 103.

The display unit 29 has an operation surface and displays a plurality of push button switch images at a time of the input operation. The push button switch images constitute icon images for the input operation. The push button switch images include a key K1 of numeral "1" to a key K10 of numeral "0", a key K11 of symbol "*", a key K12 of a symbol "#" or the like, a key K13 of determination "O" of a cross key, a left facing arrow key K14 thereof, an upward facing arrow key K15 thereof, a right facing arrow key K16 thereof, a downward facing arrow key K17 thereof, a key K18 of "etc", a key K19 of "REW", a left facing arrow stop key K20, a right facing arrow stop key K21, a left facing fast-forward key K22, a fast-forward key K23, a reproduction key K24 and a stop key K25 or the like. As the display unit 29, a color organic EL display device or a liquid crystal display device (LCD device) is used.

The input detection unit 45 which constitutes the detection unit is provided on the upper portion of the display unit 29. The input detection unit 45 includes the operation surface. The input detection unit 45 is provided on the upper portion of the display unit 29 and operates so as to detect the slide position of the operator's finger or the like. As the input detection unit 45, for example, a capacitive touch panel is used. With respect to the input detection unit 45, anything is available only if the cursoring and the selection function can be distinguished. For example, other than the capacitive input device, it also may be a resistive touch panel, an input device of a surface acoustic wave system (SAW) or an optical system, a tact switch of a multi stage system or the like. Preferably, it may be enough if the input device has a constitution by which position detection information and press detection information can be applied to a control system.

The transparent touch-sensitive variable sheet unit 103 constituting the touch-sensitive sheet member is provided on the upper portion of the input detection unit 45. The touch-sensitive variable sheet unit 103 is provided so as to cover the whole of the input detection unit 45 and the operator performs any slide and/or press operation along the operation surface of the display unit 29. It is needless to say that the touch-sensitive variable sheet unit 103 may cover a portion of the input detection unit 45. The touch-sensitive variable sheet unit 103 is provided with the embodiment of the touch-sensitive sheet member 200 having a bag structure.

In this embodiment, the touch-sensitive variable sheet unit 103 contains a base member 101 which has predetermined hardness and also a plurality of concave portions of a rectangular dish shape and which is used as the flow channel panel 2 concurrently, a sheet shaped film portion 5 for a lid which covers the upper portion of the base member 101 in good air-tightness, and an air-circulation unit 3 which supplies the air to a plurality of the element bag portions E1 to E25 for representing a sense of touch which are constituted by the base member 101 and the film portion 5. The air-circulation unit 3 includes a flow channel changeover unit 3a and a blower 3b as shown in FIG. 2. The blower 3b having the piezoelectric unit 315 is used. The element bag portions E1 to E25 constituted by the base member 101 and the film portion 5 have predetermined sizes and are distributed in spots of the base member 101 or predetermined positions thereof.

For example, the base member 101 includes the plurality of the element bag portions E1 to E25 which are distributed at the predetermined positions by forming the concave portions of the predetermined sizes. The element bag portions E1 to E25 constitutes the sense-of-touch-representing unit. In this embodiment, the element bag portions E1 to E12 for the keys of the numerals "0" to "9", the key of symbol "*" and the key of symbol "#" and the like and the element bag portions E13 to E17 for the cross key corresponding to the icon image for the input operation have, for example, square concave shapes.

The element bag portion E18 for the key of "etc" for function selection, the element bag portion E19 for the key of "REW", the element bag portion E20 for the left facing arrow stop key thereof, the element bag portion E21 for the right facing arrow stop key thereof, the element bag portion E22 for the left facing fast-forward key thereof, the element bag portion E23 for the fast-forward key thereof, the element bag portion E24 for the reproduction key thereof and the element bag portion E25 for the stop key thereof have also the square concave shape. The respective element bag portions E1 to E25 are formed in the base member 101 having the hardness of 20° to 40° which is used as the flow channel panel 2 concurrently.

The above-mentioned element bag portions E1 to E25 are arranged corresponding to the keys K1 to K25 of various kinds of functions. For example, the element bag portion E1 is arranged so as to be positioned on the key K1 of numeral "1" of the icon image displayed on the display unit 29. The element bag portion E2 is arranged so as to be positioned on the key K2 of numeral "2" of the icon image displayed on the display unit 29. The element bag portion E3 is arranged so as to be positioned on the key K3 of numeral "3" of the icon image displayed on the display unit 29. The element bag portion E4 is arranged so as to be positioned on the key K4 of numeral "4" of the icon image displayed on the display unit 29. The element bag portion E5 is arranged so as to be positioned on the key K5 of numeral "5" of the icon image displayed on the display unit 29. The element bag portion E6 is arranged so as to be positioned on the key K6 of numeral "6" of the icon image displayed on the display unit 29. The element bag portion E7 is arranged so as to be positioned on the key K7 of numeral "7" of the icon image displayed on the display unit 29. The element bag portion E8 is arranged so as to be positioned on the key K8 of numeral "8" of the icon image displayed on the display unit 29. The element bag portion E9 is arranged so as to be positioned on the key K9 of numeral "9" of the icon image displayed on the display unit 29. The element bag portion E10 is arranged so as to be positioned on the key K10 of numeral "0" of the icon image displayed on the display unit 29.

Also, the element bag portion E11 is arranged so as to be positioned on the key K11 of symbol "*" of the icon image displayed on the display unit 29. The element bag portion E12 is arranged so as to be positioned on the key K12 of symbol "#" of the icon image displayed on the display unit 29. The element bag portion E13 is arranged so as to be positioned on the key K13 of determination "O" of the icon image of the cross key displayed on the display unit 29. The element bag portion E14 is arranged so as to be positioned on the left facing arrow key K14 of the icon image displayed on the display unit 29. The element bag portion E15 is arranged so as to be positioned on the upward facing arrow key K15 of the icon image displayed on the display unit 29. The element bag portion E16 is arranged so as to be positioned on the right facing arrow key K16 of the icon image displayed on the display unit 29. The element bag portion E17 is arranged so as to be positioned on the downward facing arrow key K17 of the icon image displayed on the display unit 29.

Further, the element bag portion E18 is arranged so as to be positioned on the key K18 of "etc" of the icon image displayed on the display unit 29. The element bag portion E19 is arranged so as to be positioned on the key K19 of "REW" of the icon image displayed on the display unit 29. The element bag portion E20 is arranged so as to be positioned on the left facing arrow stop key K20 of the icon image displayed on the display unit 29. The element bag portion E21 is arranged so as to be positioned on the right facing arrow stop key K21 of the icon image displayed on the display unit 29. The element bag portion E22 is arranged so as to be positioned on the left facing fast-forward key K22 of the icon image displayed on the display unit 29. The element bag portion E23 is arranged so as to be positioned on the fast-forward key K23 of the icon image displayed on the display unit 29. The element bag portion E24 is arranged so as to be positioned on the reproduction key K24 of the icon image displayed on the display unit 29. The element bag portion E25 is arranged so as to be positioned on the stop key K18 of the icon image displayed on the display unit 29.

In this embodiment, the film portion 5 constituting the lid portion is provided on an upper portion of the base member 101 having the element bag portions E1 to E25. As the film portion 5, there is used a transparent material having transmissivity and a refractive index which are approximately equal to transmissivity and a refractive index of the base member 101. There is used, for example, a "zeonor" of the film having thickness of around 25 µm. The hardness thereof is around 20° to 40°.

When the input device 300 is constituted in this manner, the blower 3b comes to send the compressed air to the element bag portions E1 to E25 for every group. Consequently, in the predetermined positions of the base member 101, the element bag portions E1 to E25 allows for presenting the sense of touch for giving the concave and convex feeling by the protuberant shape depending on the swelled-up element bag portions E1 to E25 or by the original shape in a case of no ventilation with respect to the operator's finger or the like (operation body).

Figure 19A:
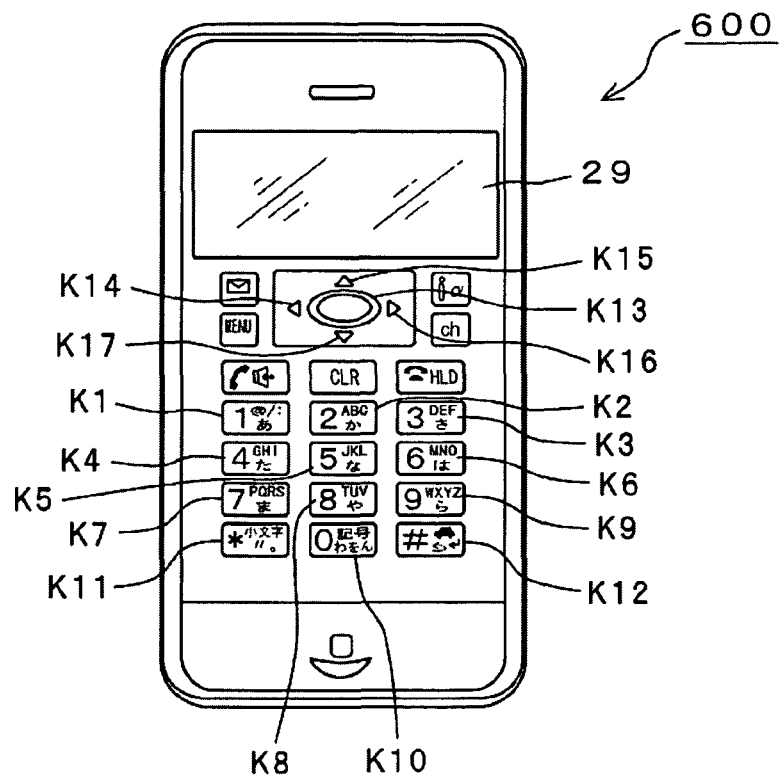
FIGS. 19A and 19B are plan views of mobile phones 600 in each of which the input device 300 is mounted for showing a configuration of the mobile phones 600.
Figure 19B:
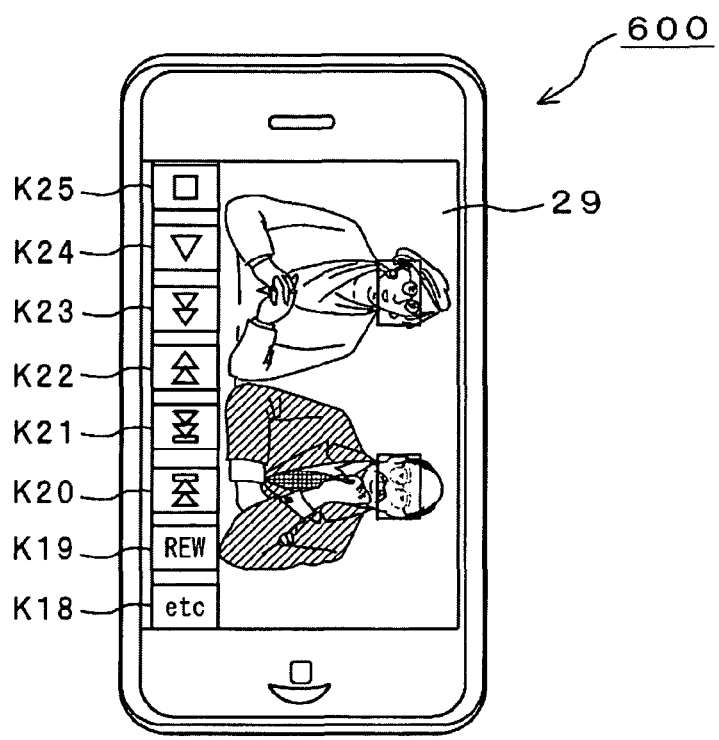

FIGS. 19A and 19B each shows a configuration of a mobile phone 600 in which the input device 300 is mounted. The mobile phone 600 shown in FIG. 19A constitutes the electronic apparatus. According to the mobile phone 600, on the display unit 29 including the operation surface, there are displayed the icon images such as the key K1 of numeral "1" to key K10 of numeral "0", the key K11 of symbol "*", the key K12 of symbol "#" or the like, the key K13 of determination "O" of the cross key, the left facing arrow key K14 thereof, the upward facing arrow key K15 thereof, the right facing arrow key K16 thereof and the downward facing arrow key K17 thereof, which form a first group. These key icon images of the first group are, for example, displayed on the display unit 29 when application #A is executed.

In this embodiment, the display region of the key K1 of numeral "1" corresponds to the element bag portion E1 shown in FIG. 18, and similarly, the display region of the key K2 of numeral "2" corresponds to the element bag portion E2 shown in FIG. 18. The display region of the key K3 of numeral "3" corresponds to the element bag portion E3 shown in FIG. 18. The display region of the key K4 of numeral "4" corresponds to the element bag portion E4 shown in FIG. 18. The display region of the key K5 of numeral "5" corresponds to the element bag portion E5 shown in FIG. 18. The display region of the key K6 of numeral "6" corresponds to the element bag portion E6 shown in FIG. 18. The display region of the key K7 of numeral "7" corresponds to the element bag portion E7 shown in FIG. 18. The display region of the key K8 of numeral "8" corresponds to the element bag portion E8 shown in FIG. 18. The display region of the key K9 of numeral "9" corresponds to the element bag portion E9 shown in FIG. 18. The display region of the key K10 of numeral "0" corresponds to the element bag portion E10 shown in FIG. 18. The respective display regions enable the concave and convex touch feeling to be given to the operator's finger when the slide operation or the press operation is executed.

Further, the display region of the key K11 of symbol "*" corresponds to the element bag portion E11 shown in FIG. 18 and the display region of the key K12 of symbol "#" corresponds to the element bag portion E12. The respective display regions enable the concave and convex touch feeling to be given to the operator's finger. Similarly, the display region of the key K13 of determination "O" which forms the cross key corresponds to the element bag portion E13, the display region of the left facing arrow key K14 thereof corresponds to the element bag portion E14 and the display region of the upward facing arrow key K15 thereof corresponds to the element bag portion E15. Further, the display region of the right facing arrow key K16 thereof corresponds to the element bag portion E16 and the display region of the downward facing arrow key K17 thereof corresponds to the element bag portion E17. When the slide operation or the press operation is executed, it is constituted such that the respective display regions enable the concave and convex touch feeling to be given to the operator's finger. The concave and convex touch feeling in such a first group occurs based on a fact in which the air-circulation unit 3 is controlled such that the flow channel changeover unit 3a selects the flow channel 2a to send the air to the base member 101 which is concurrently used as the flow channel panel.

According to the mobile phone 600 shown in FIG. 19B, on the display unit 29 including the operation surface, there are displayed the icon images of the key K18 of "etc", the key K19 of "REW", the left facing arrow stop key K20, the right facing arrow stop key K21, the left facing fast-forward key K22, the fast-forward key K23, the reproduction key K24, the stop key K25, which form a second group, and at the same time, the vide of the reproduction application or the like. These key icon images of the second group, for example, are displayed on the display unit 29 when application #B is executed.

In this embodiment, the display region of the key K18 of "etc" corresponds to the element bag portion E18 shown in FIG. 18 and similarly, the display region of the key K19 of "REW" corresponds to the element bag portion E19. The display region of the left facing arrow stop key K20 corresponds to the element bag portion E20, the display region of the right facing arrow stop key K21 corresponds to the element bag portion E21 and the display region of the left facing fast-forward key K22 corresponds to the element bag portion E22. Further, the display region of the fast-forward key K23 corresponds to the element bag portion E23, the display region of the reproduction key K24 corresponds to the element bag portion E24 and the display region of the stop key K25 corresponds to the element bag portion E25. When the slide operation or the press operation is executed, the respective display regions enable the concave and convex touch feeling to be given to the operator's fingers. The concave and convex touch feeling in such a second group occurs on a fact in which the air-circulation unit 3 is controlled such that the flow channel changeover unit 3a selects the flow channel 2b to send the air to the base member 101 which is concurrently used as the flow channel panel.

In this manner, according to the mobile phone 600, the representation position of the convex and concave shape thereof is changed depending on the states of the applications #A and #B of the operation key screen, so that in case of the comparison with the key board of the past or the fixation system of the past system, in the same area, specifically "in the sense of touch-like meaning for representing the surface shape", it becomes possible to constitute various input units.

Figure 20:
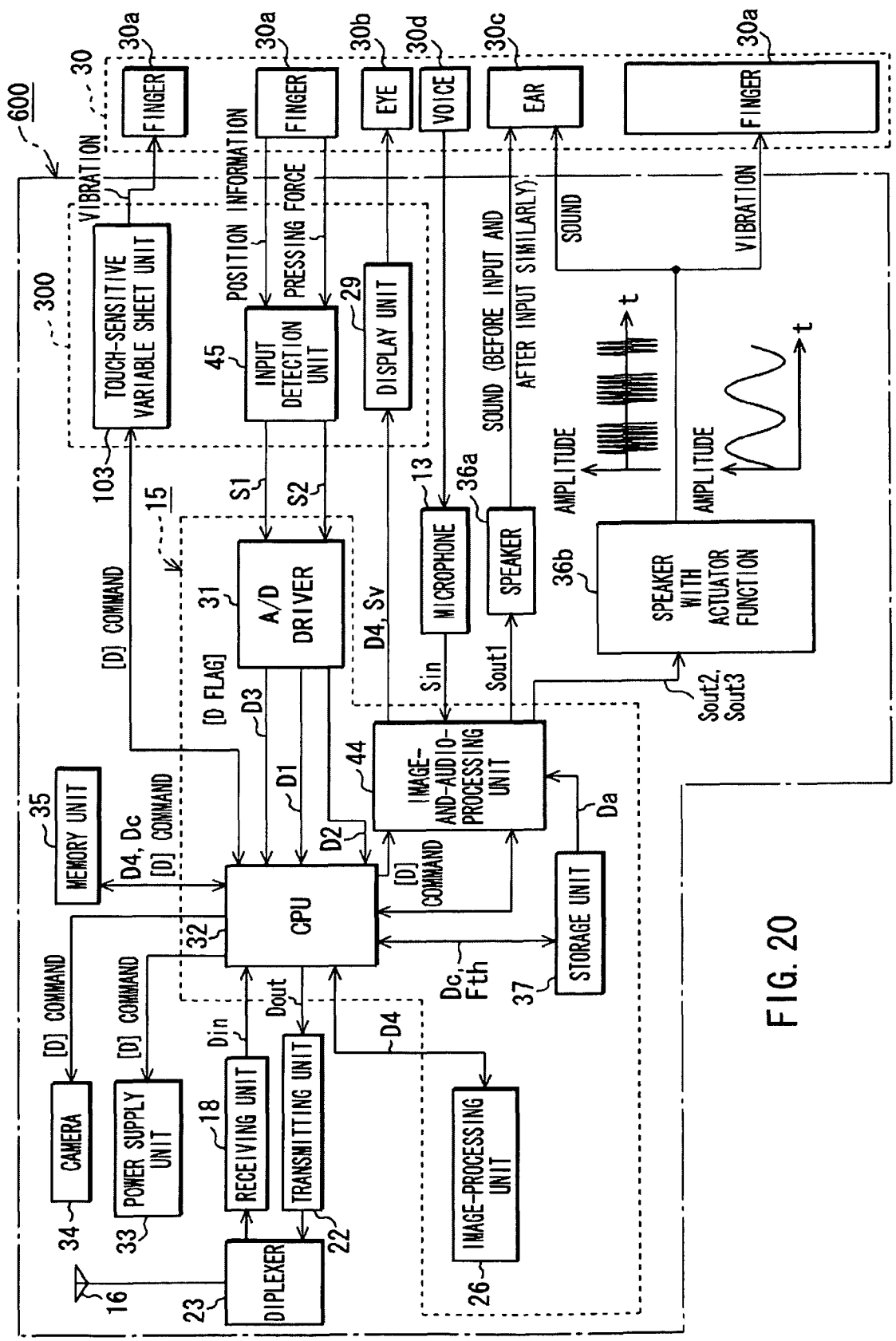
FIG. 20 is a block diagram of the mobile phone 600 showing a configuration of a control system of the mobile phone 600 and a touch-sensitive feed back function example thereof.

The following will describe a control system or the like of the mobile phone 600. FIG. 20 shows a configuration of the control system of the mobile phone 600 and the touch-sensitive feed back function example thereof.

In this example, the amount of air which is supplied to the element bag portions E1 to E25 for representing a sense of touch is adjusted for every group by controlling the piezoelectric unit 315 of the touch-sensitive variable sheet unit 103, thereby enabling the changed sense of touch to be given to the operator's finger 30a (operation body).

The mobile phone 600 shown in FIG. 20 contains a control unit 15, a receiving unit 18, a transmitting unit 22, an antenna diplexer 23, the input detection unit 45, the display unit 29, a power supply unit 33, a camera 34, a memory unit 35, a speaker 36a for an incoming melody, a speaker 36b with actuator function and the touch-sensitive variable sheet unit 103. The input detection unit 45, the display unit 29 and the touch-sensitive variable sheet unit 103 constitute the input device 300.

The input detection unit 45 detects a slide position and a press by the finger 30a of the operator 30 and outputs at least a position detection signal S1 showing the slide position and a press detection signal S2 showing a pressing force F to the control unit 15. For the input detection unit 45, there is used a capacitive input device, a resistive input device, an input device of surface acoustic wave system (SAW), an input device of an optical system, an input device of a multi-stages system tact switch or the like.

The input detection unit 45 is connected to the control unit 15. The control unit 15 includes an image-processing unit 26, an A/D driver 31, a CPU 32 and a storage unit 37. The A/D driver 31 receives the position detection signal S1 and the press detection signal S2 from the input detection unit 45. The A/D driver 31 converts an analog signal composed of the position detection signal S1 and the press detection signal S2 to digital data in order to distinguish the function of the cursoring and the function of the icon selection. Other than this, the A/D driver 31 calculates the digital data, detects which is a cursoring input or icon selection information, and supplies flag data D3 by which the cursoring input or the icon selection is distinguished, the position detection information D1 or the press detection information D2 to the CPU 32. These calculations may be executed in the CPU 32.

The A/D driver 31 is connected with the CPU 32. The CPU 32 controls the whole of the mobile phone based on a system program. The memory unit 35 stores system program data for controlling the whole of the mobile phone. A RAM, which is not shown, is used as a work memory. The CPU 32, at the same time when turning the power ON, reads the system program data out of the memory unit 35 and expands the program data in the RAM, turns on the system and controls the whole of the mobile phone.

For example, the CPU 32 receives the position detection information D1, press detection information D2 and flag data D3 (hereinafter, simply referred to as the input data) from the A/D driver 31 and controls so as to supply a predetermined instruction data D to the devices of the power supply unit 33, the camera 34, the memory unit 35, the storage unit 37, an image-and-audio-processing unit 44, the touch-sensitive variable sheet unit 103 or the like. The CPU 32 also takes-in the reception data from the receiving unit 18 and transfers the transmission data to the transmitting unit 22.

In this embodiment, the CPU 32 is connected to the touch-sensitive variable sheet unit 103, in addition to the input detection unit 45, which under a driving control of the CPU 32, adjusts an amount of air which is supplied to the element bag portions E1 to E25 for representing a sense of touch for every group through the piezoelectric unit 315, thereby enabling the sense of touch which is given to the operator's finger 30a (operation body) to be changed.

The CPU 32, for example, compares the press detection information D2 obtained from the input detection unit 45 with a preset press judgment threshold Fth and based on the comparison result thereof, outputs a predetermined instruction data D to the touch-sensitive variable sheet unit 103 to driving-control the piezoelectric unit 315 thereof. Here, when the sense of touch transmitted from the input detection surface in the press position of the input detection unit 45 is supposed to be as #a and #b, the sense of touch #a is provided by changing the input detection surface corresponding to the pressing force F of the operator's finger 30a in the press position thereof from a vibration pattern with a low frequency and also small amplitude to a vibration pattern with a high frequency and also large amplitude.

Also, the sense of touch #b is provided by changing the input detection surface corresponding to the pressing force F of the operator's finger 30a in the press position thereof from a vibration pattern with a high frequency and also large amplitude to a vibration pattern with a low frequency and also small amplitude. These vibration pattern output controls in the input detection surface are executed by executing the driving control by the piezoelectric unit 315 of the touch-sensitive variable sheet unit 103. It is needless to say that the storage unit 37 may be controlled so as to vibrate the speaker 36b with actuator function. It should be noted that the vibration control of the speaker 36b may be omitted. In a case in which the touch-sensitive variable sheet unit 103 is driving-controlled, the medium is air and the amount thereof is adjusted and controlled, so that it becomes possible to present stronger sense of touch as compared with the vibration of the speaker 36b.

The above-mentioned CPU 32 is connected to the display unit 29 and the memory unit 35 which stores display information D4 for displaying the display screen for input item selection, for example, three-dimensionally, control information Dc relating to the selection position and the vibration mode of the icon corresponding to the display information D4 and the like for every display screen. The control information Dc includes a plurality of specific vibration waveforms which generates a plurality of different senses of touch synchronized with application (three-dimension-like display and various kinds of display contents) in the display unit 29 and an algorithm that sets the specific sense-of-touch generation mode for every application. As the memory unit 35, an EEPROM, ROM, RAM or the like is used.

In this embodiment, the CPU 32 executes the display control of the display unit 29, the driving control of the touch-sensitive variable sheet unit 103 and/or the output control of the speaker 36b with actuator function based on the position detection information D1, the press detection information D2 and the flag data D3 which are received from the A/D driver 31.

For example, the CPU 32 controls the air-circulation unit 3 so as to supply the air to the element bag portions E1 to E25 for presenting the sense of touch of the touch-sensitive variable sheet unit 103 corresponding to the image contents displayed on the display unit 29, so that the element bag portions E1 to E25 are available at predetermined positions of the base member 101 corresponding to the image contents. Also, the CPU 32 controls the piezoelectric unit 315 of the touch-sensitive variable sheet unit 103 and adjusts the amount of air which is supplied to the element bag portions E1 to E25 for representing the sense of touch for every group based on the position detection information D1 and the press detection information D2 which are received from the input detection unit 45, so that the sense of touch which is given to the operator's finger 30a (operation body) is changed.

Further, the CPU 32 may read the control information Dc out of the memory unit 35, access the storage unit 37 and supply a vibration generation signal Sout2 to the speaker 36b with actuator function. This control may be omitted.

The CPU 32, further, executes the driving control of the piezoelectric unit 315 and/or the read-out control of the storage unit 37 so as to control the touch-sensitive variable sheet unit 103 and/or the speaker 36b to start up the sense of touch #a when the input detection unit 45 detects the press detection information D2 which exceeds the press judgment threshold Fth and thereafter, so as to control the touch-sensitive variable sheet unit 103 and/or the speaker 36b to stat up the sense of touch #b when the input detection unit 45 detects the press detection information D2 which is equal to or less than the press judgment threshold Fth. This control enables to be generated a unique vibration pattern in conformity with the "pressing force" of the operator's finger 30a or the like.

The CPU 32 is connected to the storage unit 37 of which vibration control data Da is read out based on the control information Dc from the CPU 32. The vibration generation data Da is also outputted to the touch-sensitive variable sheet unit 103 through the CPU 32. The vibration generation data Da has an output waveform composed of a sinusoidal waveform, a saw-tooth wave, pulse wave, a rectangular wave or the like. The storage unit 37 is connected to the image-and-audio-processing unit 44. Respective items of vibration generation data Da are supplied to the image-and-audio-processing unit 44. The items of the vibration generation data Da thereof are audio-processed (digital-analogue conversion, amplification or the like) to become a vibration generation signal Sout2 that is supplied to the speaker 36b with actuator function. It is constituted such that the speaker 36b is vibrated based on the vibration generation signal Sout2.

In this embodiment, the storage unit 37 stores the press judgment threshold Fth corresponding to each application. For example, the press judgment threshold Fth is stored beforehand in a ROM or the like provided in the memory unit 35 as trigger parameter. The CPU 32 reads press judgment threshold Fth out of the storage unit 37 and receives the press detection information D2 from the A/D driver 31. The CPU 32 compares the preset press judgment threshold Fth with the pressing force F obtained from the press detection information D2 which is received from the A/D driver 31 and executes the judgment processing of Fth>F, the judgment processing of Fth≤F or the like.

For example, when the press judgment threshold Fth=100 [gf] is set in the storage unit 37, it is constituted such that the input detection surface vibrates based on the vibration pattern for obtaining a sense of touch like a classic switch. Also, when the press judgment threshold Fth=20 [gf] is set, it is constituted such that the input detection surface vibrates based on the vibration pattern for obtaining a sense of touch like a cyber switch.

The CPU 32 is connected to an image-processing unit 26, other than the storage unit 37, in which the display information D4 for displaying the button icon or the like three-dimensionally is image-processed. The image-processed display information D4 is supplied to the display unit 29. In this embodiment, the CPU 32 display-controls the display unit 29 so as to display the button icon in the display screen three-dimensionally with it having the perspective in the depth direction.

The input device 300 thus constituted is input-operated on the display screen for input item selection accompanied with the sense of touch by pressing down (contacting) one of the plurality of button icons displayed on the display screen and by pushing-down the input detection unit 45 on the display screen in the Z-direction. The operator 30 feels vibration for every button icon as the sense of touch by receiving vibration at the finger 30a thereof.

Each function is judged by the sense of sight depending on the eyes of the operator for the display contents of the display unit 29 and by the sense of hearing depending on the ears of the operator for the sound release from the speakers 36a, 36b or the like. To the above-mentioned CPU 32, the display unit 29 and the input detection unit 45 constituting the operation panel 98 are connected and for example, the operation panel 98 is used when a phone number of the partner is inputted manually. The display unit 29 may display a received image based on an image signal Sv other than the above-mentioned icon selection screen.

Also, the antenna 16 shown in FIG. 20 is connected to the antenna diplexer 23 and receives a radio wave from the partner through a base station thereof or the like when receiving calls. The antenna diplexer 23 is connected to the receiving unit 18 which receives the reception data introduced from the antenna 16, performs demodulation-process on the image and audio or the like and outputs demodulated image and audio data Din to the CPU 32 or the like. The receiving unit 18 is connected through the CPU 32 to the image-and-audio-processing unit 44 which digital-analog-converts digital audio data to output an audio signal Sout or digital-analog-converting digital image data to output an image signal Sv.

The image-and-audio-processing unit 44 is connected to the speaker 36a for constituting a big sound use and the speaker 36b with actuator function for constituting a receiver. The speaker 36a outputs sounds of a receiving sound, an incoming melody and the like based on a sound signal Sout 1 when receiving calls.

Also, the speaker 36b constitutes a vibration body and vibrates together with the touch-sensitive variable sheet unit 103 when representing the sense of touch or in a single manner based on the vibration generation signal Sout2. The speaker 36b gives the vibration to the operation surface of the display unit 29 based on the position detection signal S1 obtained from the input detection unit 45. It is needless to say that the speaker 36b receives an audio signal Sout3 and amplifies the partner's voice or the like.

To the image-and-audio-processing unit 44, a microphone 13 constituting a telephone transmitter is connected, other than the speakers 36a, 36b, and outputs an audio signal Sin by collecting the operator's voice 30d. When transmitting calls, the image-and-audio-processing unit 44 outputs digital audio data by analog-to-digital converting the analog audio signal Sin to be transmitted to the partner and/or outputs digital image data by analog-to-digital converting the analog image signal Sv.

The CPU 32 is connected, other than the receiving unit 18, to the transmitting unit 22 which performs modulation-process on the image and audio data Dout or the like to be transmitting to the partner and supplies the modulated transmission data to the antenna 16 through the antenna diplexer 23. The antenna 16 radiates a radio wave supplied from the antenna diplexer 23 toward a base station or the like.

To the above-mentioned CPU 32, other than the transmitting unit 22, the camera 34 is connected which shoots a subject and transmits, for example, still image information or operation information to the partner through the transmitting unit 22. The camera 34 is provided on the rear surface side of housing. The power supply unit 33 includes a battery 94 which supplies a DC power to the receiving unit 18, the transmitting unit 22, the display unit 29, the CPU 32, the camera 34, the memory unit 35, the storage unit 37, the image-and-audio-processing unit 44, the input detection unit 45 and the touch-sensitive variable sheet unit 103. It should be noted that although, in this embodiment, a case in which the storage unit 37 is provided separately from the image-and-audio-processing unit 44 has been described, a memory device which is included in the image-and-audio-processing unit 44 may be concurrently used. This enables the number of the parts to be reduced.

Figure 21:
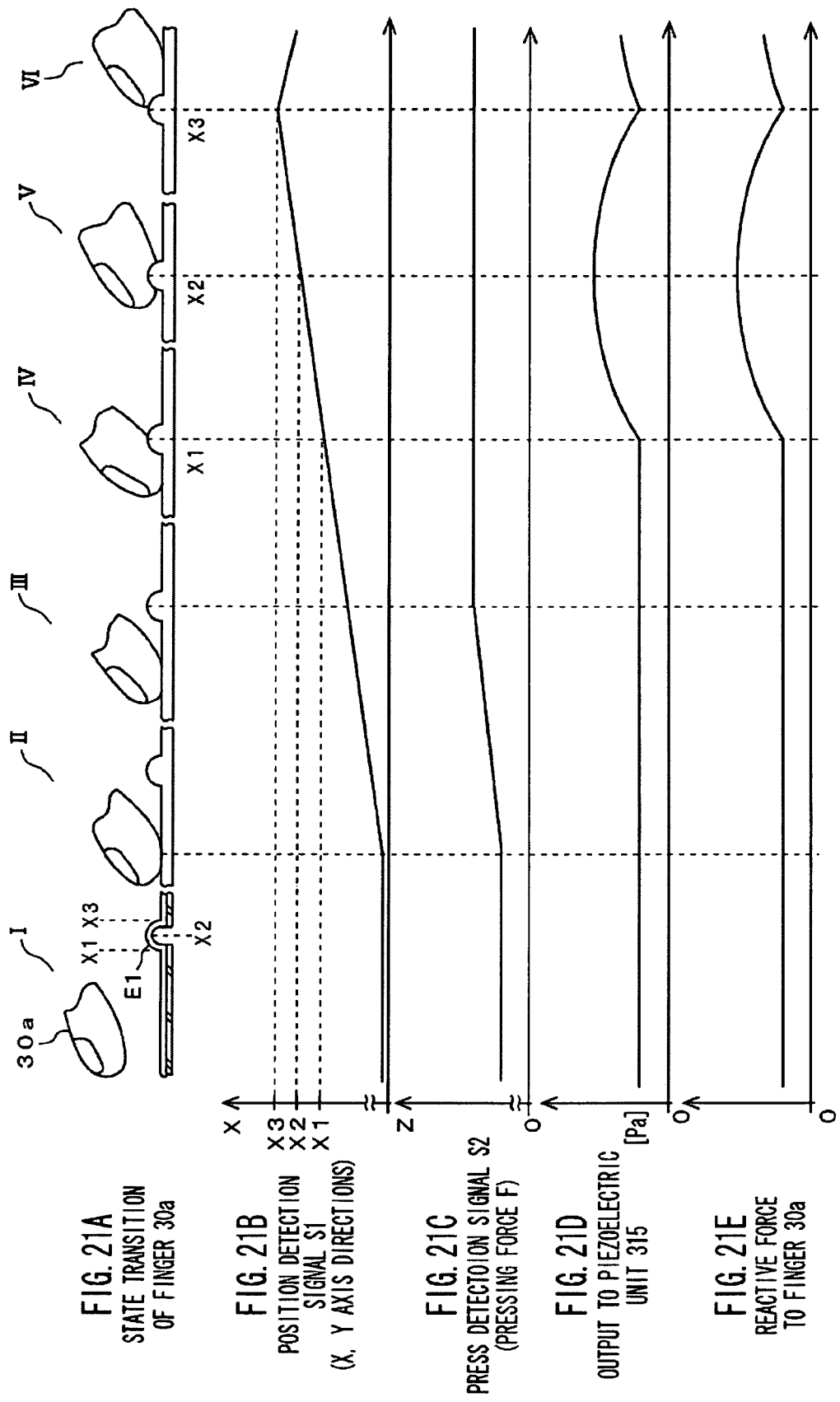
FIGS. 21A to 21E are state diagrams showing slide and press operation examples (No. 1 thereof) in the mobile phone 600.
Figure 22:
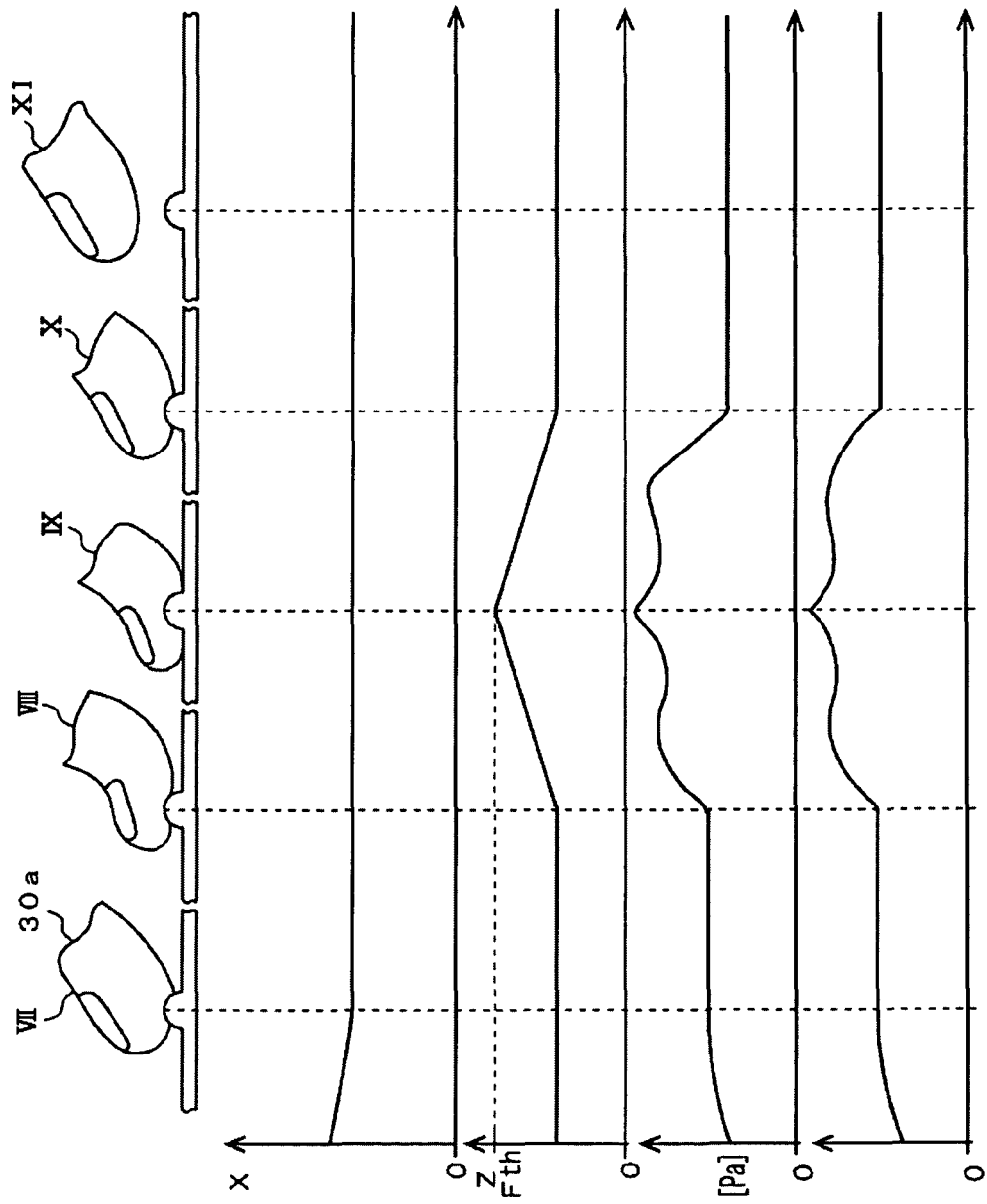
FIGS. 22A to 22E are state diagrams showing the slide and press operation examples (No. 2 thereof) in the mobile phone 600.

The following will describe a function example of the input detection unit 45. FIGS. 21A to 21E and FIGS. 22A to 22E show slide and press operation examples (No. 1 and No. 2 thereof) in the mobile phone 600. FIG. 21A and FIG. 22A show operation examples of the operator's finger 30a. FIG. 21B and FIG. 22B show position detection examples obtained from the input detection unit 45. FIG. 21C and FIG. 22C show press detection examples obtained from the input detection unit 45. FIG. 21D and FIG. 22D show driving examples of the piezoelectric unit 315 of the air-circulation unit 3. FIG. 21E and FIG. 22E show reactive force examples that are given to the operator's finger 30a. Each shows transition from a state-I to a state-XI.

In this embodiment, it is assumed that the piezoelectric unit 315 of the air-circulation unit 3 of the touch-sensitive variable sheet unit 103 supplies the air to the element bag portions E1 to E25 which swell. Also, the element bag portion E1 shown in FIG. 21A indicates the sense-of-touch-representing unit for representing the sense of touch generated on the display region of, for example, the key K1 of numeral "1" in the touch-sensitive variable sheet unit 103. In this element bag portion E1, a x1 indicates a position in the X-axis direction in the XYZ coordinates system and is a position of a protrusion edge portion of the left side of the element bag portion E1 in FIG. 21A, a x2 indicates a position of the protrusion center portion thereof and a x3 indicates a position of a protrusion edge portion of the right side thereof.

By setting these as the input detection condition, the state-I shown in FIG. 21A is a case in which the operator's finger 30a does not touch the element bag portion E1 of the touch-sensitive variable sheet unit 103. In this case, according to the position detection example shown in FIG. 21B, the position detection signal S1 is not outputted from the input detection unit 45. Also, according to the press detection example shown in FIG. 21C, the press detection signal S2 is not obtained from the input detection unit 45. According to the driving example of the piezoelectric unit 315 shown in FIG. 21D, it is a state in which the air is supplied to the twenty five element bag portions E1 to E25 which swell in order to present the concave and convex touch feeling. According to the reactive force example given to the operator's finger 30a shown in FIG. 21E, the finger 30a does not touch the element bag portion E1, so that the reactive force does not occur.

The state-II shown in FIG. 21A is a case in which the operator's finger 30a is slid and operated (sliding) on the touch-sensitive variable sheet unit 103. In this case, according to the position detection example shown in FIG. 21B, the position detection by the input detection unit 45 is continued and some of the position detection signal S1 is outputted. Also, according to the press detection example shown in FIG.

21C, the press detection by the input detection unit 45 is continued, but the pressing force F exceeding the judgment threshold has not yet detected. According to the driving example of the piezoelectric unit 315 shown in FIG. 21D, a state is maintained in which the air is supplied to the twenty five element bag portions E1 to E25 which swell in order to present the concave and convex touch feeling. According to the reactive force example given to the operator's finger 30a shown in FIG. 21E, the finger 30a touches the touch-sensitive variable sheet unit 103, but the element bag portion E1 is not pressed, so that the reactive force does not occur.

The state-IV shown in FIG. 21A is a case in which the operator's finger 30a is slid and operated (sliding) on the touch-sensitive variable sheet unit 103 and thereafter, reaches to the protrusion edge portion of the left side of the element bag portion E1. In this case, according to the position detection example shown in FIG. 21B, the position detection signal S1 showing the position x1 of the protrusion edge portion of the left side of the element bag portion E1 is outputted from the input detection unit 45. Also, according to the press detection example shown in FIG. 21C, the press detection by the input detection unit 45 is continued, but the pressing force F exceeding the judgment threshold has not yet detected. According to the driving example of the piezoelectric unit 315 shown in FIG. 21D, it is a state in which the air is further supplied to the twenty five element bag portions E1 to E25 which further swell in order to present the concave and convex touch feeling. According to the reactive force example given to the operator's finger 30a shown in FIG. 21E, the finger 30a touches the touch-sensitive variable sheet unit 103 but does not press it, so that the reactive force does not occur.

The state-V shown in FIG. 21A is a case in which the operator's finger 30a reaches to the protrusion center portion of the element bag portion E1 of the touch-sensitive variable sheet unit 103. In this case, according to the position detection example shown in FIG. 21B, the position detection signal S1 showing the position x2 of the protrusion center portion of the element bag portion E1 is outputted from the input detection unit 45. Also, according to the press detection example shown in FIG. 21C, the press detection by the input detection unit 45 is continued, but the pressing force F exceeding the judgment threshold has not yet detected. According to the driving example of the piezoelectric unit 315 shown in FIG. 21D, a state is maintained in which the air is supplied to the twenty five element bag portions E1 to E25 which swell still further in order to present the concave and convex touch feeling. According to the reactive force example given to the operator's finger 30a shown in FIG. 21E, the finger 30a touches the protrusion center portion and the operator's finger 30a obtains the reactive force as the concave and convex touch feeling by a fact that the element bag portion E1 swells still further.

The state-VI shown in FIG. 21A is a case in which the operator's finger 30a is shifted to the protrusion edge portion of the right side from the protrusion center portion of the element bag portion E1 of the touch-sensitive variable sheet unit 103. In this case, according to the position detection example shown in FIG. 21B, the position detection signal S1 showing the position x3 of the protrusion edge portion of the right side of the element bag portion E1 is outputted from the input detection unit 45. Also, according to the press detection example shown in FIG. 21C, the press detection by the input detection unit 45 is continued, but the pressing force F exceeding the judgment threshold has not yet detected.

According to the driving example of the piezoelectric unit 315 shown in FIG. 21D, the state in which the air is supplied to the twenty five element bag portions E1 to E25 which swell still further returns to the state of the normal time in which the air is supplied in order to present the concave and convex touch feeling. In this embodiment, the operator's finger 30a will return to the protrusion center portion from the protrusion edge portion of the right side of the element bag portion E1 of the touch-sensitive variable sheet unit 103. According to the reactive force example given to the operator's finger 30a shown in FIG. 21E, the finger 30a touches the protrusion edge portion of the right side from the protrusion center portion and the operator's finger 30a obtains the reactive force which is weaker than the state V shown in FIG. 21A as the concave and convex touch feeling by a fact that the element bag portion E1 swells still further.

The state-VII shown in FIG. 22A is a case in which the operator's finger 30a returns to the protrusion center portion of the element bag portion E1 of the touch-sensitive variable sheet unit 103. In this case, according to the position detection example shown in FIG. 22B, the position detection signal S1 showing the position x2 of the protrusion center portion of the element bag portion E1 is outputted from the input detection unit 45. Also, according to the press detection example shown in FIG. 22C, the press detection by the input detection unit 45 is continued but the pressing force F exceeding the judgment threshold has not yet detected.

According to the driving example of the piezoelectric unit 315 shown in FIG. 22D, a state is maintained in which the air is supplied to the twenty five element bag portions E1 to E25 which swell still further in order to present the concave and convex touch feeling. According to the reactive force example given to the operator's finger 30a shown in FIG. 22E, the finger 30a touches the protrusion center portion and obtains the reactive force thereof as the concave and convex touch feeling by a fact that the element bag portion E1 swells still further.

The state-VIII shown in FIG. 22A is a case in which the operator's finger 30a starts the press operation at the protrusion center portion of the element bag portion E1 of the touch-sensitive variable sheet unit 103. In this case, according to the position detection example shown in FIG. 22B, the operator's finger 30a stays at the protrusion center portion of the element bag portion E1, so that the position detection signal S1 is not outputted from the input detection unit 45. Also, according to the press detection example shown in FIG. 22C, the press detection by the input detection unit 45 is continued but the pressing force F exceeding the judgment threshold has not yet detected.

According to the driving example of the piezoelectric unit 315 shown in FIG. 22D, it is a state in which the air is supplied to the twenty five element bag portions E1 to E25 which start swelling still further in order to overcome the pressing force F by the press operation of the operator's finger 30a. According to the reactive force example given to the operator's finger 30a shown in FIG. 22E, the finger 30a presses the protrusion center portion toward the Z-direction and obtains the reactive force as the concave and convex touch feeling by a fact that the element bag portion E1 swells still further.

The state-IX shown in FIG. 21A is a case just before the operator's finger 30a completes pressing the protrusion center portion of the element bag portion E1 of the touch-sensitive variable sheet unit 103. In this case, according to the position detection example shown in FIG. 22B, the operator's finger 30a stays at the protrusion center portion of the element bag portion E1, so that the position detection signal S1 is not outputted from the input detection unit 45. Also, according to the press detection example shown in FIG. 22C, the input detection unit 45 detects the press detection signal S2 showing the pressing force F exceeding the judgment threshold.

According to the driving example of the piezoelectric unit 315 shown in FIG. 22D, a state is maintained in which the air is supplied to the twenty five element bag portions E1 to E25 which swell still further in order to overcome the pressing force F by the press operation of the operator's finger 30a. According to the reactive force example given to the operator's finger 30a shown in FIG. 22E, the finger 30a presses the protrusion center portion toward the Z-direction and obtains the reactive force as the concave and convex touch feeling by a fact that the element bag portion E1 swells further.

The state-X shown in FIG. 22A is a case in which the pressing force F is gradually decreased after the operator's finger 30a completes pressing the protrusion center portion of the element bag portion E1 of the touch-sensitive variable sheet unit 103. In this case, according to the position detection example shown in FIG. 22B, the operator's finger 30a stays at the protrusion center portion of the element bag portion E1, so that the position detection signal S1 is not outputted from the input detection unit 45. Also, according to the press detection example shown in FIG. 22C, the input detection unit 45 detects the press detection signal S2 showing the pressing force F which is less than the judgment threshold and is decreasing gradually.

According to the driving example of the piezoelectric unit 315 shown in FIG. 22D, a state is continued in which the air is supplied to the twenty five element bag portions E1 to E25 which swell still further in order to overcome the pressing force F by the press operation of the operator's finger 30a. According to the reactive force example given to the operator's finger 30a shown in FIG. 22E, the finger 30a presses the protrusion center portion little by little in the Z-direction and the element bag portion E1 is gradually shifted to the normal swelling, so that the finger 30a obtains the concave and convex touch feeling in which the reactive force is gradually decreased.

In this manner, the output [pa] of the piezoelectric unit 315 is controlled by making the position detection signal S1 and the press detection signal S2 as the triggers, so that it becomes possible to represent the more real and local concave and convex touch feeling.

Figure 23:
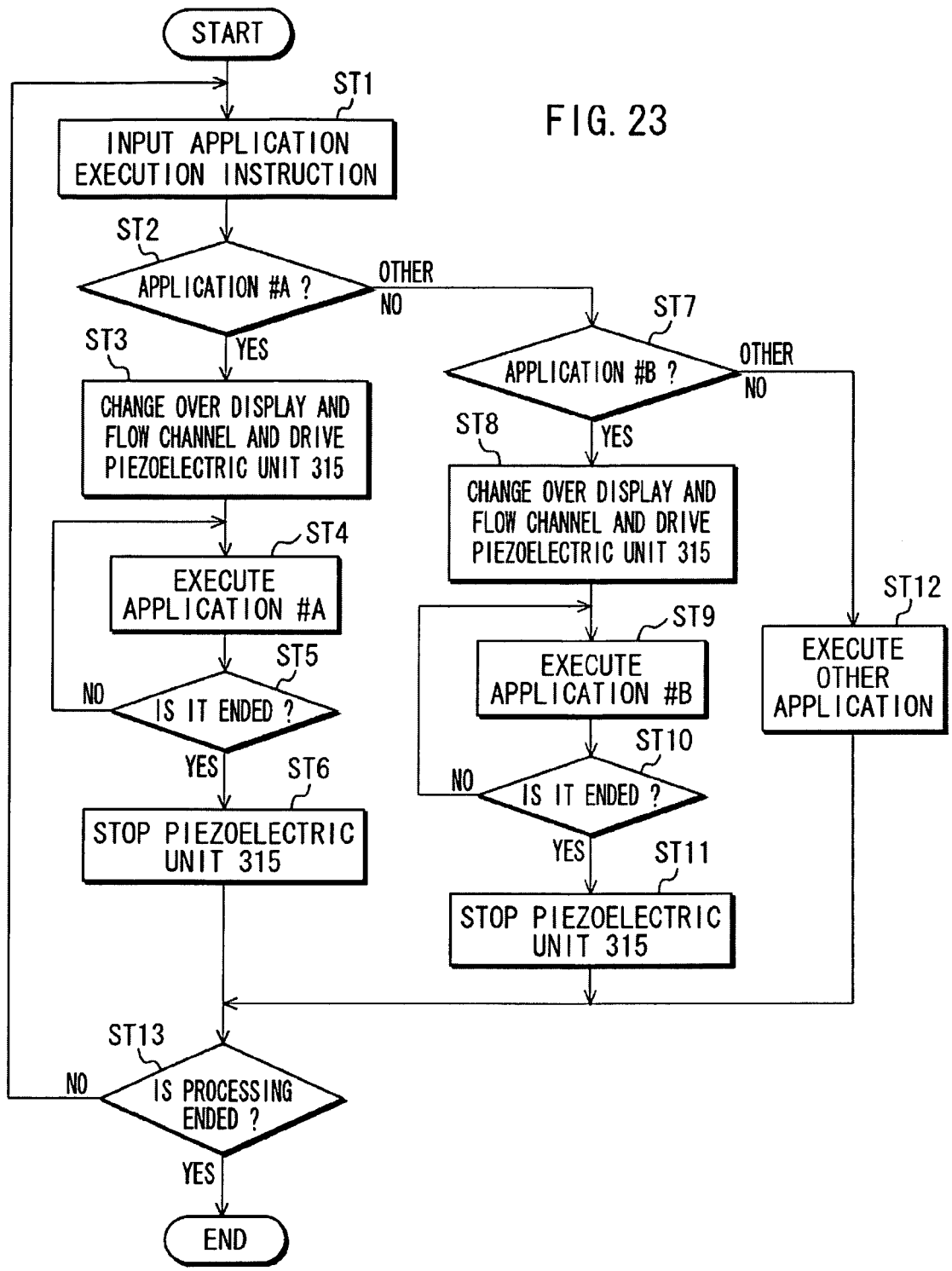
FIG. 23 is a flowchart showing a control example of a display unit and a touch-sensitive variable sheet unit in the mobile phone 600 at a time of execution of application.

The following will describe an information processing example of the mobile phone 600. FIG. 23 shows a control example of a display unit and a touch-sensitive variable sheet unit in the mobile phone 600 at a time of execution of application.

In this example, there is cited a case in which, based on the selection of the application #A or #B, the mobile phone 600 mounted with the input device 300 displays either of the operation screens shown in FIGS. 19A and 19B and, by linking with this display, the sense-of-touch-representing unit is built by sending the air to the element bag portions E1 to E17 (first group) or the element bag portions E18 to E25 (second group) in the touch-sensitive variable sheet unit 103 (hereinafter, referred to as operation panel building mode). In this example, a case is illustrated in which a selection candidate is changed over in order of the application #A and the application #B with respect to the operation panel building mode base on an application execution instruction.

By setting these as the operation panel changeover condition, the CPU 32 inputs an application execution instruction at step ST1 of the flowchart shown in FIG. 23. The application execution instruction is given to the CPU 32, for example, by making power switch-ON information as a trigger. Thereafter, the process shifts to step ST2 where the CPU 32 branches the control thereof depending on whether the application execution instruction is an execution instruction of the application #A or an execution instruction of the other application.

If the application execution instruction is an execution instruction of the application #A, then the process shifts to step ST3 where the CPU 32 reads control information of the application #A. The control information is made correspondence with the application #A, the application #B or the like beforehand. The CPU 32 controls the display unit 29 so as to change over the display thereof based on the control information.

At that time, the CPU 32 outputs an image signal Sv to the display unit 29 based on the control information. The display unit 29, based on the image signal Sv, displays the icon images of the key K1 of numeral "1" to the key K10 of numeral "0", the key K11 of symbol "*", the key K12 of symbol "#" or the like, the key K13 of determination "O" of the cross key, the left facing arrow key K14 thereof, the upward facing arrow key K15 thereof, the right facing arrow key K16 thereof and the downward facing arrow key K17 thereof, which form the icon images of the first group (referred to as FIG. 19A).

Also, the CPU 32 outputs the instruction data D based on the control information to the air-circulation unit 3 of the touch-sensitive variable sheet unit 103. The air-circulation unit 3 executes a changeover control so as to open the valve body 304 and to shut off the valve body 305 based on the instruction data D in order to select the flow channel 2a. The blower 3b sends the air to the flow channel 2a selected by the flow channel changeover unit 3a. The piezoelectric unit 315 constituting the blower 3b adjusts an amount of the air. The piezoelectric unit 315 is controlled by the instruction data D inputted from the CPU 32. This control enables the concave and convex touch feeling of the seventeen element bag portions E1 to E17 of the first group to change.

In this example, the display region of the key K1 of numeral "1" corresponds to the element bag portion E1 shown in FIG. 18, and similarly, the display region of the key K2 of numeral "2" corresponds to the element bag portion E2 shown in FIG. 18. The display region of the key K3 of numeral "3" corresponds to the element bag portion E3 shown in FIG. 18. The display region of the key K4 of numeral "4" corresponds to the element bag portion E4 shown in FIG. 18. The display region of the key K5 of numeral "5" corresponds to the element bag portion E5 shown in FIG. 18. The display region of the key K6 of numeral "6" corresponds to the element bag portion E6 shown in FIG. 18. The display region of the key K7 of numeral "7" corresponds to the element bag portion E7 shown in FIG. 18. The display region of the key K8 of numeral "8" corresponds to the element bag portion E8 shown in FIG. 18. The display region of the key K9 of numeral "9" corresponds to the element bag portion E9 shown in FIG. 18. The display region of the key K10 of numeral "0" corresponds to the element bag portion E10 shown in FIG. 18. The respective display regions enable the concave and convex touch feeling to be given to the operator's finger when the slide operation or the press operation is executed.

Further, the display region of the key K11 of symbol "*" corresponds to the element bag portion E11 shown in FIG. 18 and the display region of the key K12 of symbol "#" corresponds to the element bag portion E12. The respective display regions enable the concave and convex touch feeling to be given to the operator's finger. Similarly, the display region of the key K13 of determination "O" which forms the cross key corresponds to the element bag portion E13, the display region of the left facing arrow key K14 thereof corresponds to the element bag portion E14 and the display region of the upward facing arrow key K15 thereof corresponds to the element bag portion E15. Further, the display region of the right facing arrow key K16 thereof corresponds to the element bag portion E16 and the display region of the downward facing arrow key K17 thereof corresponds to the element bag portion E17. When the slide operation or the press operation is executed, the respective display regions enable the concave and convex touch feeling to be given to the operator's finger.

Then, the CPU 32 executes the application #A at step ST4. The application #A is such a processing for inputting the information by operating, for example, the key K1 of numeral "1" to the key K10 of numeral "0", the key K11 of symbol "*", the key K12 of symbol "#" or the like, the key K13 of determination "O" of the cross key, the left facing arrow key K14 thereof, the upward facing arrow key K15 thereof, the right facing arrow key K16 thereof or the downward facing arrow key K17 thereof.

Thereafter, the process shifts to step ST5 where the CPU 32 judges an end of the application #A. If there is no end-instruction of the application #A, the process returns to the step ST4 where the display unit 29 continues the display of an operation panel image relating to the application #A. If there is the end-instruction of the application #A, the process shifts to step ST6 where the CPU 32 transmits the instruction data D to the air-circulation unit 3 so as to control stopping the piezoelectric unit 315. At this time point, the display of the operation panel image relating to the application #A may be changed to, for example, a menu screen or the like. Thereafter, the process shifts to step ST13.

If the application execution instruction other than the execution instruction of the application #A is set at the above-mentioned step ST2, the process shifts to step ST7. At the step ST7, the CPU 32 branches the control thereof depending on whether the application execution instruction is an execution instruction of the application #B or an execution instruction of the other application. If the application execution instruction is the application #B, the process shifts to step ST8 where the CPU 32 reads the control information of the application #B. The CPU 32 controls the display unit 29 so as to change over the display based on the control information.

At that time, the CPU 32 outputs an image signal Sv based on the control information to the display unit 29. On the display unit 29, there are displayed the icon images of the key K18 of "etc", the key K19 of "REW", the left facing arrow stop key K20, the right facing arrow stop key K21, the left facing fast-forward key K22, the fast-forward key K23, the reproduction key K24 and the stop key K25, which form the icon images of the second group, and at the same time, the video of the reproduction application or the like (referred to as FIG. 19B).

Also, the CPU 32 outputs the instruction data D based on the control information to the air-circulation unit 3. The air-circulation unit 3 executes a changeover control so as to open the valve body 305 and to shut off the valve body 304 based on the instruction data D in order to select the flow channel 2b. The blower 3b sends the air to the flow channel 2b selected by the flow channel changeover unit 3a. The piezoelectric unit 315 constituting the blower 3b adjusts an amount of the air. The piezoelectric unit 315 is controlled by the instruction data D inputted from the CPU 32. This control enables the concave and convex touch feeling of the eight element bag portions E18 to E25 of the second group to be changed.

In this embodiment, the display region of the key K18 of "etc" corresponds to the element bag portion E18 shown in FIG. 18 and similarly, the display region of the key K19 of "REW" corresponds to the element bag portion E19. The display region of the left facing arrow stop key K20 corresponds to the element bag portion E20, the display region of the right facing arrow stop key K21 corresponds to the element bag portion E21 and the display region of the left facing fast-forward key K22 corresponds to the element bag portion E22. Further, the display region of the fast-forward key K23 corresponds to the element bag portion E23, the display region of the reproduction key K24 corresponds to the element bag portion E24, and the display region of the stop key K25 corresponds to the element bag portion E25. When the slide operation or the press operation is executed, the respective display regions enable the concave and convex touch feeling to be given to the operator's finger.

Then, the CPU 32 executes the application #B at step ST9. The application #B is the processing for reproducing video information by operating, for example, the key K18 of "etc", the key K19 of "REW", the left facing arrow stop key K20, the right facing arrow stop key K21, the left facing fast-forward key K22, the fast-forward key K23, the reproduction key K24 or the stop key K25.

Thereafter, the process shifts to step ST10 where the CPU 32 judges an end of the application #B. If there is no end-instruction of the application #B, the process returns to the step ST9 where the display unit 29 continues the operation panel display relating to the application #B. If there is the end instruction of the application #B, the process shifts to step ST11 where the CPU 32 transmits the instruction data D to the air-circulation unit 3 so as to control stopping the piezoelectric unit 315. Thereafter, the process shifts to step ST13.

It should be noted that if the application execution instruction other than the applications #A and #B is set at the step ST7, then the process shifts to step ST12. The other application is executed at the step ST12. In the processing in this other application, for example, a waiting image or the like is displayed on the display unit 29 by changing over the display screen. Also, the air-circulation unit 3 does not select any of the flow channels 2a and 2b, so that the changeover control for shutting off the valve body 304 and the valve body 305 is executed based on the instruction data D. The piezoelectric unit 315 stops the driving thereof based on the instruction data D inputted from the CPU 32. This control enables any of the twenty five element bag portions E1 to E25 of the first and second groups to lose the concave and convex touch feeling.

Thereafter, the process shifts to step ST13 where the end of the input processing in the mobile phone 600 is judged. For example, the CPU 32 detects power-OFF information. If the power-OFF information is not detected, the process returns to the step ST1 where the above-mentioned processing is repeated. If the power-OFF information is detected, the input processing in the mobile phone 600 ends.

In this manner, the mobile phone 600 as the third embodiment is provided with the embodiment of the input device 300 so that it becomes possible to provide a structure in which the convex and concave shape or the pressure changes on the operation screen corresponding to the applications #A and #B with respect to the slide operation or the press operation of the user's finger. Consequently, the operation panel building mode (icon image+sense-of-touch-representing unit) can be executed by the sense of touch representation function depending on the touch-sensitive variable sheet unit 103 and by the display function of the icon image of the display unit 29, so that it becomes possible to provide the mobile phone 600 with the programmable touch-sensitive variable sheet function for the icon touch. Moreover, it is possible to improve miniaturization and operability of the input device 300, thereby enabling the reduction of the miss-operation, the cost down and the simplification of the manufacturing process of the mobile phone 600 to be realized.

Although, in this embodiment, a case of the touch-sensitive variable sheet unit 103 having the twenty five element bag portions E1 to E25 has been described with respect to the touch-sensitive sheet member, it is not limited to this; the touch-sensitive variable sheet unit having twenty five apertures p1 to p25 for presenting a sense of touch at predetermined positions of the base member 1 may be constituted. Then, even if the sense of touch given to the operator's finger 30*a* is changed by sending the air to these apertures p1 to p24 from the blower 3*b*, by feed-back controlling this blower 3*b* by the piezoelectric unit 315 and the CPU 32, and by adjusting an amount of the air blown out of the aperture p1 to p24, the similar effect can be obtained.

Embodiment 4

Figure 24:
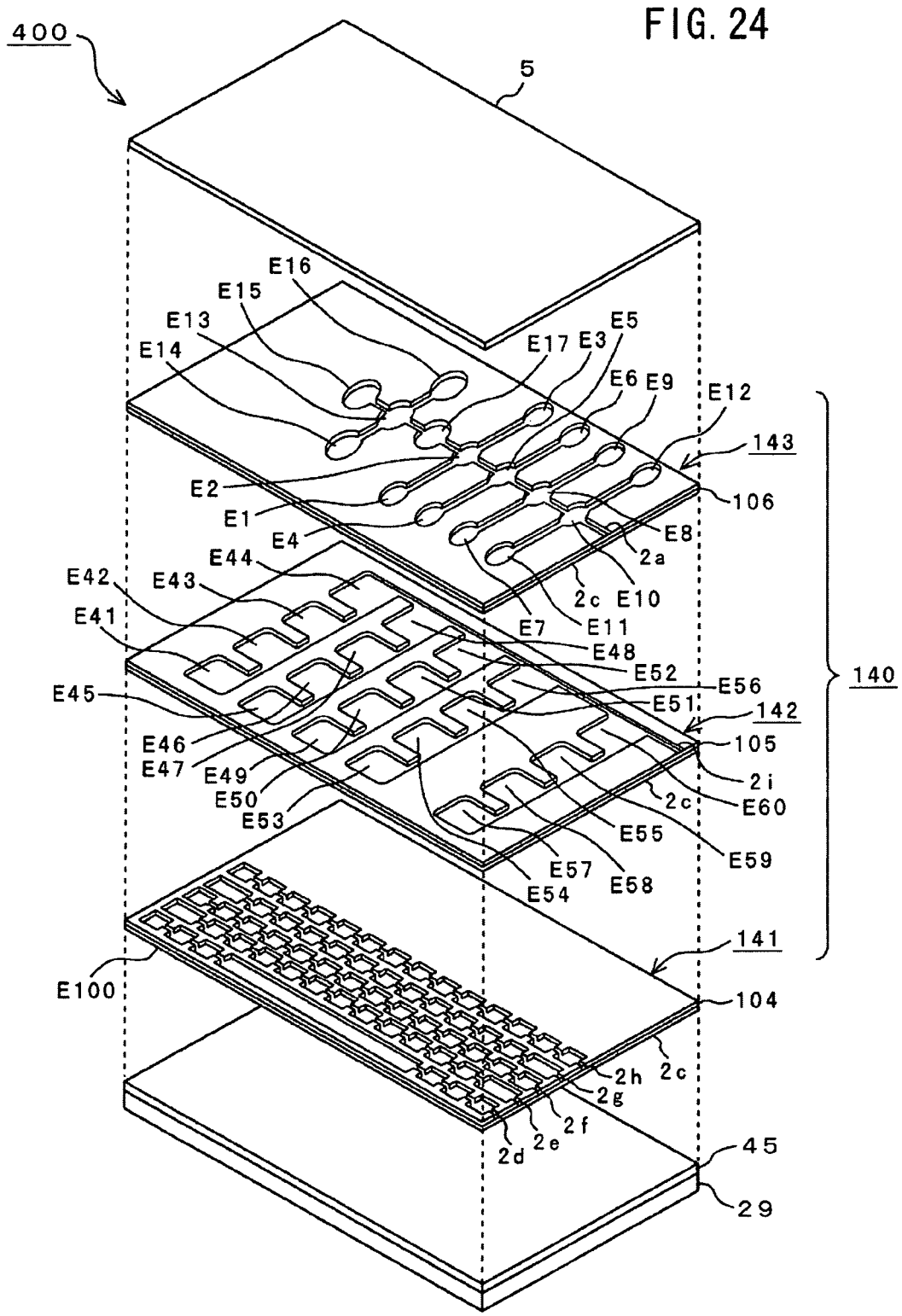
FIG. 24 is an exploded perspective view of an input device 400 as a fourth embodiment, to which a touch-sensitive sheet member is applied, for showing a configuration of the input device 400.

FIG. 24 shows a configuration of an input device 400 as a fourth embodiment, to which an embodiment of a touch-sensitive sheet member is applied. In this embodiment, an input device 400 is provided in which the element bag portion is arranged by dividing it into three layers each forming the icon images of one of respective three groups in different planes on the display unit 29, which is different from the third embodiment, and it is possible to execute the operation panel building mode which can select the element bag portions of the group corresponding to the icon images from the above-mentioned three groups.

The input device 400 shown in FIG. 24 is a device for inputting information by the slide and/or the pushdown operation depending on the finger or the like of the operator 30 (operation body). The input device 400 contains a display unit 29, an input detection unit 45 and a transparent layered sheet unit 140 by which a sense of touch is changed. These units are layered in this order. Particularly, the input detection unit 45 and the layered sheet unit 140 are provided on the display unit 29.

The layered sheet unit 140 constitutes the touch-sensitive sheet member. In the layered sheet unit 140, a touch-sensitive variable sheet unit 141 of a first layer, a touch-sensitive variable sheet unit 142 of a second layer and a touch-sensitive variable sheet unit 143 of a third layer are layered in this order from the downward. The bag structure of the embodiment of the touch-sensitive sheet member 200 is applied to the layered sheet unit 140.

The display unit 29 displays a plurality of push button switch images for the first to third layers respectively at a time of the input operation. The contents of the push button switch images constitute the icon images for the input operation. A key array K100 for a key board or the like is displayed on the display unit 29 as the push button switch image for the first layer. In this embodiment, the icon images are displayed corresponding to the arrangement of the key array including the characters of the numerals, the alphabet and the like in which the operation keys are lined up in five lines toward the backward from the just front.

The push button switch image for the second layer includes twenty keys K41 to K60 or the like for various kinds of function selections. The icon images of, for example, the Internet, a calendar, a camera, a calculator, a music, a telephone, a multimedia, user data, an album, various kinds of settings, a timer, a television, a Web, a wake-up call and the like are displayed on the display unit 29.

The push button switch image for the third layer includes the icon images of the key K1 of numeral "1" to the key K10 of numeral "0", the key K11 of symbol "*", the K12 of symbol "#" or the like, the key K13 of determination "O" constituting the cross key, the left facing arrow key K14 thereof, the upward facing arrow key K15 thereof, the right facing arrow key K16 thereof, the downward facing arrow key K17 thereof or the like, which is similarly as the third embodiment and are displayed on the display unit 29. As the display unit 29, a liquid crystal display device (LCD device) is used.

Similarly as the third embodiment, the input detection unit 45 is provided on the upper portion of the display unit 29 and operates so as to detect the slide position and pressing force of the operator's finger or the like. For the input detection unit 45, as explained in the third embodiment, an input device having a constitution which can give the position detection information and the press detection information to a control system is used. For example, a capacitive touch panel, a resistive touch panel, an input device of surface acoustic wave system (SAW) or optical system, or multi-stage system tact switch or the like is used.

The transparent touch-sensitive variable sheet unit 141 for the first layer is provided on the upper portion of the input detection unit 45. The touch-sensitive variable sheet unit 141 is provided so as to cover the whole of the input detection unit 45 and is pushed-down and operated along the operation surface of the display unit 29. In this embodiment, the touch-sensitive variable sheet unit 141 has a substrate 2*c* and at the upper portion thereof, a base member 104 having predetermined hardness and a plurality of rectangular dish shaped concave portions (hereinafter, referred to as element bag portion array E100) and a plurality of flow channels 2*d* to 2*h*. In this embodiment, the element bag portion array E100 is arranged corresponding to the arrangement of the key array (including the characters of the numerals, the alphabet and the like) in which the operation keys are lined up in five lines toward the backward from the just front.

In the base member 104, for example, a flow channel 2*d* is arranged corresponding to the operation keys of the first line. A flow channel 2*e* is arranged corresponding to the operation keys of the second line. A flow channel 2*f* is arranged corresponding to the operation keys of the third line. A flow channel 2*g* is arranged corresponding to the operation keys of the fourth line. A flow channel 2*h* is arranged corresponding to the operation keys of the fifth line. It is needless to say that the touch-sensitive variable sheet unit 141 may cover a portion of the input detection unit 45. In this embodiment, the upper portion of the base member 104 is sealed in (covered) by the substrate 2*c*, which becomes a lid, of the touch-sensitive variable sheet unit 142 of the second layer on the rear surface side thereof in order to improve the air-tightness. In this manner, the element bag portion array E100 is constituted of the base member 104 and the substrate 2*c* of the touch-sensitive variable sheet unit 142.

On the upper portion of the above-mentioned touch-sensitive variable sheet unit 141, the touch-sensitive variable sheet unit 142 is arranged. The touch-sensitive variable sheet unit 142 includes a substrate 2*c* and on the upper portion thereof, a base member 105 having predetermined hardness and twenty rectangular dish shaped element bag portions E41 to E60 and a flow channel 2*i*. In this embodiment, the element bag portions E41 to E60 are arranged at positions corresponding to the icon images of the Internet, the calendar, the camera, the calculator, the music, the telephone, the multimedia, the user data, the album, various kinds of the settings, the timer, the television, the Web, the wake-up call and the like. The upper portion of this base member 105 is also sealed in by the substrate 2*c*, which becomes a lid, of the touch-sensitive variable sheet unit 143 of the second layer on the rear surface side thereof in order to improve the air-tightness. In this manner, the element bag portions E41 to E60 are constituted of the base member 105 and the substrate 2c of the touch-sensitive variable sheet unit 143.

On the upper portion of the above-mentioned touch-sensitive variable sheet unit 142, the touch-sensitive variable sheet unit 143 is arranged. The touch-sensitive variable sheet unit 143 includes a substrate 2c thereof and the upper portion thereof, a base member 106 having predetermined hardness and seventeen elliptical dish shaped element bag portions E1 to E17 and a flow channel 2a. In this embodiment, the element bag portions E1 to E12 are arranged at positions corresponding to the icon images of the keys of numeral "0" to numeral "9", the keys of symbol "*", symbol "#" and the like, and the element bag portions E13 to E17 are arranged at positions corresponding to the icon images of the cross key and the like.

In this embodiment, the upper portion of the base member 106 is sealed in (covered) by a film portion 5 for a sheet shaped lid in order to improve the air-tightness. As the film portion 5, there is used a transparent material with transmissivity and a refractive index which is approximately equal to the transmissivity and refractive index of the base member 101. For example, a zeonor (trademark) of the film thickness of around 25 [μm] is used. The hardness thereof is around 20° to 40°. In this manner, the seventeen element bag portions E1 to E17 are constituted of the base member 106 and the film portion 5.

Figure 25A:
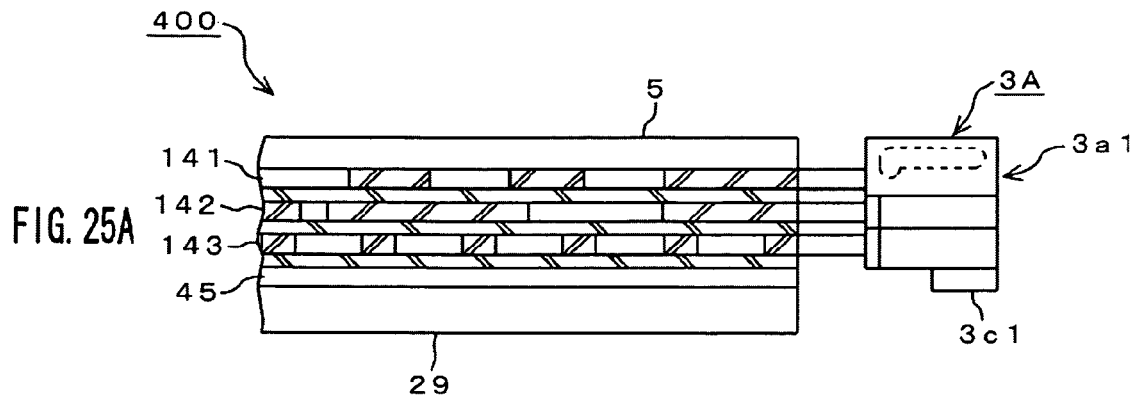
FIGS. 25A and 25B are front and plan views of the input device 400 including partial cross-sections for showing an air supply example thereof.
Figure 25B:
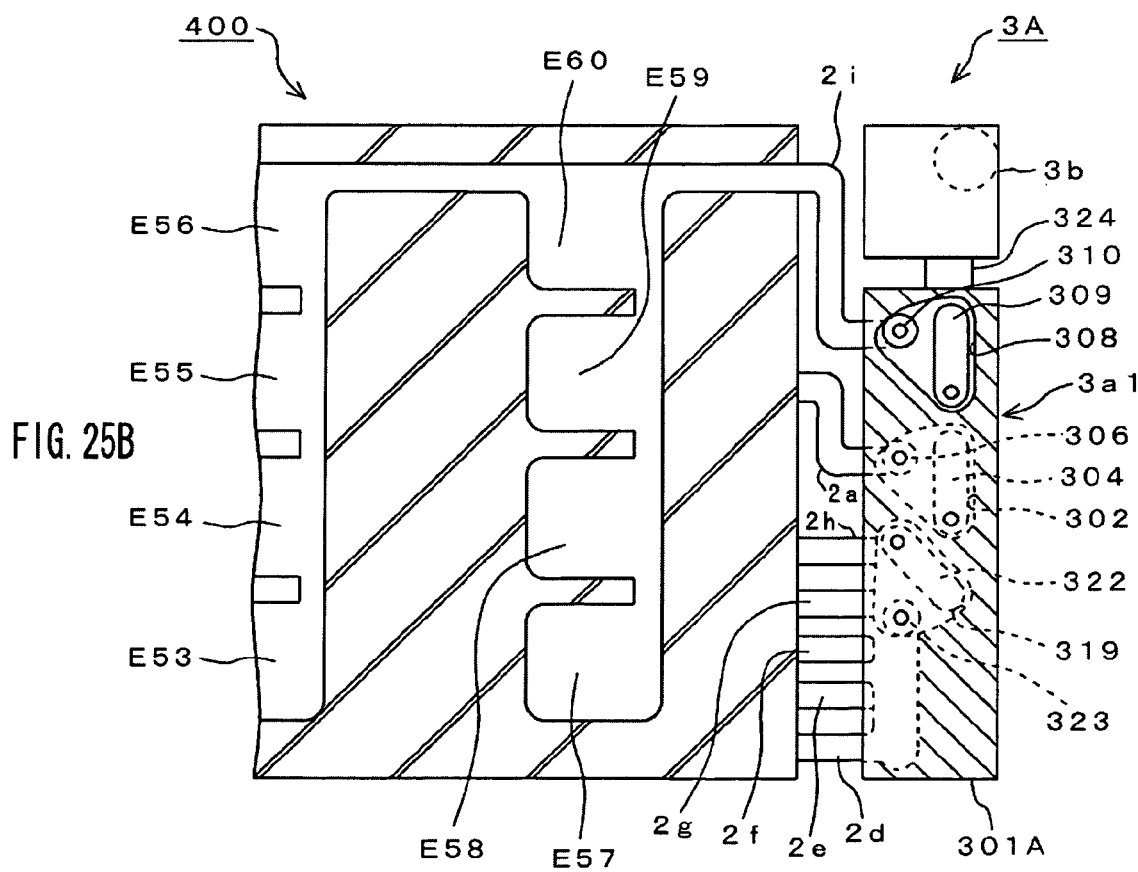

An air-circulation unit 3A as shown in FIG. 25A is connected to the above-mentioned seven flow channels 2a, 2d to 2i of the three layered touch-sensitive variable sheet units 141 to 143. FIGS. 25A and 25B show an air supply example in the input device 400. The input device 400 shown in FIG. 25A includes the display unit 29, the input detection unit 45, the layered sheet unit 140 and the air-circulation unit 3A. The air-circulation unit 3A operates so as to send air to the flow channels 2d to 2h of the touch-sensitive variable sheet unit 141 of the first layer, the flow channel 2i of the touch-sensitive variable sheet unit 142 of the second layer or the flow channel 2a of the touch-sensitive variable sheet unit 143 of the third layer. In this embodiment, the air-circulation unit 3A has a programmable function for sending the air to the three layered touch-sensitive variable sheet units 141 to 143, for every layer, which constitute the layered sheet unit 140. Also in this embodiment, for the air-circulation unit 3A, the blower 3b (air pressure generator) using a piezoelectric device is used.

FIG. 25B is a plan view of the touch-sensitive variable sheet unit 142 of the second layer of the input device 400 and a valve changeover unit 308 for the second layer in a flow channel changeover unit 3A for showing configurations thereof. The air-circulation unit 3A shown in FIG. 25B includes the flow channel changeover unit 3a1 and the blower 3b. The blower 3b having the piezoelectric unit 315 is used. The blower 3b is connected to the seven flow channels 2a, 2d to 2i through the flow channel changeover unit 3a1 as shown in FIG. 25B.

The blower 3b sends compressed air to the element bag portion array E100 of the touch-sensitive variable sheet unit 141 through the flow channel changeover unit 3a1 and the five flow channels 2d to 2h, sends compressed air to the twenty element bag portions E41 to E60 of the touch-sensitive variable sheet unit 142 through the flow channel changeover unit 3a1 and the flow channel 2i and sends compressed air to the seventeen element bag portions E1 to E17 of the touch-sensitive variable sheet unit 143 through the flow channel changeover unit 3a1 and the flow channel 2a.

The flow channel changeover unit 3a1 includes a valve core portion 301A, valve changeover units 302, 308, 319, valve bodies 304, 309, 322 and the like. The valve core portion 301A has, for example, a rectangular sectional shape and is composed of a core member in which a resin or a light metal is molded by a die.

The valve changeover units 302, 308, 319 each having a fan shape are provided in the valve core portion 301A. An air-intake tube 324 which communicates to the blower 3b is provided on the valve changeover units 302, 308, 319 and takes air therein from the blower 3b. The valve changeover unit 302 contains the valve body 304 and the air-exhaust port 306. The valve body 304 operates so as to shut off or so as to open the air-exhaust port 306 by obtaining the drive-power of the driving unit 3c1 of a motor, a solenoid or the like. The air-exhaust port 306 communicates to the flow channel 2a. The driving unit 3c1 is provided, for example, on the rear surface side of the valve core portion 301A.

The valve changeover unit 308 contains the valve body 309 and an air-exhaust port 310. The valve body 309 operates so as to shut off or so as to open the air-exhaust port 310 by obtaining the drive-power of the driving unit 3c1. The air-exhaust port 310 communicates to the flow channel 2i.

The valve changeover unit 319 contains the valve body 322 and an air-exhaust port 323. The valve body 322 operates so as to shut off or so as to open the air-exhaust port 323 by obtaining the drive-power of the driving unit 3c1. The air-exhaust port 323 communicates to the flow channels 2d to 2h. As each of the valve bodies 304, 309, 322, a plate rubber sheet member having a long oval shape is used. It should be noted that members having the same name and numeral as those of the first embodiment have the same functions as those of the first embodiment, so that the explanation thereof will be omitted.

In the embodiment, when the valve body 304 is opened through the driving unit 3c, the air supplied from the blower 3b is introduced to the seventeen element bag portions E1 to E17 of the touch-sensitive variable sheet unit 143 by passing through the air-exhaust port 306 and the flow channel 2a.

When the valve body 309 is opened, the air supplied from the blower 3b is introduced to the twenty pieces of the element bag portions E41 to E52 (referred to as FIG. 24) and the element bag portions E53 to E60 of the touch-sensitive variable sheet unit 142 by passing through the air-exhaust port 310 and the flow channel 2i. Further, when the valve body 322 is opened, the air supplied from the blower 3b is introduced to the element bag portion array E100 (referred to as FIG. 24) and the element bag portions E53 to E60 of the touch-sensitive variable sheet unit 141 by passing through the air-exhaust port 323 and the flow channels 2d to 2h. It should be noted that when the valve bodies 304, 309, 322 are shut off at the same time, the air supply to all of the element bag portions E1 to E17, the element bag portions E41 to E60 and the element bag portion array E100 of the layered sheet unit 140 stops.

Accordingly, it is possible to constitute the programmable air-circulation unit 3A for sending the air to the flow channels 2d to 2h of the touch-sensitive variable sheet unit 141 of the first layer, the flow channel 2i of the touch-sensitive variable sheet unit 142 of the second layer or the flow channel 2a of the touch-sensitive variable sheet unit 143 of the third layer. This enables the element bag portions E1 to E17, the element bag portions E41 to E60 or the element bag portion array E100 and the like to be filled up with the air supplied from the air-circulation unit 3A by passing through the flow channels 2a, 2d to 2i in the input device 400 shown in FIG. 24.

Figure 26A:
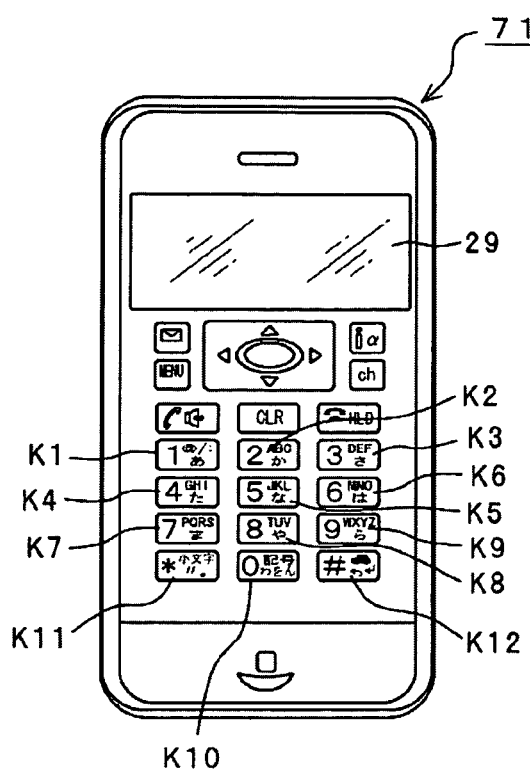
FIGS. 26A to 26C are plan views of mobile phones 710 in each of which the input device 400 is mounted for showing display examples of operation panel images.
Figure 26B:
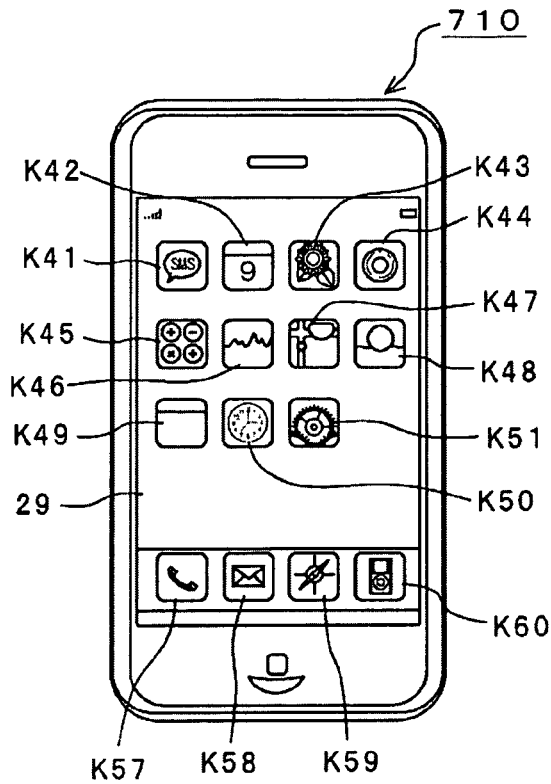
Figure 26C:
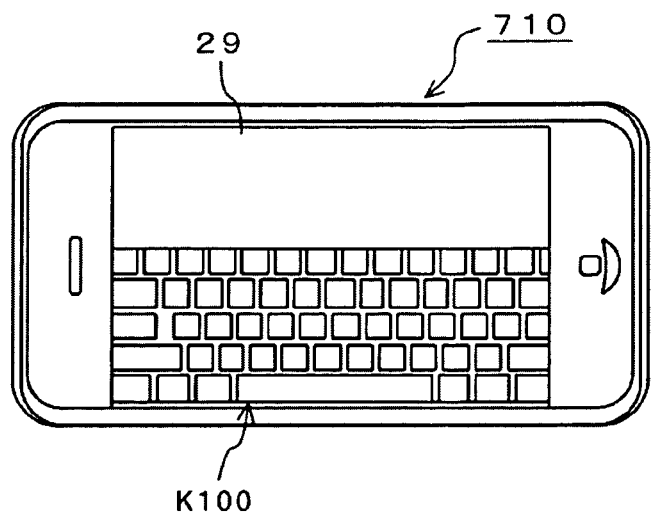

FIGS. 26A to 26C show display examples of operation panel images in mobile phones 710, in each of which the input device 400 is mounted. The mobile phone 710 shown in FIG. 26A is used in the vertically wide manner and according to the mobile phone 710, the key K1 of numeral "1" to the key K10 of numeral "0", the key K11 of symbol "*", the key K12 of symbol "#" or the like, the key K13 of determination "O" of the cross key, the left facing arrow key K14 thereof, the upward facing arrow key K15 thereof, the right facing arrow key K16 thereof, the downward facing arrow key K17 thereof, which form the icon images of the application #1, are displayed as the operation screen on the display unit 29 including the operation surface.

In this embodiment, the display region of the key K1 of numeral "1" corresponds to the element bag portion E1 shown in FIG. 24, and similarly, the display region of the key K2 of numeral "2" corresponds to the element bag portion E2 shown in FIG. 24. The display region of the key K3 of numeral "3" corresponds to the element bag portion E3 shown in FIG. 24. The display region of the key K4 of numeral "4" corresponds to the element bag portion E4 shown in FIG. 24. The display region of the key K5 of numeral "5" corresponds to the element bag portion E5 shown in FIG. 24. The display region of the key K6 of numeral "6" corresponds to the element bag portion E6 shown in FIG. 24. The display region of the key K7 of numeral "7" corresponds to the element bag portion E7 shown in FIG. 24. The display region of the key K8 of numeral "8" corresponds to the element bag portion E8 shown in FIG. 24. The display region of the key K9 of numeral "9" corresponds to the element bag portion E9 shown in FIG. 24. The display region of the key K10 of numeral "0" corresponds to the element bag portion E10 shown in FIG. 24. The respective display regions enable the concave and convex touch feeling to be given to the operator's finger when the slide operation or the press operation is executed.

Further, the display region of the key K11 of symbol "*" corresponds to the element bag portion E11 shown in FIG. 24 and the display region of the key K12 of symbol "#" corresponds to the element bag portion E12. The respective display regions enable the concave and convex touch feeling to be given to the operator's finger. Similarly, the display region of the key K13 of determination "O" which forms the cross key corresponds to the element bag portion E13, the display region of the left facing arrow key K14 thereof corresponds to the element bag portion E14 and the display region of the upward facing arrow key K15 thereof corresponds to the element bag portion E15. Further, the display region of the right facing arrow key K16 thereof corresponds to the element bag portion E16 and the display region of the downward facing arrow key K17 thereof corresponds to the element bag portion E17. When the slide operation or the press operation is executed, the respective display regions enable the concave and convex touch feeling to be given to the operator's finger. The concave and convex touch feeling on the icon image of such a application #1 occurs based on a fact in which the air-circulation unit 3A is controlled such that the flow channel changeover unit 3a1 shown in FIG. 25B selects the flow channel 2a to send the air to the touch-sensitive variable sheet unit 143 having the base member 106 which is concurrently used as the flow channel panel.

According to the mobile phone 710 shown in FIG. 26B, the key images of the Internet, the calendar, the camera, the calculator, the music, the telephone, the multimedia, the user data, the album, various kinds of the settings, the timer, the television, the Web, the wake-up call or the like, which form the icon images of the application #2, are displayed as the operation screen on the display unit 29 including the operation surface. In this embodiment, the element bag portions E41 to E60 are arranged at positions corresponding to the icon images of the Internet, the calendar, the camera, the computer, the music, the telephone, the multimedia, the user data, the album, various kinds of the settings, the timer, the television, the Web, the wake-up call or the like. When the slide operation or the press operation is executed, the operator's finger obtains respective concave and convex touch feelings. The concave and convex touch feeling on the icon image of such a application #2 occurs based on a fact in which the air-circulation unit 3A is controlled such that the flow channel changeover unit 3a1 shown in FIG. 25B selects the flow channel 2i to send the air to the touch-sensitive variable sheet unit 142 having the base member 105 which is concurrently used as the flow channel panel.

The mobile phone 710 shown in FIG. 26C is used in the horizontally wide manner, and according to the mobile phone 710, the key array K100 for the key board which forms the icon images of the application #3 is displayed as the operation screen on the display unit 29 including the operation surface. The image of the key array K100 includes the characters of the numerals, the alphabet or the like in which the operation keys are lined up in five lines toward the backward from the just front. In this embodiment, the element bag portion array E100 is arranged at the position corresponding to the icon image of the key array in which the operation keys for the key board are lined up in five lines toward the backward from the just front. The respective concave and convex touch feelings are obtained when the slide operation or the press operation is executed.

The concave and convex touch feeling on the icon image of such a application #3 occurs based on a fact in which the air-circulation unit 3A is controlled such that the flow channel changeover unit 3a1 shown in FIG. 25B selects the flow channels 2d to 2h to send the air to the touch-sensitive variable sheet unit 141 having the base member 104 which is concurrently used as the flow channel panel.

In this embodiment, when touch-typing the key array K100 for the key board which forms the icon images of the application #3, it is possible to obtain the sense of touch that the finger 30a feels. Further, even when the key top that has not a plane surface (for example, such as a dome shape) is pushed down, it is possible to obtain the representation of the sense of touch that the finger 30a feels. Also, it becomes possible to realize the shape representation in which the sense of touch is used on the operation screen and also, the position on the operation key screen for the sense of touch representation may change depending on the states of the applications #1 to #3.

Figure 27:
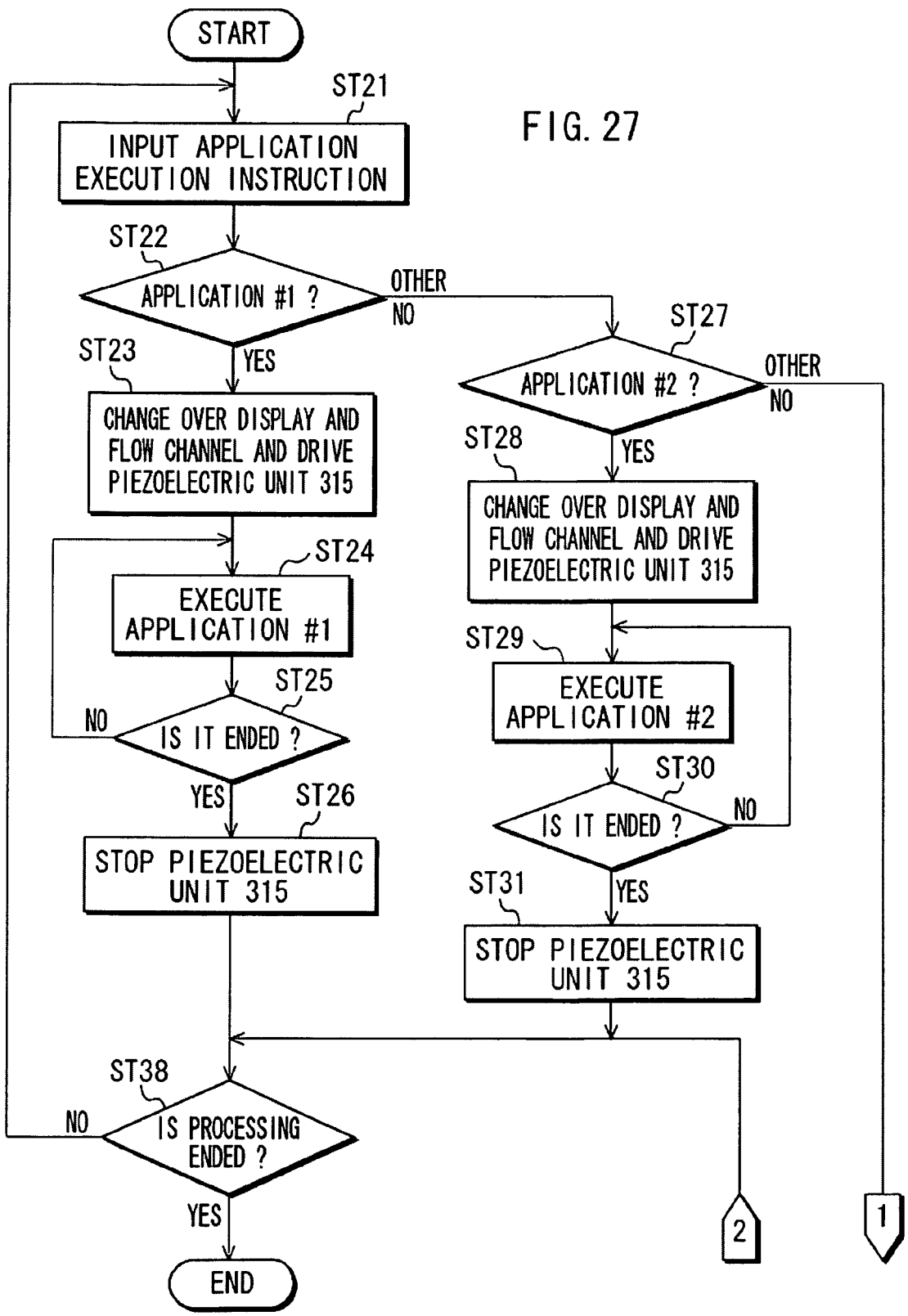
FIG. 27 is a flowchart showing a control example (No. 1) of a display unit and a layered sheet unit for representing a sense of touch in the mobile phone 710 at a time of execution of application.
Figure 28:
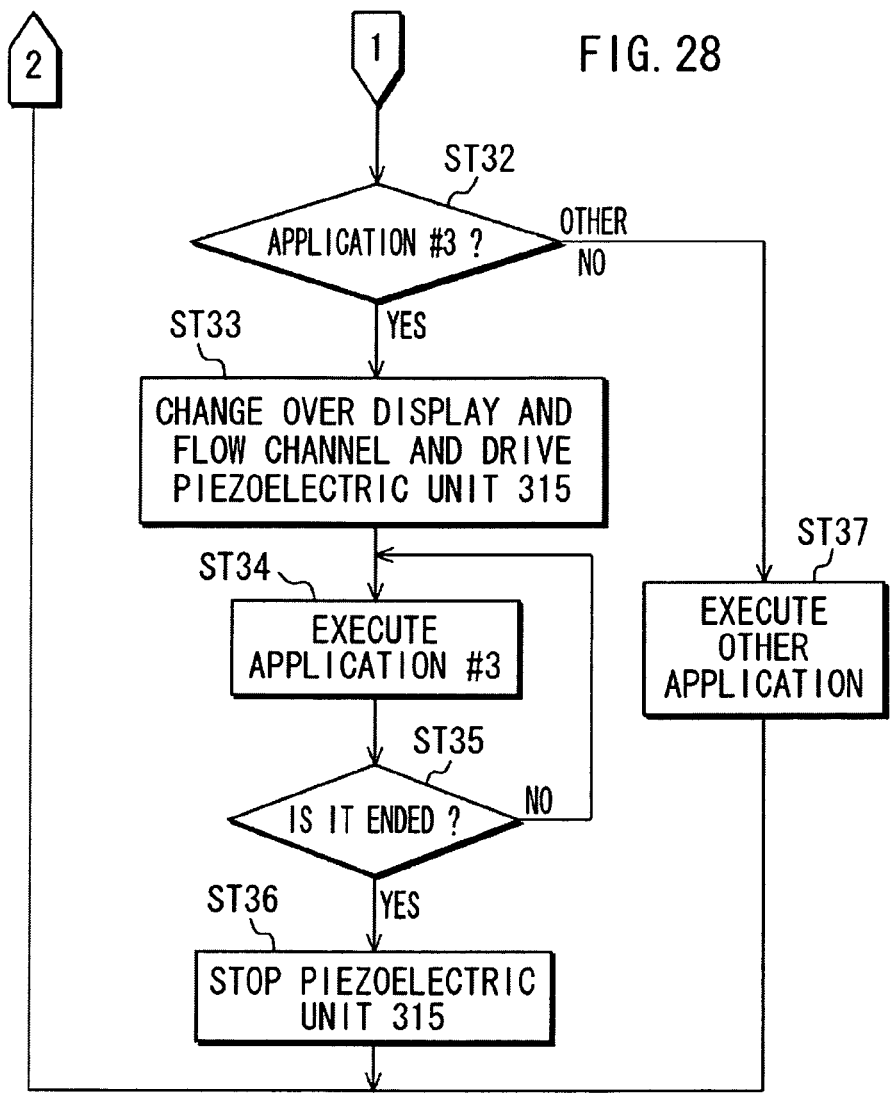
FIG. 28 is a flowchart showing the control example (No. 2) of the display unit and the layered sheet unit for representing the sense of touch in the mobile phone 710 at a time of the execution of application.

The following will describe an information processing example in the mobile phone 710. FIG. 27 and FIG. 28 show a control example (Nos. 1 and 2) of the display unit and the layered sheet unit 140 for representing a sense of touch in the mobile phone 710 at a time of the execution of the application.

In this example, there is cited a case in which, based on the selection of the applications #1 to #3, the mobile phone 710 mounted with the input device 400 displays any of the operation screens shown in FIGS. 26A to 26C and at the same time, by linking with this display, the sense-of-touch-representing unit is built by sending the air to the element bag portions E1 to E17, the element bag portions E41 to E60 or the element bag portion array E100 in the touch-sensitive variable sheet units 141 to 143 (operation panel building mode).

In this example, a case is illustrated in which a selection candidate is changed over in order of the application #1→the application #2→the application #3 with respect to the operation panel building mode based on an application execution instruction. It is needless to say that the CPU 32 for controlling the layered sheet unit 140 for presenting a sense of touch controls the air-circulation unit 3A so as to supply the air to the three layered element bag portions E1 to E25 for presenting a sense of touch of the layered sheet unit 140 corresponding to the image contents displayed on the display unit 29, and the touch-sensitive variable sheet units 141 to 143 are available at predetermined positions of the base members 104, 105, 106 corresponding to the image contents.

By setting these as the operation panel changeover condition, the CPU 32 inputs the application execution instruction at step ST21 of the flowchart shown in FIG. 27. The application execution instruction is given to the CPU 32, for example, by making power switch-ON information as a trigger. Thereafter, the process shifts to step ST22 where the CPU 32 branches the control thereof depending on whether the application execution instruction is an execution instruction of the application #1 or other application execution instruction. If the application execution instruction is the application #1, the process shifts to step ST23 where the CPU 32 reads the control information of the application #1. The control information is made correspondence with the application #1, the application #2, the application #3 or the like beforehand. The CPU 32 controls the display unit 29 so as to change over the display thereof based on the control information.

At that time, the CPU 32 outputs an image signal Sv to the display unit 29 based on the control information. The display unit 29, based on the image signal Sv, displays the icon images of the key K1 of numeral "1" to the key K10 of numeral "0", the key K11 of symbol "*", the key K12 of symbol "#" or the like, the key K13 of determination "O" of the cross key, the left facing arrow key K14 thereof, the upward facing arrow key K15 thereof, the right facing arrow key K16 thereof and the downward facing arrow key K17 thereof, which form the icon images of the first group (referred to as FIG. 26A).

Also, the CPU 32 outputs the instruction data D based on the control information to the air-circulation unit 3A of the input device 400. The air-circulation unit 3A executes a changeover control so as to open the valve body 304 or so as to shut off the valve bodies 309, 322 based on the instruction data D in order to select the flow channel 2a of the touch-sensitive variable sheet unit 143. The blower 3b sends the air to the flow channel 2a selected by the flow channel changeover unit 3a1. The piezoelectric unit 315 constituting the blower 3b adjusts an amount of the air. The piezoelectric unit 315 is controlled by the instruction data D inputted from the CPU 32. This control enables the concave and convex touch feeling of the seventeen element bag portions E1 to E17 of the positions corresponding to the icon images of the application #1 to change.

In this example, the display region of the key K1 of numeral "1" corresponds to the element bag portion E1 shown in FIG. 24, and similarly, the display region of the key K2 of numeral "2" corresponds to the element bag portion E2 shown in FIG. 24. The display region of the key K3 of numeral "3" corresponds to the element bag portion E3 shown in FIG. 24. The display region of the key K4 of numeral "4" corresponds to the element bag portion E4 shown in FIG. 24. The display region of the key K5 of numeral "5" corresponds to the element bag portion E5 shown in FIG. 24. The display region of the key K6 of numeral "6" corresponds to the element bag portion E6 shown in FIG. 24. The display region of the key K7 of numeral "7" corresponds to the element bag portion E7 shown in FIG. 24. The display region of the key K8 of numeral "8" corresponds to the element bag portion E8 shown in FIG. 24. The display region of the key K9 of numeral "9" corresponds to the element bag portion E9 shown in FIG. 18. The display region of the key K10 of numeral "0" corresponds to the element bag portion E10 shown in FIG. 24. The respective display regions enable the concave and convex touch feeling to be given to the operator's finger when the slide operation or the press operation is executed.

Further, the display region of the key K11 of symbol "*" corresponds to the element bag portion E11 shown in FIG. 24 and the display region of the key K12 of symbol "#" corresponds to the element bag portion E12. The respective display regions enable the concave and convex touch feeling to be given to the operator's finger. Similarly, the display region of the key K13 of determination "O" which forms the cross key corresponds to the element bag portion E13, the display region of the left facing arrow key K14 thereof corresponds to the element bag portion E14 and the display region of the upward facing arrow key K15 thereof corresponds to the element bag portion E15. Further, the display region of the right facing arrow key K16 thereof corresponds to the element bag portion E16 and the display region of the downward facing arrow key K17 thereof corresponds to the element bag portion E17. When the slide operation or the press operation is executed, the respective display regions enable the concave and convex touch feeling to be given to the operator's finger.

Then, the CPU 32 executes the application #A at step ST24. The application #A is such a processing for inputting the information by operating, for example, the key K1 of numeral "1" to the key K10 of numeral "0", the key K11 of symbol "*", the key K12 of symbol "#" or the like, the key K13 of determination "O" of the cross key, the left facing arrow key K14 thereof, the upward facing arrow key K15 thereof, the right facing arrow key K16 thereof or the downward facing arrow key K17 thereof.

Thereafter, the process shifts to step ST25 where the CPU 32 judges an end of the application #A. If there is no end-instruction of the application #A, the process returns to the step ST24 where the display unit 29 continues the display of an operation panel image relating to the application #A. If there is the end-instruction of the application #A, the process shifts to step ST26 where the CPU 32 transmits the instruction data D to the air-circulation unit 3A so as to control stopping the piezoelectric unit 315. At this time point, the display of the operation panel image relating to the application #A may be changed to, for example, a menu screen or the like. Thereafter, the process shifts to step ST38.

If the application execution instruction other than the application #1 is set at the above-mentioned step ST22, the process shifts to step ST27. At the step ST27, the CPU 32 branches the control thereof depending on whether the application execution instruction is an execution instruction of the application #2 or an execution instruction of other application. If the application execution instruction is an execution instruction of the application #2, the process shifts to step ST28 where the CPU 32 reads the control information of the application #2. The CPU 32 controls the display unit 29 so as to change over the display based on the control information.

At that time, the CPU 32 outputs an image signal Sv based on the control information to the display unit 29. The display unit 29 displays the key images of the Internet, the calendar, the camera, the calculator, the music, the telephone, the multimedia, the user data, the album, various kinds of the settings, the timer, the television, the Web, the wake-up call or the like, which form the icon images of the application #2, as the operation screen (referred to as FIG. 26B).

Also, the CPU 32 outputs the instruction data D based on the control information to the air-circulation unit 3A. The air-circulation unit 3A executes the changeover control so as to open the valve body 309 or so as to shut off the valve bodies 304, 322 based on the instruction data D in order to select the flow channel 2*i*. The blower 3*b* sends the air to the flow channel 2*b* selected by the flow channel changeover unit 3*a*1. The piezoelectric unit 315 constituting the blower 3*b* adjusts an amount of the air. The piezoelectric unit 315 is controlled by the instruction data D inputted from the CPU 32. This control enables the concave and convex touch feeling of the twenty element bag portions E41 to E60 corresponding to the icon images of the application #2 to be changed.

Then, the CPU 32 executes the application #2 at step ST29. The application #2 processes the information by operating, for example, the twenty keys K41 to K60 for various kinds of function selection operations corresponding to the icon images of the Internet, the calendar, the camera, the calculator, the music, the telephone, the multimedia, the user data, the album, various kinds of the settings, the timer, the television, the Web, the wake-up call and the like. When the slide operation or the press operation is executed, the respective concave and convex touch feelings are obtained.

Thereafter, the process shifts to step ST30 where the CPU 32 judges the end of the application #2. If there is no end-instruction of the application #2, the process returns to the step ST29 where the display unit 29 continues the display of the operation panel images relating to the application #2. If there is the end-instruction of the application #2, the process shifts to step ST31 where the CPU 32 transmits the instruction data D to the air-circulation unit 3A so as to control stopping the piezoelectric unit 315. Thereafter, the process shifts to the step ST38.

It should be noted that if the application execution instruction other than the execution instructions of the applications #1 and #2 is set at the step ST27, the process shifts to step ST32 shown in FIG. 28. In the step ST32, if the application execution instruction is an execution instruction of the application #3, the process shifts to step ST33 where the CPU 32 reads the control information of the application #3. The CPU 32 controls the display unit 29 so as to change over the display based on the control information.

At that time, the CPU 32 outputs an image signal Sv to the display unit 29 based on the control information. The display unit 29 displays the key array K100 for the key board which forms the icon image of the application #3 as the operation screen (referred to as FIG. 26C). Also, the CPU 32 outputs the instruction data D to the air-circulation unit 3A based on the control information. The air-circulation unit 3A executes the changeover control such that the valve body 322 is opened and the valve bodies 304, 309 are shut off based on the instruction data D in order to select the flow channels 2*d* to 2*h*. The blower 3*b* sends the air to the flow channels 2*d* to 2*h* selected by the flow channel changeover unit 3*a*1. The piezoelectric unit 315 constituting the blower 3*b* adjusts an amount of the air. The piezoelectric unit 315 is controlled by the instruction data D inputted from the CPU 32. This control enables the concave and convex touch feeling of the element bag portion array E100 corresponding to the icon images of the application #3 to be changed.

Then, at step ST34, the CPU 32 executes the application #3. The application #3 processes the information by operating, for example, the key array K100 for the key board. The key array K100 for the key board gives the respective concave and convex touch feelings to the operator's finger when the slide operation or press operation thereof is executed.

Thereafter, the process shifts to step ST35 where the CPU 32 judges the end of the application #3. If there is no end-instruction of the application #3, the process returns to the step ST34 where the display unit 29 continues the operation panel display relating to the application #3. If there is the end-instruction of the application #3, the process shifts to step ST36 where the CPU 32 transmits the instruction data D to the air-circulation unit 3A so as to control stopping the piezoelectric unit 315. Thereafter, the process shifts to the step ST38.

At the above-mentioned step ST32, if an application execution instruction other than the execution instructions of the applications #1 to #3 is set, the process shifts to step ST17 where this application is executed. In the processing in this application, for example, a waiting image or the like is displayed on the display unit 29 by changing over the display screen. Also, the air-circulation unit 3A performs the changeover control such that the valve body 304 and the valve bodies 309, 322 are shut off based on the instruction data D in order not to select any of the flow channels 2*a*, 2*d* to 2*i*. The piezoelectric unit 315 stops the driving thereof by the instruction data D inputted from the CPU 32. This control disables any of the seventeen element bag portions E1 to E17, the twenty element bag portions E41 to E60 and the element bag portion array E100 of the applications #1 to #3 to give the concave and convex touch feeling to the operator's finger.

Thereafter, the process shifts to the step ST38 where the end of the input processing in the mobile phone 710 is judged. For example, the CPU 32 detects the power-OFF information. If the power-OFF information is not detected, the process returns to the step ST21 where the above-mentioned processing is repeated. If the power-OFF information is detected, the input processing in the mobile phone 710 ends.

In this manner, the mobile phone 710 as the fourth embodiment is provided with the embodiment of the input device 400. The layered sheet unit 140 for presenting sense of touch includes the three layered touch-sensitive variable sheet units 141 to 143 and the blower 3*b* sends the compressed air to the element bag portion array E100 of the touch-sensitive variable sheet unit 141, the element bag portions E41 to E60 of the touch-sensitive variable sheet unit 142 or the element bag portions E1 to E17 of the touch-sensitive variable sheet unit 143.

Consequently, in the predetermined positions of the base member 104, the element bag portion array E100 may present the sense of touch for giving the concave and convex feeling with respect to the operator's finger or the like by the protuberant shape depending on the respective swelling of the element bag portion array E100. Also, in the predetermined positions of the base member 105, the element bag portions E41 to E60 may present the sense of touch for giving the concave and convex feeling with respect to the operator's finger or the like by the protuberant shape depending on the respective swelling of the element bag portions E41 to E60. Further, in the predetermined positions of the base member 106, the element bag portions E1 to E17 may present the sense of touch for giving the concave and convex feeling with respect to the operator's finger or the like by the protuberant shape depending on the respective swelling of the element bag portions E1 to E17.

Accordingly, it is possible to execute the operation panel building mode (icon image+sense-of-touch-representing unit) by the sense of touch representation function depending on the layered sheet unit 140 and by the display function of the icon image of the display unit 29, so that the mobile phone 710 with the touch-sensitive variable sheet function for the icon touch, which is programmable between the layers, can be provided. Moreover, it is possible to improve the miniaturization and the operability of the input device 400, thereby enabling the reduction of the miss-operation, the cost down and the simplification of the manufacturing process of the mobile phone 710 to be realized.

Embodiment 5

Figure 29A:
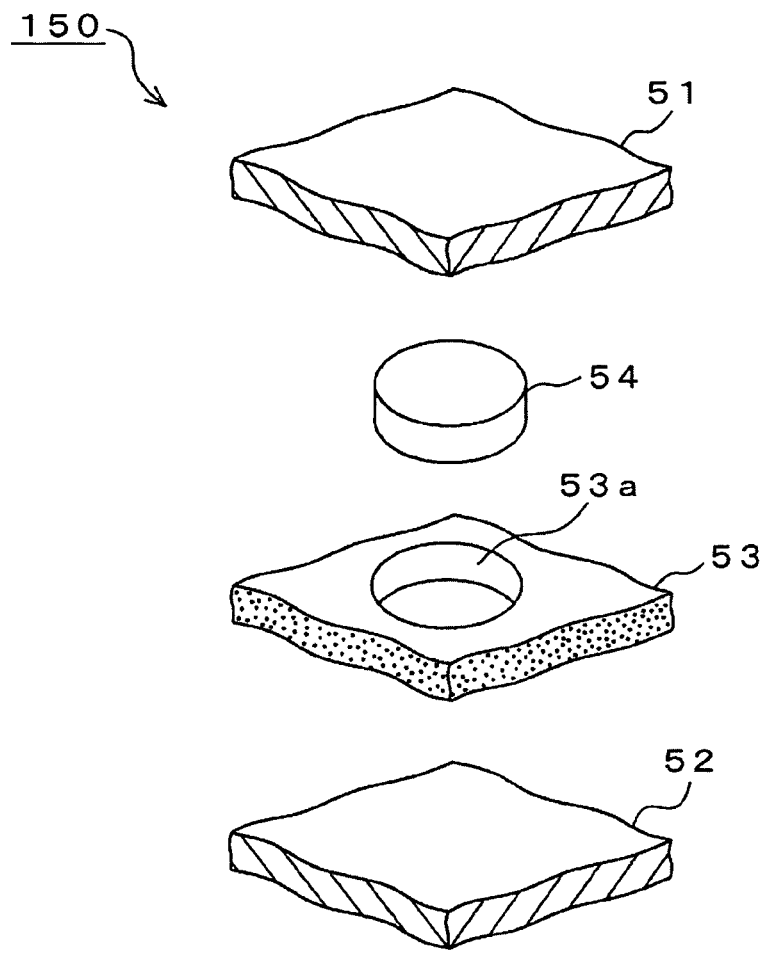
FIG. 29A is an exploded perspective view of a touch-sensitive sheet member 150 as a fifth embodiment for showing a configuration thereof and FIG. 29B is a diagram showing the driving example thereof.
Figure 29B:
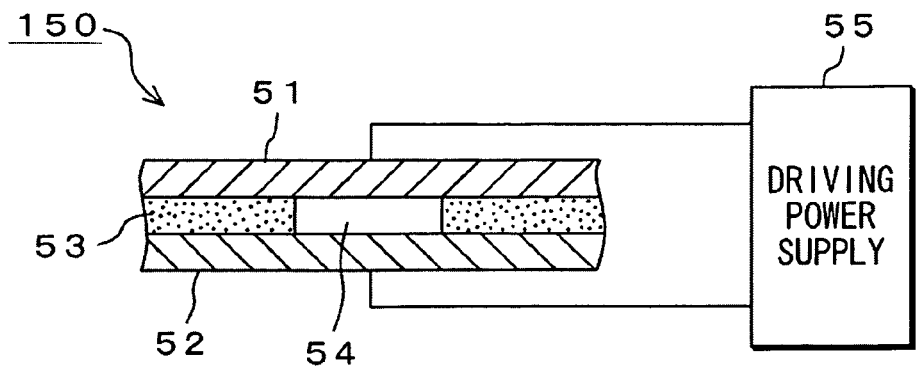

FIGS. 29A and 29B show a configuration of a touch-sensitive sheet member 150 as a fifth embodiment and a driving example thereof. In this example, the CPU 32 for controlling the touch-sensitive sheet member 150 for representing a sense of touch controls a driving power supply 55 so as to supply a driving voltage to an element muscle portion 54 of touch-sensitive sheet member 150 corresponding to image contents displayed on the display unit 29, so that the element muscle portions 54 is available at predetermined positions of a base frame portion 53 corresponding to the image contents.

The touch-sensitive sheet member 150 shown in FIG. 29A contains an electrode 51 for upper portion, an electrode 52 for lower portion, the sheet shaped base frame portion 53 and the element muscle portion 54. The base frame portion 53 constitutes the base member and forms apertures 53a each having a predetermined aperture diameter. The element muscle portion 54 for representing a sense of touch is inserted in each of the apertures 53a. For the base frame portion 53, a transparent soft silicon rubber member of the hardness 20° to 40° is used. The apertures 53a are formed at predetermined positions of the base frame portion 53. For the element muscle portion 54, a polymer material (artificial muscle) having transparency and also electric conductivity is used. The polymer material includes a flexible and strong electric conductive Embra (trademark) film and an electric conductive gel polymer which is largely swellable in good solvent. An operation voltage of each of them is around 1.5V.

The element muscle portion 54 inserted in each of the apertures 53a is sandwiched between the electrode 51 and the electrode 52 from the upward/downward directions. The electrode 51 and the electrode 52 have predetermined sizes and a predetermined driving voltage is applied between the electrodes 51, 52. The electrode 51 and the electrode 52 with common pattern or individually divided pattern are applied. For the electrodes 51, 52, a transparent ITO film is used. According to the operation principle of this element muscle portion 54, the expansion and contraction motion thereof is obtained by exchanging polarity of the DC voltage which is applied to the electrodes 51, 52.

In the touch-sensitive sheet member 150 shown in FIG. 29B, the electrode 51 and the electrode 52 are connected to the driving power supply 55 constituting the power supply unit as a medium-supplying unit, which supplies the driving voltage (medium) to the electrodes 51, 52 sandwiching the polymer material therebetween. For the driving power supply 55, a direct-current power supply is used. The driving power supply 55 outputs ±DC voltage of around 1.0 to 3.0V. For example, when the voltage of plus polarity is applied to the electrode 51 and the voltage of minus polarity is applied to the electrode 52 from the driving power supply 55, minus ions are taken into the element muscle portion 54, so that the element muscle portion 54 swells.

On the other hand, when the voltage of minus polarity is applied to the electrode 51 and the voltage of plus polarity is applied to the electrode 52 from the driving power supply 55, minus ions are taken out of the element muscle portion 54, so that the element muscle portion 54 contracts.

Also, when the driving voltage is applied to the electrodes 51, 52 sandwiching an electric conductive elastomer (artificial muscle) of silicon, an acryl or the like therebetween, the electrodes are brought closer to each other. Consequently, the electric conductive elastomer leaks out to the outside of the electrodes 51, 52. When the supply of the driving voltage to the electrodes 51, 52 is stopped, the electrodes 51, 52 and also the electric conductive elastomer return to the original shapes if they are within the elastic displacement region.

By the way, the contraction rate of the human muscle is 20% and the maximum occurrence force is around 0.35 MPa (1 MPa=10 kgf/cm$^2$). On the other hand, according to the high-occurrence force type artificial muscle, if the driving voltage is 1.5V, the deformation rate thereof is 12% to 15% and the maximum occurrence force is around 49 MPa. Also, according to the high-contraction type artificial muscle, if the driving voltage is 1.5V, the deformation rate thereof is 20% to 40% and the maximum occurrence force is around 2 to 10 MPa.

The touch-sensitive sheet member 150 is constituted in this manner and when the driving voltage is supplied to the electrodes 51, 52 arranged in the upward/downward directions of the element muscle portion 54 from the driving power supply 55, the element muscle portion 54 may function as an electric conductive polymer actuator in which the expansion and contraction motion of the swelling, the contraction or the like occurs in approximately two seconds. Consequently, in the spots of or at the predetermined positions of the base frame portion 53, the element muscle portion 54 can present the sense of touch for giving the concave and convex feeling with respect to the operator's finger 30a by the protuberant shape depending on the pressure change of the element muscle portion 54 or by the original shape when supplying no driving voltage.

FIG. 30 shows a configuration of an input device 500 to which the embodiment of the touch-sensitive sheet member 150 is applied. In this embodiment, the input device 500 which can carry out the operation panel building mode is provided. In the operation panel building mode, seventeen element muscle portions G1 to G17 constituting a first group and/or eight element muscle portions G18 to G25 constituting a second group, which are provided on the same plane of the base frame portion 53, are selectable for every group.

To the input device 500 shown in FIG. 30 to which the touch-sensitive sheet member 150 shown in FIG. 29 is applied, any information is inputted by the slide and/or press operation depending on the finger or the like of the operator 30 (operation body). The input device 500 includes the display unit 29, the input detection unit 45 and a touch-sensitive variable sheet unit 145.

The display unit 29 has an operation surface and displays a plurality of push button switch images at a time of the input operation. The push button switch images constitute icon images for the input operation. The push button switch images include a key K1 of numeral "1" to a key K10 of numeral "0", a key K11 of symbol "*", a key K12 of a symbol "#" or the like, a key K13 of determination "O" of a cross key, a left facing arrow key K14 thereof, an upward facing arrow key K15 thereof, a right facing arrow key K16 thereof, a downward facing arrow key K17 thereof, a key K18 of "etc", a key K19 of "REW", a left facing arrow stop key K20, a right facing arrow stop key K21, a left facing fast-forward key K22, a fast-forward key K23, a reproduction key K24 and a stop key K25 or the like. As the display unit 29, a color organic EL display device or a liquid crystal display device (LCD device) is used.

The input detection unit 45 which constitutes the detection unit is provided on the upper portion of the display unit 29. The input detection unit 45 includes the operation surface. The input detection unit 45 is provided on the upper portion of the display unit 29 and operates so as to detect the slide position of the operator's finger or the like. As the input detection unit 45, for example, a capacitive touch panel is used. With respect to the input detection unit 45, anything is available only if the cursoring and the selection function can be distinguished. For example, other than the capacitive input device, it also may be a resistive touch panel, an input device of a surface acoustic wave system (SAW) or an optical system, a tact switch of a multi stage system or the like. Preferably, it may be enough if the input device has a constitution by which position detection information and press detection information can be applied to a control system.

The transparent touch-sensitive variable sheet unit 145 constituting the touch-sensitive sheet member is provided on the upper portion of the input detection unit 45. The touch-sensitive variable sheet unit 145 is provided so as to cover the whole of the input detection unit 45 and is slid and/or pressed down along the operation surface of the display unit 29. It is needless to say that the touch-sensitive variable sheet unit 145 may have a configuration covering a portion of the input detection unit 45. The touch-sensitive variable sheet unit 145 is provided with the embodiment of the touch-sensitive sheet member 150 having a facing-electrode structure.

In this embodiment, the touch-sensitive variable sheet unit 145 has the transparent base frame portion 53. The base frame portion 53 has predetermined hardness and also has twenty five elliptical apertures r1 to r25. As the base frame portion 53, a polycarbonate (PC), an acrylic resin (PMMA) or the like having thickness of around 0.01 to 0.5 [mm] is used.

An electrode pattern 51a for first group and an electrode pattern 51b for second group are electrically divided and arranged in parallel on the upper portion of the base frame portion 53. The electrode patterns 51a, 51b are provided on an insulated base sheet 51A. An electrode pattern 52a for first group and an electrode pattern 52b for second group are electrically divided and arranged in parallel on the lower portion of the base frame portion 53. The electrode patterns 52a, 52b are provided on an insulated base sheet 52A. Element muscle portions G1 to G25 each having predetermined volume are arranged so as to be inserted into the apertures r1 to r25 of the base frame portion 53 one by one. The element muscle portions G1 to G25 are also sandwiched between the electrode patterns 51a, 51b and the electrode patterns 52a, 52b.

For example, the element muscle portion G1 is inserted into the aperture r1 of the base frame portion 53 or is integrally molded to the base frame portion 53. Similarly, the element muscle portion G2, the element muscle portion G3, the element muscle portion G4, the element muscle portion G5, the element muscle portion G6, the element muscle portion G7 and the element muscle portion G8 are inserted into the aperture r2, the aperture r3, the aperture r4, the aperture r5, the aperture r6, the aperture r7 and the aperture r8, respectively or each is integrally molded to the base frame portion 53. Further, the element muscle portion G9, the element muscle portion G10, the element muscle portion G11, the element muscle portion G12, the element muscle portion G13, the element muscle portion G14, the element muscle portion G15, the element muscle portion G16 and the element muscle portion G17 are inserted into the aperture r9, the aperture r10, the aperture r11, the aperture r12, the aperture r13, the aperture r14, the aperture r15, the aperture r16 and the aperture r17, respectively or each is integrally molded to the base frame portion 53.

Also, the element muscle portion G18, the element muscle portion G19, the element muscle portion G20, the element muscle portion G21, the element muscle portion G22, the element muscle portion G23, the element muscle portion G24 and the element muscle portion G25 are inserted into the aperture r18, the aperture r19, the aperture r20, the aperture r21, the aperture r22, the aperture r23, the aperture r24 and the aperture r25, respectively or each is integrally molded to the base frame portion 53. In a case in which the above-mentioned insertion method is employed, the respective element muscle portions G1 to G25 is bonded to the electrode patterns 52a, 52b through ring shaped double-sided tapes 56. The element muscle portions G1 to G25 constitute the sense-of-touch-representing unit. Each of the element muscle portions G1 to G25 has, for example, an elliptical cylinder shape and thickness of around 0.01 to 0.5 [mm].

In the above-mentioned base frame portion 53, the apertures r1 to r12 for the keys of numerals "0" to "9", the key of symbol "*", the key of symbol "#" or the like and the apertures r13 to r17 for the cross key, which correspond to the icon images for the input operation, respectively have elliptical shapes. The above-mentioned element muscle portions G1 to G25 are arranged corresponding to the keys K1 to K25 of various kinds of functions.

For example, the element muscle portion G1 is arranged on the key K1 of numeral "1" of the icon image displayed on the display unit 29. The element muscle portion G2 is arranged on the key K2 of numeral "2" of the icon image displayed on the display unit 29. The element muscle portion G3 is arranged on the key K3 of numeral "3" of the icon image displayed on the display unit 29. The element muscle portion G4 is arranged on the key K4 of numeral "4" of the icon image displayed on the display unit 29. The element muscle portion G5 is arranged on the key K5 of numeral "5" of the icon image displayed on the display unit 29. The element muscle portion G6 is arranged on the key K6 of numeral "6" of the icon image displayed on the display unit 29. The element muscle portion G7 is arranged on the key K7 of numeral "7" of the icon image displayed on the display unit 29. The element muscle portion G8 is arranged on the key K8 of numeral "8" of the icon image displayed on the display unit 29. The element muscle portion G9 is arranged on the key K9 of numeral "9" of the icon image displayed on the display unit 29. The element muscle portion G10 is arranged on the key K10 of numeral "0" of the icon image displayed on the display unit 29.

Also, the element muscle portion G11 is arranged on the key K11 of symbol "*" of the icon image displayed on the display unit 29. The element muscle portion G12 is arranged on the key K12 of symbol "#" of the icon image displayed on the display unit 29. The element muscle portion G13 is arranged on the key of determination "O" of the cross key of the icon image displayed on the display unit 29. The element muscle portion G14 is arranged on the left facing arrow key of the icon image displayed on the display unit 29. The element muscle portion G15 is arranged on the upward facing arrow key of the icon image displayed on the display unit 29. The element muscle portion G16 is arranged on the right facing arrow key of the icon image displayed on the display unit 29. The element muscle portion G17 is arranged on the downward facing arrow key of the icon image displayed on the display unit 29.

Further, the element muscle portion G18 is arranged on the key of "etc" of the icon image displayed on the display unit 29. The element muscle portion G19 is arranged on the key of "REW" of the icon image displayed on the display unit 29. The element muscle portion G20 is arranged on the left facing arrow stop key of the icon image displayed on the display unit 29. The element muscle portion G21 is arranged on the right facing arrow stop key of the icon image displayed on the display unit 29. The element muscle portion G22 is arranged on the left facing fast-forward key of the icon image displayed on the display unit 29. The element muscle portion G23 is arranged on the fast-forward key of the icon image displayed on the display unit 29. The element muscle portion G24 is arranged on the reproduction key of the icon image displayed on the display unit 29. The element muscle portion G25 is arranged on the stop key of the icon image displayed on the display unit 29.

As the electrode patterns 51a, 51b, 52a, 52b which sandwich these element muscle portions G1 to G25, there is used a transparent thin film material having transmissivity and a refractive index which are approximately equal to transmissivity and a refractive index of the base frame portion 53. As the electrode patterns 51a, 51b, 52a, 52b, there is used, for example, an ITO film of the film thickness of around 0.1 to 0.125 [mm]. The hardness thereof is around 20° to 40°.

The electrode patterns 51a, 51b and the electrode patterns 52a, 52b are connected with the driving power supply, not shown, which applies the driving voltage to the twenty five element muscle portions G1 to G25 for presenting a sense of touch, for every group, which are sandwiched between the electrode patterns 51a, 51 and the electrode patterns 52a, 52b. The direct-current power supply as explained in FIG. 29B is used for the driving power supply 55.

Figure 31A:
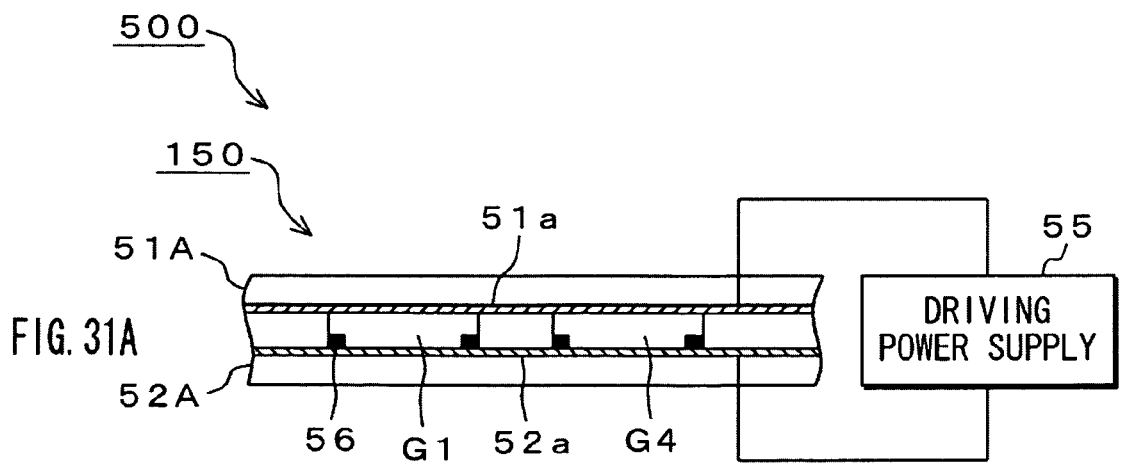
FIGS. 31A and 31B are explanation diagrams each showing an operation example of the input device 500.
Figure 31B:
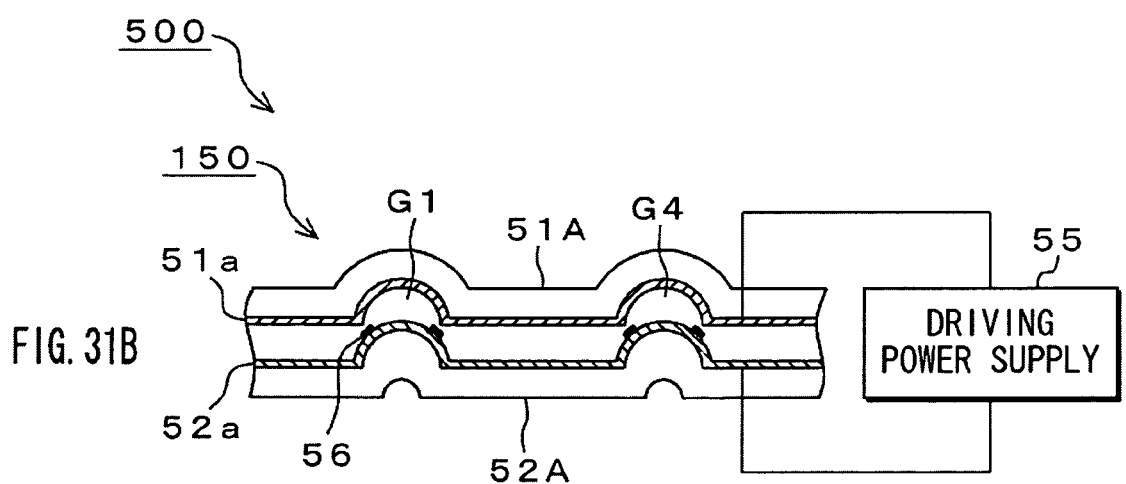

The following will describe an operation example of the input device 500. FIGS. 31A and 31B show an operation example of the input device 500.

The input device 500 shown in FIG. 31A includes the touch-sensitive sheet member 150 shown in FIG. 30. In the touch-sensitive sheet member 150 shown in FIG. 31A, the driving power supply 55 connected to the electrode pattern 51a of the base sheet 51A and the electrode pattern 52a of the base sheet 52A does not supply the driving voltage. In this case, the original shapes of the element muscle portions G1, G4 and the like which are sandwiched between the electrode pattern 51a and the electrode pattern 52a are kept without swelling.

In the touch-sensitive sheet member 150 shown in FIG. 31B, the driving power supply 55 supplies the driving voltage to the electrode patterns 51a, 52a. For example, the driving power supply 55 supplies the DC voltage of around +1.5V to the electrode patterns 51a, 52a. In this case, the element muscle portions G1, G4 and the like which are sandwiched between the electrode pattern 51a and the electrode pattern 52a swell and the resulted convex shaped postures thereof are kept.

In a case in which the first group is selected in the input device 500 according to the above-mentioned operation principle of the touch-sensitive sheet member 150, the voltage of plus polarity is applied to the electrode pattern 51a and the electrode pattern 52a. This applied voltage enables the seventeen element muscle portions G1 to G17 which are sandwiched between the electrode pattern 51a and the electrode pattern 52a to swell at the same time, which changing their postures to the convex shaped ones.

Similarly, in a case in which the second group is selected in the input device 500, the voltage of plus polarity is applied to the electrode pattern 51b and the electrode pattern 52b. This applied voltage enables the eight element muscle portions G18 to G25 which are sandwiched between the electrode pattern 51b and the electrode pattern 52b to swell at the same time, which changing their postures to the convex shaped ones. Each of the element muscle portions G1 to G25 returns to their original shapes when the applying of the driving voltage to the electrode patterns 51a, 51b, the electrode patterns 52a, 52b or the like is stopped. The convex shaped postures of such element muscle portions G1 to G17 or G18 to G25 respectively give the concave and convex touch feelings to the operator's finger or the like when the slide operation or the press operation is executed.

The configuration and the information processing example of the mobile phone mounted with the input device 500 are approximately similar as the configuration of the mobile phone 600 shown in FIG. 20 and the information processing example shown in FIG. 23, so that the explanation thereof will be omitted. It should be noted that with respect to mobile phone mounted with the input device 500, the block diagram can be applied by reading the input device 300 with the input device 500 and further, by reading the touch-sensitive variable sheet unit 103 with the touch-sensitive sheet member 150 in the block diagram shown in FIG. 20. Also, the flowchart can be applied by reading the element bag portions with the element muscle portions and by reading air-circulation unit 3A with the driving power supply 55 in the description on the flowchart shown in FIG. 23.

In the input device 500 thus configured, the driving power supply 55 applies the DC driving voltage to the element muscle portions G1 to G17 or the element muscle portions G18 to G25 for every group. Consequently, in the predetermined positions of the base frame portion 53, the element muscle portions G1 to G25 may present the sense of touch for giving the concave and convex feeling by the protuberant shape or the cave-in shape depending on the swelling of the element muscle portions G1 to G25 or by the original shape without conducting electricity with respect to the operator's finger or the like.

The following will describe a modification example (No. 1) of the touch-sensitive sheet member 150. FIGS. 32A and 32B show a configuration and a driving example of a touch-sensitive sheet member 151 that is applicable to the input device 500. The touch-sensitive sheet member 151 shown in FIG. 32A includes the electrode 51 for upper portion, the electrode 52 for lower portion, a sheet shaped base frame portion 531 and element muscle portions 541 each having C shape.

The base frame portion 531 constitutes the base member and forms C-shaped apertures 53b each having a predetermined aperture ring width. Each of the C-shaped element muscle portions 541 for presenting a sense of touch is inserted into this aperture 53b. As the base frame portion 531, a transparent soft silicon rubber member having the hardness of 20° to 40° is used.

The apertures 53b are arranged at predetermined positions of the base frame portion 531. As the element muscle portions 541, a same material as that used for ones of the touch-sensitive sheet member 150 is used. Each of the element muscle portions 541 which are inserted into the apertures 53b is sandwiched between the electrode 51 and the electrode 52 from the upward/downward directions. A predetermined driving voltage is applied between the electrodes 51, 52. As the electrodes 51, 52, a transparent ITO film is used. It should be noted that members having the same name and numeral as those used in the touch-sensitive sheet member 150 have the same functions, so that the explanation thereof will be omitted.

In the touch-sensitive sheet member 151 shown in FIG. 32B, the electrode 51 and the electrode 52 are also connected with the driving power supply which supplies the driving voltage to the electrodes 51, 52. The operation principle of this element muscle portion 541 is similar to that of the touch-sensitive sheet member 150, so that the explanation thereof will be omitted.

The touch-sensitive sheet member 151 is constituted in this manner so that when the driving power supply 55 supplies the driving voltage to the electrodes 51, 52 arranged in the upward/downward directions of each of the element muscle portions 541, each of the element muscle portions 541 may function as an electric conductive polymer actuator in which the expansion and contraction motion such as the swelling in the C-shape and the contraction is available for approximately two seconds. Consequently, in the spots of or the predetermined positions of the base frame portion 531, the element muscle portions 541 may present the sense of touch for giving the concave and convex feeling with respect to the operator's finger 30a by the protuberant shape depending on the pressure change of the element muscle portion 541 or by the original shape without supplying the driving voltage thereto. Thus, it becomes possible to provide the input device 500 or the like to which the touch-sensitive sheet member 151 is applied.

Figure 33A:
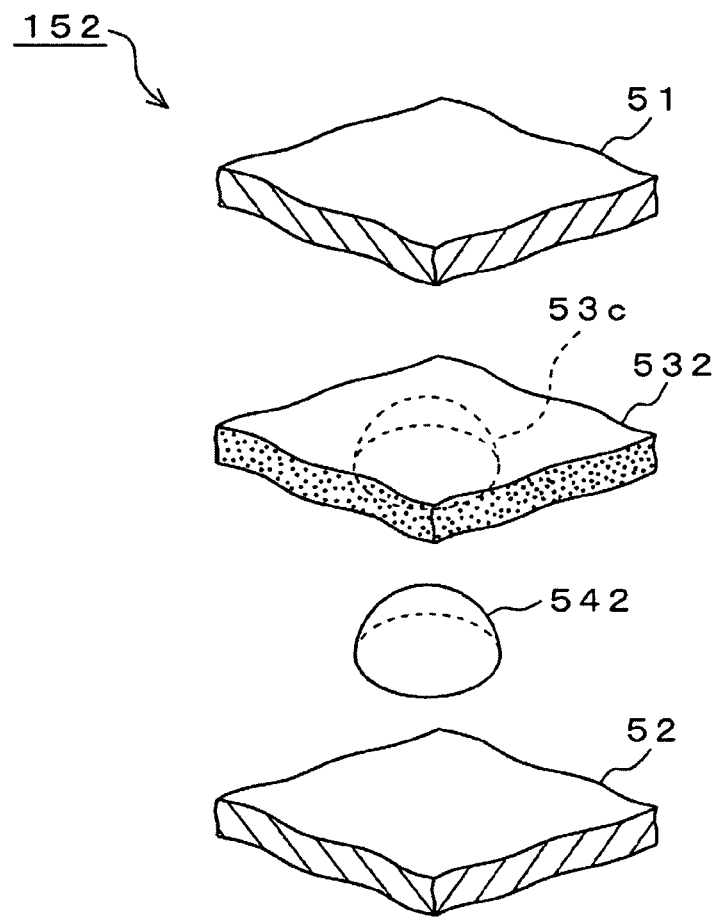
FIG. 33A is an exploded perspective view of a touch-sensitive sheet member 152 that is applicable to the input device 500 for showing a configuration thereof and FIG. 33B is a diagram showing the driving example thereof.
Figure 33B:
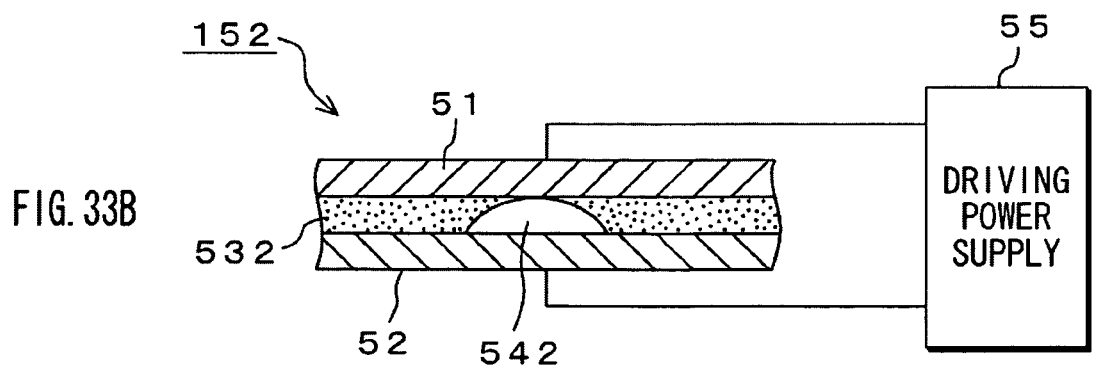

The following will describe a modification example (No. 2) of the touch-sensitive sheet member 150. FIGS. 33A and 33B show a configuration and a driving example of a touch-sensitive sheet member 152 that is applicable to the input device 500. The touch-sensitive sheet member 152 shown in FIG. 33A includes the electrode 51 for upper portion, the electrode 52 for lower portion, a sheet shaped base frame portion 532 and element muscle portions 542 each having a hemispheric shape.

The base frame portion 532 constitutes the base member and forms hemispheric shaped recess portions 53c each having a predetermined opening diameter. Each of the hemispheric shaped element muscle portions 542 for presenting a sense of touch is inserted and held in the recess portion 53c. As the base frame portion 532, a transparent soft silicon rubber member having the hardness of 20° to 40° is used.

The recess portions 53c are arranged at predetermined positions of the base frame portion 532. As the element muscle portions 542, a same material as that used for ones of the touch-sensitive sheet member 150 is used. Each of the element muscle portions 542 which are inserted in the recess portions 53c is sandwiched between the electrode 51 and the electrode 52 from the upward/downward directions. A predetermined driving voltage is applied between the electrodes 51, 52. As the electrodes 51, 52, a transparent ITO film is used. It should be noted that members having the same name and numeral as those used in the touch-sensitive sheet member 150 have the same functions, so that the explanation thereof will be omitted.

In the touch-sensitive sheet member 152 shown in FIG. 33B, the electrode 51 and the electrode 52 are also connected with the driving power supply which supplies the driving voltage to the electrodes 51, 52. The operation principle of this element muscle portion 542 is similar to that of the touch-sensitive sheet member 150, so that the explanation thereof will be omitted.

The touch-sensitive sheet member 152 is constituted in this manner so that when the driving power supply 55 supplies the driving voltage to the electrodes 51, 52 arranged in the upward/downward directions of each of the element muscle portions 542, each of the element muscle portions 542 may function as an electric conductive polymer actuator in which the expansion and contraction motion such as the swelling in the hemispheric shape and the contraction in a concave shape is allowed. Consequently, in the spots of or the predetermined positions of the base frame portion 532, the element muscle portions 542 may present the sense of touch for giving the concave and convex feeling with respect to the operator's finger 30a by the protuberant shape depending on the pressure change of the element muscle portion 542 or by the original shape without supplying the driving voltage. Thus, it becomes possible to provide the input device 500 or the like to which the touch-sensitive sheet member 152 is applied.

Figure 34A:
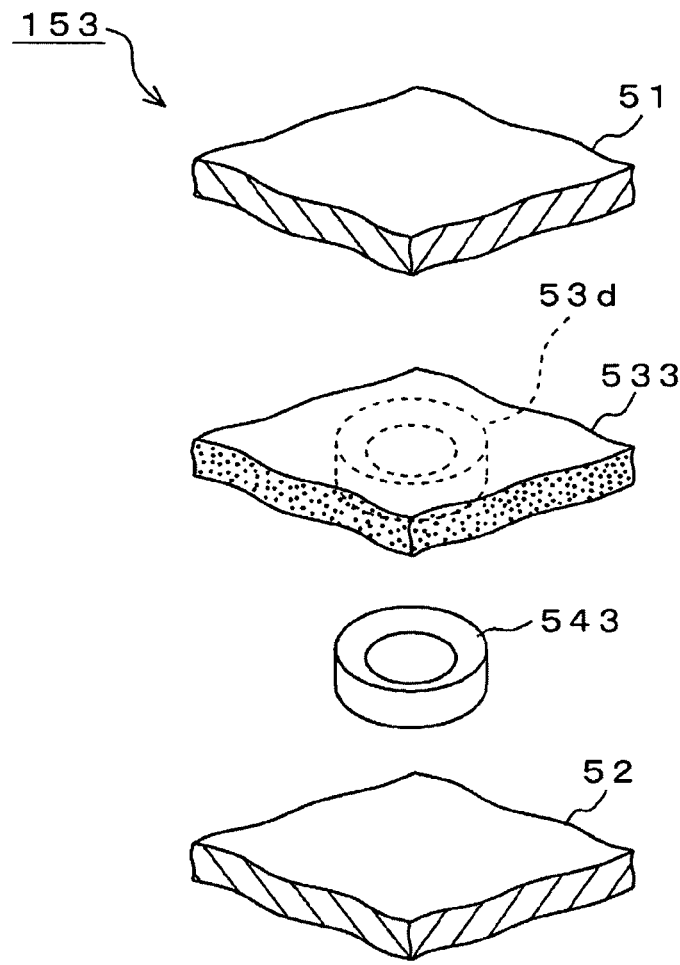
FIG. 34A is an exploded perspective view of a touch-sensitive sheet member 153 that is applicable to the input device 500 for showing a configuration thereof and FIG. 34B is a diagram showing the driving example thereof.
Figure 34B:
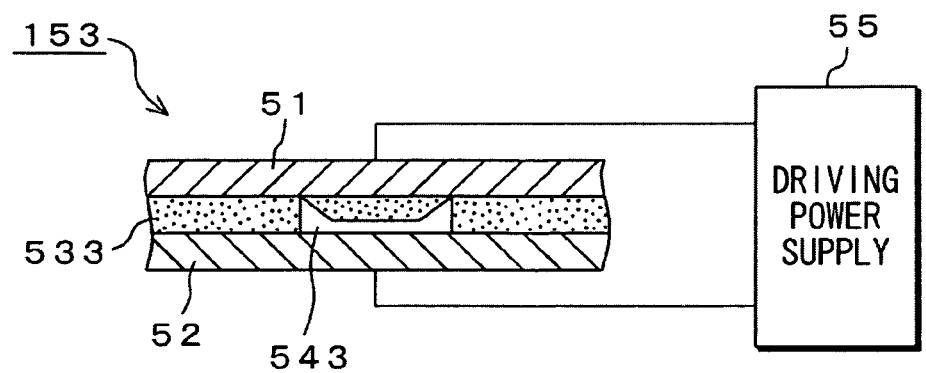

The following will describe a modification example (No. 3) of the touch-sensitive sheet member 150. FIGS. 34A and 34B show a configuration and a driving example of a touch-sensitive sheet member 153 that is applicable to the input device 500. The touch-sensitive sheet member 153 shown in FIG. 34A includes the electrode 51 for upper portion, the electrode 52 for lower portion, a sheet shaped base frame portion 533 and element muscle portions 543 each having a mortar shape.

The base frame portion 533 constitutes the base member and forms reverse mortar shaped recess portions 53d each having a predetermined opening diameter. Each of the mortar shaped element muscle portions 543 for presenting a sense of touch is inserted and held in the recess portion 53d. As the base frame portion 533, a transparent soft silicon rubber member having the hardness of 20° to 40° is used.

The recess portions 53d are arranged at predetermined positions of the base frame portion 533. As the element muscle portions 543, a same material as that used for ones of the touch-sensitive sheet member 150 is used. Each of the element muscle portions 543 which are inserted in the recess portions 53d is sandwiched between the electrode 51 and the electrode 52 from the upward/downward directions. A predetermined driving voltage is applied between the electrodes 51, 52. As the electrodes 51, 52, a transparent ITO film is used. It should be noted that members having the same name and numeral as those used in the touch-sensitive sheet member 150 have the same functions, so that the explanation thereof will be omitted.

In the touch-sensitive sheet member 153 shown in FIG. 34B, the electrode 51 and the electrode 52 are also connected with the driving power supply which supplies the driving voltage to the electrodes 51, 52. The operation principle of this element muscle portion 543 is similar to that of the touch-sensitive sheet member 150, so that the explanation thereof will be omitted.

The touch-sensitive sheet member 153 is constituted in this manner so that when driving power supply 55 supplies the driving voltage to the electrodes 51, 52 arranged in the upward/downward directions of each of the element muscle portion 543, each of the element muscle portions 543 may function as an electric conductive polymer actuator in which the expansion and contraction motion such as the swelling in the mortar shape and the contraction in a concave shape is allowed. Consequently, in the spots of or the predetermined positions of the base frame portion 533, the element muscle portion 543 may present the sense of touch for giving the concave and convex feeling with respect to the operator's finger 30a by the protuberant shape depending on the pressure change of the element muscle portion 543 or by the original shape without supplying the driving voltage. Thus, it becomes possible to provide the input device 500 or the like to which the touch-sensitive sheet member 153 is applied.

Embodiment 6

FIGS. 35A, 35B and 35C show a configuration of a touch-sensitive sheet member 160 as a sixth embodiment and driving examples thereof. In this embodiment, the CPU 32 for controlling the touch-sensitive sheet member 160 for presenting a sense of touch controls a driving power supply 55A to supply the driving voltage to a muscular sheet portion 54A of the touch-sensitive sheet member 160 corresponding to the image contents displayed on the display unit 29, so that the muscular sheet portion 54A is available on the electrode-forming positions corresponding to the image contents.

The touch-sensitive sheet member 160 shown in FIG. 35A includes a plurality of electrodes 51 for upper portion, a plurality of electrodes 52 for lower portion and the muscular sheet portion 54A. The muscular sheet portion 54A constitutes the base member and the sense-of-touch-representing unit. The muscular sheet portion 54A is constituted such that the convex and concave shapes are built at the positions corresponding to a plurality of operation key elements of the icon images of the operation screen. As the muscular sheet portion 54A, a polymer material (artificial muscle) having transparency and also electric conductivity is used. The polymer material includes a flexible and strong electric conductive Embra (trademark) film and an electric conductive gel polymer which is largely swellable in good solvent. An operation voltage of each of them is around 1.5V.

The plurality of electrodes 51 each having a predetermined area are provided at the upper portion of the muscular sheet portion 54A. The plurality of electrodes 52 each having an area, which face to the predetermined electrodes 51, are provided at the lower portion of the muscular sheet portion 54A. In a case in which the touch-sensitive sheet member 160 of the facing electrode structure is constituted, the muscular sheet portion 54A is sandwiched between the electrode 51 of a predetermined position and the electrode 52 of the predetermined position from the upward/downward directions. A predetermined driving voltage is applied between the electrodes 51, 52, similarly as the fifth embodiment. Each of the electrodes 51, 52 is divided individually for every plural operation key element, which is different from the fifth embodiment. AS the electrodes 51, 52, a transparent ITO film is used. According to the operation principle of this muscular sheet portion 54A, the expansion and contraction motion thereof is obtained for every operation key element by exchanging polarity of the DC voltage which is applied to the respective electrodes 51, 52.

In the touch-sensitive sheet member 160 shown in FIG. 35B, the electrode 51 and electrode 52 are connected with the driving power supply 55A which supplies the driving voltage (medium) is supplied between the electrode 51 and the corresponding electrode 52. As the driving power supply 55A, a power supply unit including a direct-current power supply and an electrode selection function is used. The driving power supply 55A outputs ±DC voltage of around 1.0 to 3.0V. For example, when the voltage of plus polarity is applied to the electrode 51 and the voltage of minus polarity is applied to the electrode 52 from the driving power supply 55A, minus ions are taken into the muscular sheet portion 54A, so that the muscular sheet portion 54A swells. On the other hand, when the voltage of minus polarity is applied to the electrodes 51 and the voltage of plus polarity is applied to the electrodes 52 from the driving power supply 55A, minus ions are taken out of the muscular sheet portion 54A, so that the muscular sheet portion 54A contracts.

The touch-sensitive sheet member 160 as the sixth embodiment is constituted in this manner and when the driving voltage is individually supplied to the respective electrodes 51, 52 arranged on the upward/downward directions of the muscular sheet portion 54A from the driving power supply 55A, the muscular sheet portion 54A may function as an electric conductive polymer actuator in which the expansion and contraction motion of the swelling, the contraction or the like is available for every operation key element. Consequently, in the spots of or at the predetermined positions of the touch-sensitive sheet member 160, the muscular sheet portion 54A may present the sense of touch for giving the concave and convex feeling with respect to the operator's finger 30a by the protuberant shape depending on the pressure change of the muscular sheet portion 54A or by the original shape without supplying the driving voltage.

Although, in the above-mentioned embodiment, a case where the electrode 51 and the electrode 52 are faced each other has been described, they are not limited to this; as a touch-sensitive sheet member 160A shown in FIG. 35C, the electrode 51 and the electrode 52 may be arranged in parallel by keeping a predetermined distance on one side surface of the muscular sheet portion 54A, for example, on the rear surface of the muscular sheet portion 54A. Even for such a constitution, the muscular sheet portion 54A on the upper portion of the electrode 51 and the electrode 52 may present the sense of touch for giving the concave and convex feeling with respect to the operator's finger 30a by the protuberant shape depending on the pressure change of the muscular sheet portion 54A or by the original shape without supplying the driving voltage. Portions of double-dashed lines shown in FIGS. 35B and 35C indicate a transparent film member for surface protection and a transparent film member for insulating between layers.

Embodiment 7

Figure 36:
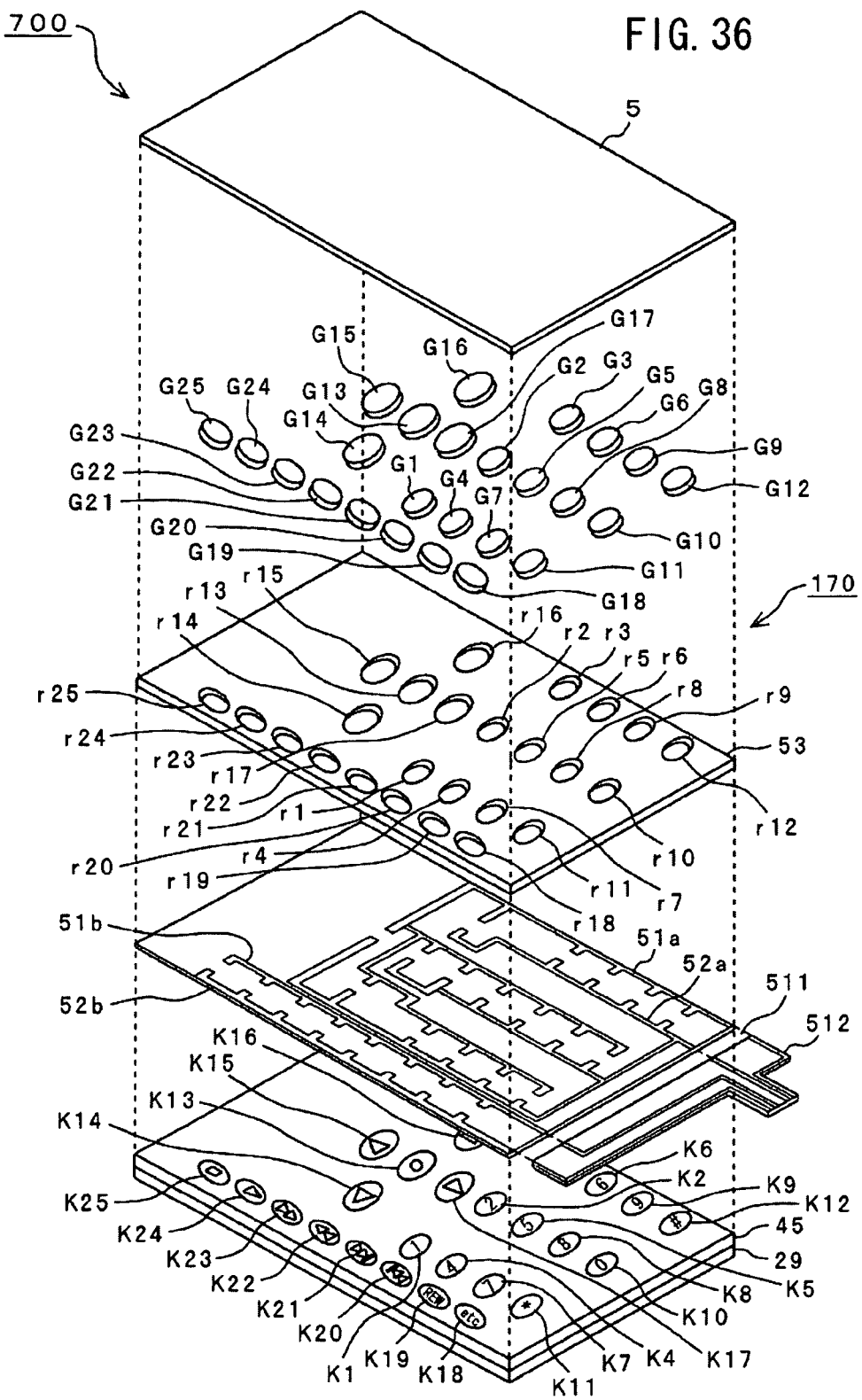
FIG. 36 is an exploded perspective view of an input device 700 as a seventh embodiment for showing a configuration thereof.

FIG. 36 shows a configuration of an input device 700 as a seventh embodiment. In this embodiment, the input device 700 in which the embodiments of the touch-sensitive sheet members 150 and 160A are combined. There is provided the input device 700 that is possible to execute the operation panel building mode in which seventeen element muscle portions G1 to G17 forming a first group and/or eight element muscle portions G18 to G25 forming a second group can be selected for every group.

Also in this embodiment, the CPU 32 for controlling the touch-sensitive sheet member 170 for presenting a sense of touch executes the driving control so as to supply the driving voltage to the element muscle portions G1 to G25 of the touch-sensitive sheet member 170 corresponding to the image contents displayed on the display unit 29, so that the element muscle portions G1 to G25 are available at the electrode-forming positions corresponding to the image contents.

To the input device 700 shown in FIG. 36, the structure of the element muscle portions G1 to G25 of the touch-sensitive sheet member 150 shown in the fifth embodiment and the structure of the electrodes 51, 52 of the touch-sensitive sheet member 160 relating to the sixth embodiment are applied. In the input device 700, any information is inputted by the slide and/or press operation depending on the finger or the like of the operator 30 (operation body). The input device 700 includes the display unit 29, the input detection unit 45 and the touch-sensitive sheet member 170.

The display unit 29, similarly as the fifth embodiment, at a time of the input operation, displays the icon images of a key K1 of numeral "1" to a key K10 of numeral "0", a key K11 of symbol "*", a key K12 of a symbol "#" or the like, a key K13 of determination "O" of a cross key, a left facing arrow key K14 thereof, an upward facing arrow key K15 thereof, a right facing arrow key K16 thereof, a downward facing arrow key K17 thereof, a key K18 of "etc", a key K19 of "REW", a left facing arrow stop key K20, a right facing arrow stop key K21, a left facing fast-forward key K22, a fast-forward key K23, a reproduction key K24 and a stop key K25 or the like. As the display unit 29, a color organic EL display device or a liquid crystal display device (LCD device) is used.

The input detection unit 45 which constitutes the detection unit is provided on the upper portion of the display unit 29.

The input detection unit 45 includes the operation surface. The input detection unit 45 is provided on the upper portion of the display unit 29 and operates so as to detect the slide position of the operator's finger or the like. As the input detection unit 45, for example, a capacitive touch panel is used. With respect to the input detection unit 45, anything is available only if the cursoring and the selection function can be distinguished. For example, other than the capacitive input device, it also may be a resistive touch panel, an input device of a surface acoustic wave system (SAW) or an optical system, a tact switch of a multi stage system or the like. Preferably, it may be enough if the input device has a constitution by which position detection information and press detection information can be applied to a control system.

The transparent touch-sensitive variable sheet unit 170 constituting the touch-sensitive sheet member is provided on the upper portion of the input detection unit 45. The touch-sensitive variable sheet unit 170 is provided so as to cover the whole of the input detection unit 45 and is slid and/or pressed down along the operation surface of the display unit 29. It is needless to say that the touch-sensitive variable sheet unit 170 may have a configuration covering a portion of the input detection unit 45. The touch-sensitive variable sheet unit 170 is provided with the individual insertion structure of the element muscle portions G1 to G25 of the touch-sensitive sheet member 150 shown in the fifth embodiment and the electrode parallel arrangement structure of the touch-sensitive sheet member 160A relating to the sixth embodiment.

In this embodiment, the touch-sensitive sheet member 170 includes an insulated and transparent electrode film portion 511 on the upper portion of the input detection unit 45. The electrode film portion 511 is composed of a polyethylene terephthalate (PET) based transparent material having the thickness of around 0.1 [mm] and an ITO film. A plurality of positive/negative electrode patterns 51a, 52a corresponding to the respective operation key elements for first group and a plurality of positive/negative electrode patterns 51b, 52b corresponding to the respective operation key elements for second group are electrically divided and arranged in parallel in the electrode film portion 511. These plural electrode patterns 51a, 52a are connected in parallel and at the same time, the plural electrode patterns 51b, 52b corresponding to the respective operation key elements for second group are connected in parallel. Wiring patterns which are connected in parallel respectively and arranged in the positive/negative manner are gathered at a pull-out terminal 512.

In the touch-sensitive sheet member 170, there is provided a transparent base frame portion 53 as explained in the fifth embodiment. The base frame portion 53 has predetermined hardness and also has twenty five elliptical apertures r1 to r25. As the base frame portion 53, a polycarbonate (PC), an acrylic resin (PMMA) or the like having thickness of around 0.01 to 0.5 [mm] is used. Also in this embodiment, the element muscle portions G1 to G25 are arranged in the inside of the elliptical concave shaped portions constituted by the base frame portion 53 and the electrode film portion 511. For example, each of the element muscle portions G1 to G25 has predetermined volume and the element muscle portions G1 to G25 are arranged by inserting them into the corresponding apertures r1 to r25 in the base frame portion 53 one by one.

For example, the element muscle portion G1 is inserted into the aperture r1 of the base frame portion 53 or is integrally molded to the base frame portion 53. Similarly, the element muscle portion G2, the element muscle portion G3, the element muscle portion G4, the element muscle portion G5, the element muscle portion G6, the element muscle portion G7 and the element muscle portion G8 are inserted into the aperture r2, the aperture r3, the aperture r4, the aperture r5, the aperture r6, the aperture r7 and the aperture r8, respectively or each is integrally molded to the base frame portion 53. Further, the element muscle portion G9, the element muscle portion G10, the element muscle portion G11, the element muscle portion G12, the element muscle portion G13, the element muscle portion G14, the element muscle portion G15, the element muscle portion G16 and the element muscle portion G17 are inserted into the aperture r9, the aperture r10, the aperture r11, the aperture r12, the aperture r13, the aperture r14, the aperture r15, the aperture r16 and the aperture r17, respectively or each is integrally molded to the base frame portion 53.

Also, the element muscle portion G18, the element muscle portion G19, the element muscle portion G20, the element muscle portion G21, the element muscle portion G22, the element muscle portion G23, the element muscle portion G24 and the element muscle portion G25 are inserted into the aperture r18, the aperture r19, the aperture r20, the aperture r21, the aperture r22, the aperture r23, the aperture r24 and the aperture r25, respectively or each is integrally molded to the base frame portion 53. In a case in which the above-mentioned insertion method is employed, the respective element muscle portions G1 to G25 is bonded to the electrode patterns 52a, 52b through ring shaped double-sided tapes 56. The element muscle portions G1 to G25 constitute the sense-of-touch-representing unit. Each of the element muscle portions G1 to G25 has, for example, an elliptical cylinder shape and thickness of around 0.01 to 0.5 [mm].

A film portion 5 constituting a function of a lid portion is provided on the upper portion of the base frame portion 53. As the film portion 5, there is used a transparent material having transmissivity and a refractive index which are approximately equal to transmissivity and a refractive index of the base frame portion 53. There is used, for example, a zeonor (trademark) having the film thickness of around 25 [μm]. The hardness thereof is around 20° to 40°.

In the above-mentioned base frame portion 53, the apertures r1 to r12 for the keys of numerals "0" to "9", the key of symbol "*", the key of symbol "#" or the like and the apertures r13 to r17 for the cross key, which correspond to the icon images for the input operation, respectively have elliptical shapes. The above-mentioned element muscle portions G1 to G25 are arranged corresponding to the keys K1 to K25 of various kinds of functions.

The element muscle portion G1 is arranged, similarly as the fifth embodiment, on the key K1 of numeral "1" of the icon image displayed on the display unit 29. The element muscle portion G2 is arranged on the key K2 of numeral "2" of the icon image displayed on the display unit 29. The element muscle portion G3 is arranged on the key K3 of numeral "3" of the icon image displayed on the display unit 29. The element muscle portion G4 is arranged on the key K4 of numeral "4" of the icon image displayed on the display unit 29. The element muscle portion G5 is arranged on the key K5 of numeral "5" of the icon image displayed on the display unit 29. The element muscle portion G6 is arranged on the key K6 of numeral "6" of the icon image displayed on the display unit 29. The element muscle portion G7 is arranged on the key K7 of numeral "7" of the icon image displayed on the display unit 29. The element muscle portion G8 is arranged on the key K8 of numeral "8" of the icon image displayed on the display unit 29. The element muscle portion G9 is arranged on the key K9 of numeral "9" of the icon image displayed on the display unit 29. The element muscle portion G10 is arranged on the key K10 of numeral "0" of the icon image displayed on the display unit 29.

Also, the element muscle portion G11 is arranged on the key K11 of symbol "*" of the icon image displayed on the display unit 29. The element muscle portion G12 is arranged on the key K12 of symbol "#" of the icon image displayed on the display unit 29. The element muscle portion G13 is arranged on the key of determination "O" of the cross key of the icon image displayed on the display unit 29. The element muscle portion G14 is arranged on the left facing arrow key of the icon image displayed on the display unit 29. The element muscle portion G15 is arranged on the upward facing arrow key of the icon image displayed on the display unit 29. The element muscle portion G16 is arranged on the right facing arrow key of the icon image displayed on the display unit 29. The element muscle portion G17 is arranged on the downward facing arrow key of the icon image displayed on the display unit 29.

Further, the element muscle portion G18 is arranged on the key of "etc" of the icon image displayed on the display unit 29. The element muscle portion G19 is arranged on the key of "REW" of the icon image displayed on the display unit 29. The element muscle portion G20 is arranged on the left facing arrow stop key of the icon image displayed on the display unit 29. The element muscle portion G21 is arranged on the right facing arrow stop key of the icon image displayed on the display unit 29. The element muscle portion G22 is arranged on the left facing fast-forward key of the icon image displayed on the display unit 29. The element muscle portion G23 is arranged on the fast-forward key of the icon image displayed on the display unit 29. The element muscle portion G24 is arranged on the reproduction key of the icon image displayed on the display unit 29. The element muscle portion G25 is arranged on the stop key of the icon image displayed on the display unit 29.

As the electrode film portion 511 which holds these element muscle portions G1 to G25, there is used a transparent thin film material having transmissivity and a refractive index which are approximately equal to transmissivity and a refractive index of the base frame portion 53. For the electrode patterns 51a, 51b, 52a, 52b, there is used, for example, an ITO film having the film thickness of around 0.1 to 0.125 [mm]. The hardness thereof is around 20° to 40°.

The plurality of electrode patterns 51a, 51b and the plurality of electrode patterns 52a, 52b which are arranged in the positive/negative manner in the electrode film portion 511 are connected with the driving power supply 55A, not shown in FIG. 36, which applies the driving voltage to the twenty five element muscle portions G1 to G25 for presenting a sense of touch which are sandwiched between the film portion 5 and the electrode film portion 511 for every group. For the driving power supply 55A, there is used a power supply unit having the direct-current power supply and the electrode selection function as explained in FIG. 29.

The configuration and the information processing example of the mobile phone mounted with the input device 700 are approximately similar as the configuration of the mobile phone 600 shown in FIG. 20 and the information processing example shown in FIG. 23, so that the explanation thereof will be omitted. It should be noted that with respect to mobile phone mounted with the input device 700, the block diagram can be applied by reading the input device 300 with the input device 700 and further, by reading the touch-sensitive variable sheet unit 103 with the touch-sensitive sheet member 170 in the block diagram shown in FIG. 20. Also, the flowchart can be applied by reading the element bag portions with the element muscle portions and by reading air-circulation unit 3A with the driving power supply 55A in the description on the flowchart shown in FIG. 23.

In this manner, according to the input device 700 as the seventh embodiment, the driving power supply 55A applies the DC driving voltage to the element muscle portions G1 to G17 or the element muscle portions G18 to G25 for every group. Consequently, at the positions corresponding to the respective operation keys of the base frame portion 53, the element muscle portions G1 to G25 may present the sense of touch for giving the concave and convex feeling by the protuberant shape or the cave-in shape depending on the swelling of the element muscle portions G1 to G25 or by the original shape without conducting electricity with respect to operator's finger or the like.

It is needless to say that the electrode patterns 51a, 51b, 52a, 52b may be wired so as to correspond to the respective operation keys and are gathered at the terminal 512 without connecting the electrode patterns 51a, 51b and the electrode patterns 52a, 52b in parallel, and the voltage-level of the DC driving voltage may be variably applied to the element muscle portions G1 to G25 corresponding to the respective operation keys from the driving power supply 55A. By constitution in this manner, at the positions corresponding to the respective operation key of the base frame portion 53, the respective element muscle portions G1 to G25 may present the programmable sense of touch for giving the concave and convex feeling by the protuberant shape or the cave-in shape in which the amount of swelling of the element muscle portions G1 to G25 is variably adjusted or by the original shape without conducting electricity with respect to operator's finger or the like.

Embodiment 8

Figure 37:
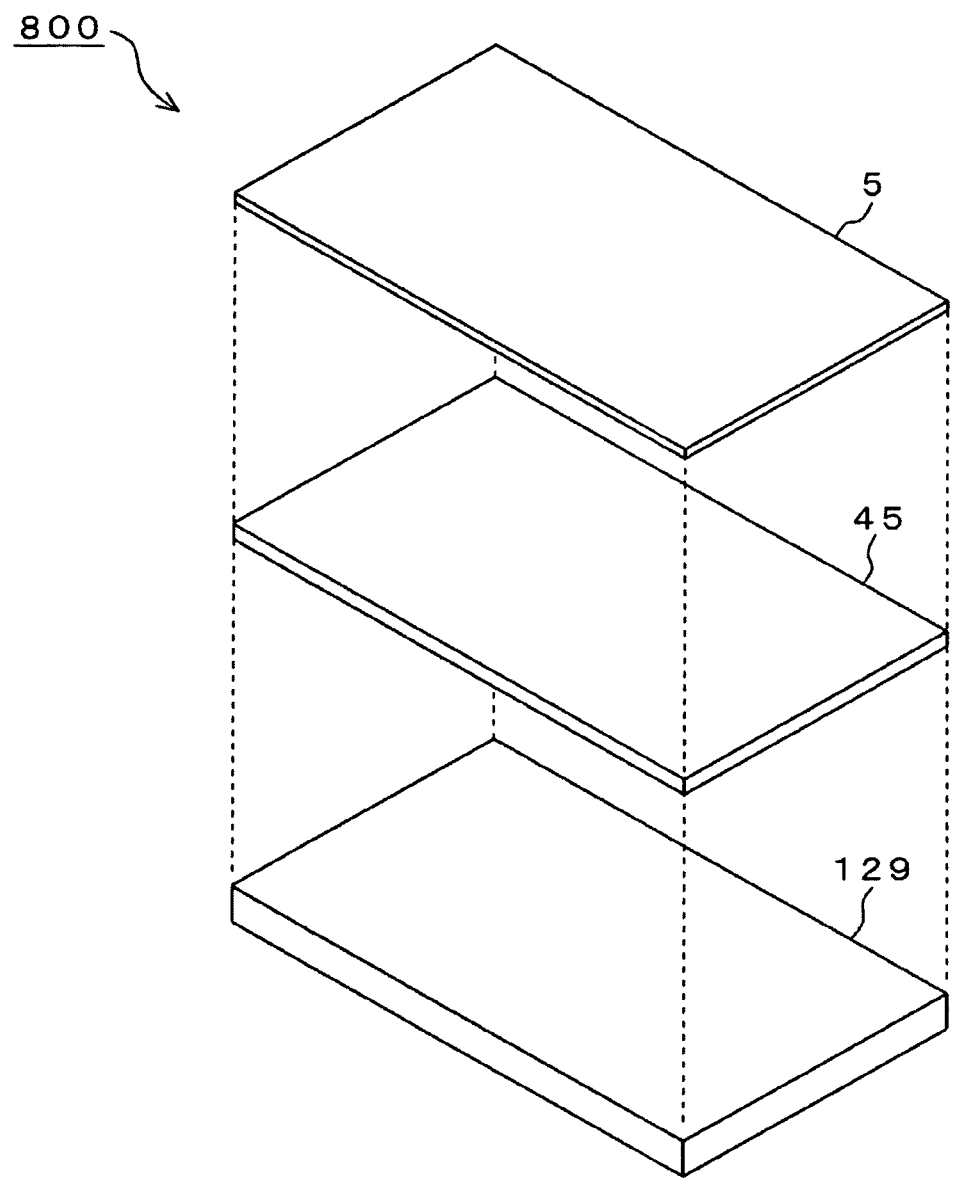
FIG. 37 is an exploded perspective view of an input device 800 as an eighth embodiment for showing a configuration thereof.

FIG. 37 shows a configuration of an input device 800 as an eighth embodiment. In this embodiment, there is provided the input device 800 in which the wiring pattern constituting the touch-sensitive sheet member is concurrently used with a portion of the wiring pattern constituting the display unit 29. Also, in this embodiment, the CPU 32 for controlling a touch-sensitive sheet member 180 for presenting a sense of touch executes the driving control so as to supply the driving voltage to an electrically conductive rubber 182 of the touch-sensitive sheet member 180 corresponding to the image contents displayed on the display unit 29, so that the electrically conductive rubber 182 is available at the electrode-forming positions corresponding to the image contents.

To the input device 800 shown in FIG. 37, the touch-sensitive sheet member 160 relating to the sixth embodiment is applied. In the input device 800, any information is inputted by the slide and/or press operation depending on the finger or the like of the operator 30 (operation body). The input device 800 includes the film portion 5, the input detection unit 45 and a display device 129 with the touch-sensitive variable sheet function.

The display device 129 has the function of the display unit 29 explained in the fifth embodiment and the facing electrodes structure of the touch-sensitive sheet member 160 explained in the sixth embodiment. The display device 129, similarly as the fifth embodiment, at a time of the input operation, displays the icon images of a key K1 of numeral "1" to a key K10 of numeral "0", a key K11 of symbol "*", a key K12 of a symbol "#" or the like, a key K13 of determination "O" of a cross key, a left facing arrow key K14 thereof, an upward facing arrow key K15 thereof, a right facing arrow key K16 thereof, a downward facing arrow key K17 thereof, a key K18 of "etc", a key K19 of "REW", a left facing arrow stop key K20, a right facing arrow stop key K21, a left facing fast-forward key K22, a fast-forward key K23, a reproduction key K24 and a stop key K25 or the like. As the display unit 129, a color organic EL display device or a liquid crystal display device (LCD device) is used.

The input detection unit 45 is provided on the upper portion of the display unit 129. The input detection unit 45 includes the operation surface. The input detection unit 45 is provided on the upper portion of the display unit 129 and operates so as to detect the slide position of the operator's finger or the like. As the input detection unit 45, for example, a capacitive touch panel is used. With respect to the input detection unit 45, anything is available only if the cursoring and the selection function can be distinguished. For example, other than the capacitive input device, it also may be a resistive touch panel, an input device of a surface acoustic wave system (SAW) or an optical system, a tact switch of a multi stage system or the like. Preferably, it may be enough if the input device has a constitution by which position detection information and press detection information can be applied to a control system.

The film portion 5 is provided on the upper portion of the input detection unit 45. As the film portion 5, there is used a transparent material having transmissivity and a refractive index which are approximately equal to transmissivity and a refractive index of the input detection unit 45. There is used, for example, a zeonor (trademark) having the film thickness of around 25 [μm]. The hardness thereof is around 20° to 40°.

Figure 38:
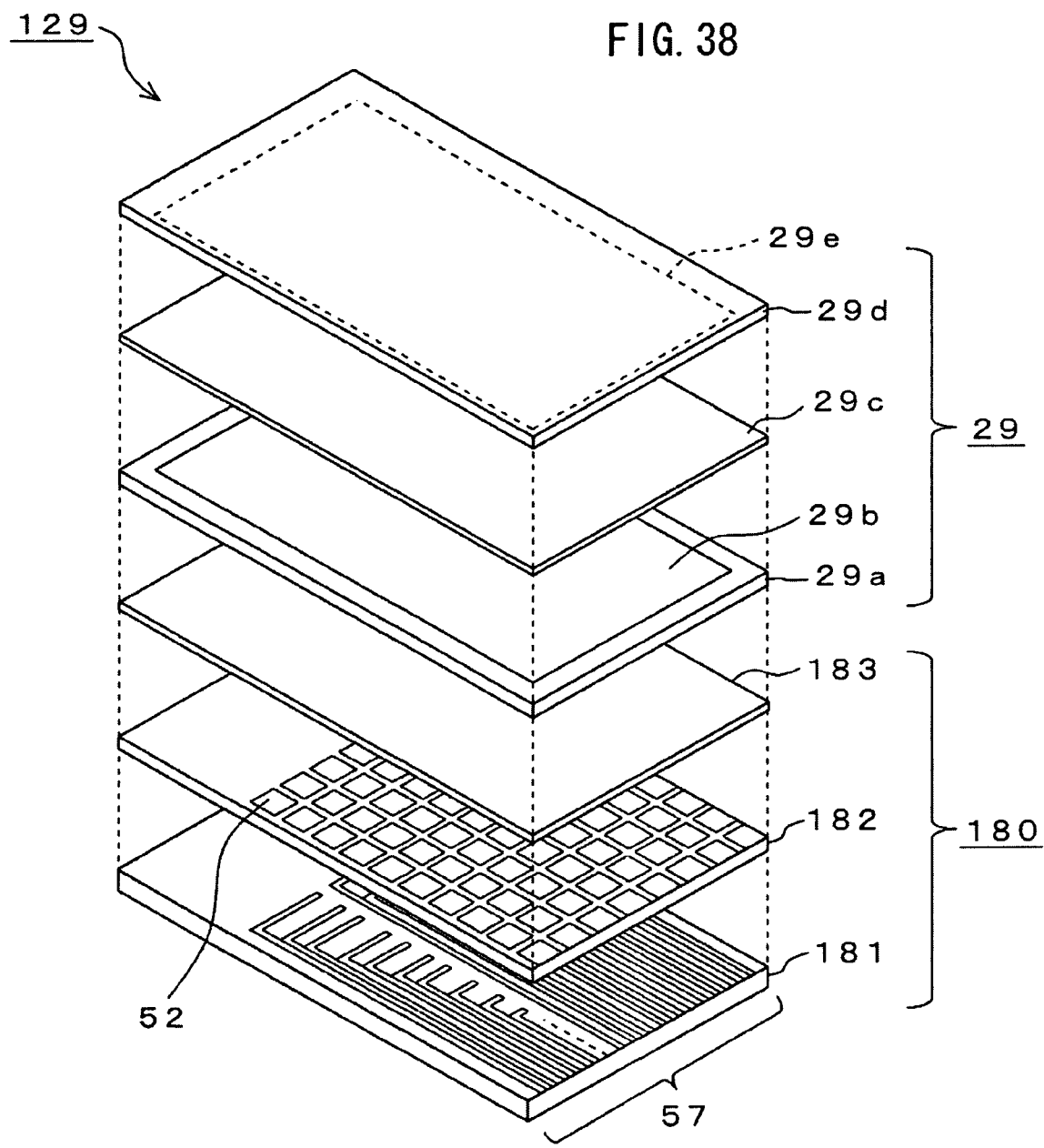
FIG. 38 is an exploded perspective view of a display device 129 with a touch-sensitive variable sheet function for showing a configuration thereof.
Figure 39:
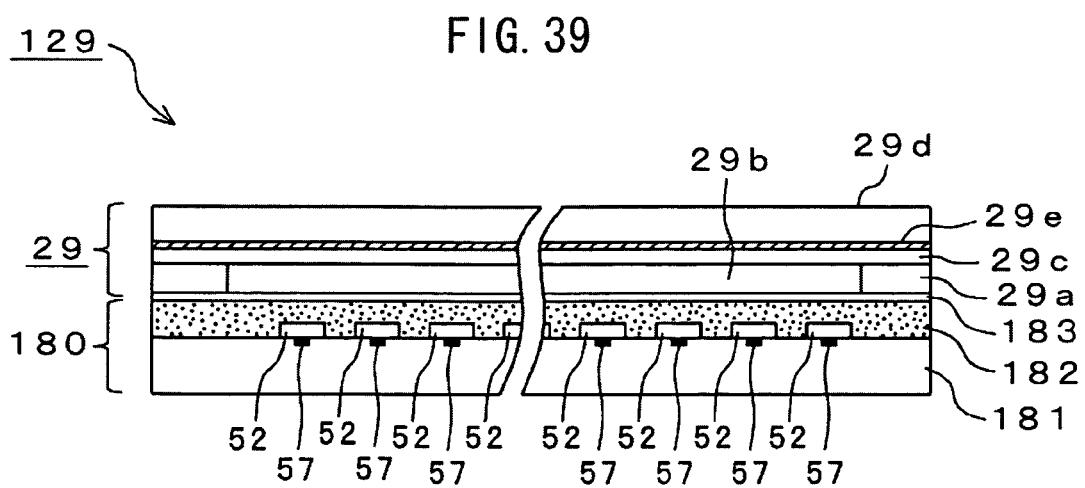
FIG. 39 is a partially cutaway sectional view of the display device 129 showing an example of a cross-section thereof.

FIG. 38 shows a configuration of the display device 129 with a touch-sensitive variable sheet function. FIG. 39 shows a configuration of a cross-section of the display device 129. The display device 129 shown in FIG. 38 includes a transparent touch-sensitive sheet member 180 which constitutes the touch-sensitive sheet member and a display unit 29 on the touch-sensitive sheet member 180. As the display unit 29, for example, an organic EL device is used.

The touch-sensitive sheet member 180 is provided to support the whole of the lower surface of the display unit 29, and is slid and/or pressed down along the operation surface of the display unit 29. It is needless to say that the touch-sensitive sheet member 180 may support a portion of the lower surface of the display unit 29.

The touch-sensitive sheet member 180 is provided with the structure of the muscular sheet portion 54A and the facing electrodes structure of the touch-sensitive sheet member 160 relating to the sixth embodiment. Further, a part of the wiring pattern of the display unit 29 is concurrently used with the wiring pattern of the touch-sensitive sheet member 180.

In this embodiment, the touch-sensitive sheet member 180 is constituted by layering the electrically conductive rubber 182 and an intermediate layer film 183 on a base film 181 as shown in FIG. 39. The base film 181 is composed of a polyethylene terephthalate (PET) based transparent material having the thickness of around 0.1 [mm] and an ITO film forming a wiring pattern group 57 which is patterned on the material. A wiring pitch of the wiring pattern group 57 is approximately around ½ to 1 times of an arrangement pitch of the display pixel.

The electrically conductive rubber 182 is bonded on the upper portion of the base film 181 by an adhesive agent or the like. As the electrically conductive rubber 182, a polymer material (artificial muscle) having transparency and also electric conductivity is used. The electrically conductive rubber 182 includes a flexible and strong electric conductive Embra (trademark) film and an electric conductive gel polymer which is largely swellable in good solvent. An operation voltage of each of them is around 1.5V.

On the bottom surface of the electrically conductive rubber 182, the electrodes 52 are arranged at the positions corresponding to the respective operation keys as shown in FIG. 39. The plurality of electrodes 52 are connected individually to the above-mentioned wiring pattern group 57. The intermediate layer film 183 is bonded on the upper portion of the electrically conductive rubber 182 by an adhesive agent or the like. As the intermediate layer film 183, an insulated and transparent polyimide based film member is used.

The display unit 29 which forms the organic EL device is bonded on the upper portion of the intermediate layer film 183 by an adhesive agent or the like. The display unit 29 includes a sealing layer 29a, a self-light-emitting organic material 29b, an intermediate layer film 29c, a base panel 29d and an electrode pattern 29e. The sealing layer 29a has a frame shape as shown in FIG. 38 and is provided on the intermediate layer film 183. The sealing layer 29a seals the self-light-emitting organic material 29b.

The intermediate layer film 29c is bonded on the upper portion of the sealing layer 29a and the self-light-emitting organic material 29b by an adhesive agent or the like. As the intermediate layer film 29c, the insulated and transparent polyimide based film member also is used. The base panel 29d is arranged on the upper portion of the intermediate layer film 29c. As the base panel 29d, a transparent film member or a glass member is used.

The electrode pattern 29e which is used concurrently by the touch-sensitive sheet member 180 and the display unit 29 is arranged on the bottom surface side of the base panel 29d. The electrode pattern 29e is composed of an ITO film, and a single pattern, a divided pattern in blocks or a divided pattern in a matrix shape is available therefor.

The above-mentioned wiring pattern group 57 is connected to the driving power supply 55A, which is not shown in FIGS. 38 and 39, together with the electrode pattern 29e of the display unit 29. The driving power supply 55A applies the DC driving voltage between the electrodes 52 and the electrode pattern 29e of the organic EL display device for every individual operation key. At that time, it is also allowed to apply the DC driving voltage by changing the voltage-level thereof variably. This enables the input device 800 to be configured.

Figures 40A, 40B, 40C:
FIGS. 40A to 40C are data format diagrams showing multiplex examples of display data and shape presentation signals in the input device 800.

FIGS. 40A to 40C show multiplex examples of display data and shape presentation signals in the input device 800.

A data format DF1 shown in FIG. 40A is used in a case in which the display of the icon image in the display unit 29 and the sense of touch representation by the electrically conductive rubber 182 in the touch-sensitive sheet member 180 are functioned simultaneously. The display data D1, D2, D3 . . . and the shape presentation signals S1a, S2a, S3 . . . are packetized and applied alternately between the electrode pattern 29e and the wiring pattern group 57. The minimum driving frequency fm of one packet is around 100 Hz to 1 KHz (0.1 to 10 ms in the period). The display data D1, D2, D3 . . . are digital-analogue converted and made as an image signal Sv.

For example, between the electrode 52 which is arranged for every individual operation key image and the electrode pattern 29e, there is applied the shape presentation signal S1a subsequent to the display data D1; there is applied the shape presentation signal S2a subsequent to the display data D2; there is applied the shape presentation signal S3 subsequent to the display data D3; there is applied the shape presentation signal S4 subsequent to the display data D4; there is applied the shape presentation signal S5 subsequent to the display data D5; and there is applied the shape presentation signal S6 subsequent to the display data D6, by time divisional multiplexing through the wiring pattern group 57.

A data format DF2 shown in FIG. 40B is used in a case in which only the sense of touch representation is functioned by the electrically conductive rubber 182 in the touch-sensitive sheet member 180. The shape presentation signals S1a, S2a, S3, S4, S5, S6 . . . and so on are packetized and applied between the electrode pattern 29e and the wiring pattern group 57. For example, there is employed an intermittent transmission system such that the shape presentation signal S1a and the next shape presentation signal S2a are transmitted with intermitting one vacant packet to the electrode 52 arranged for every individual operation key image and the electrode pattern 29e through the wiring pattern group 57. It is needless to say that a redundant transmission system may be employed in which the shape presentation signal S1a is inserted in two packets and transmitted.

A data format DF3 shown in FIG. 40C is used in a case in which only the display of the icon image in the display unit 29 is functioned. The items of the display data D1, D2, D3 . . . are packetized and applied between the electrode pattern 29e and the wiring pattern group 57. The items of the display data D1, D2, D3 . . . are digital-analogue converted and made as the image signal Sv. For example, in the intermittent transmit system, the display data D1 and the next display data D2 are sequentially transmitted with intermitting one vacant packet to the electrode 52 arranged corresponding to the individual operation key image and the electrode pattern 29e through the wiring pattern group 57. In the redundant transmission system, the display data D1 which is inserted in two packets and the next display data D2 which is inserted in the next two packets are transferred.

In the above-mentioned input device 800, the items of the display data D1, D2, D3 . . . are outputted to the display unit 29 instead of the image signal Sv from a signal processing unit, which is not shown, such as the image-and-audio-processing unit 44 shown in the FIG. 20. The shape presentation signals S1, S2, S3 . . . are outputted to the touch-sensitive sheet member 180 instead of the vibration control signal Sout2. It is needless to say that the display data D1, D2, D3 . . . may be supplied to the display unit 29 from the image-and-audio-processing unit 44 or the shape presentation signals S1', S2', S3 . . . may be outputted to the touch-sensitive sheet member 180.

Figure 41:
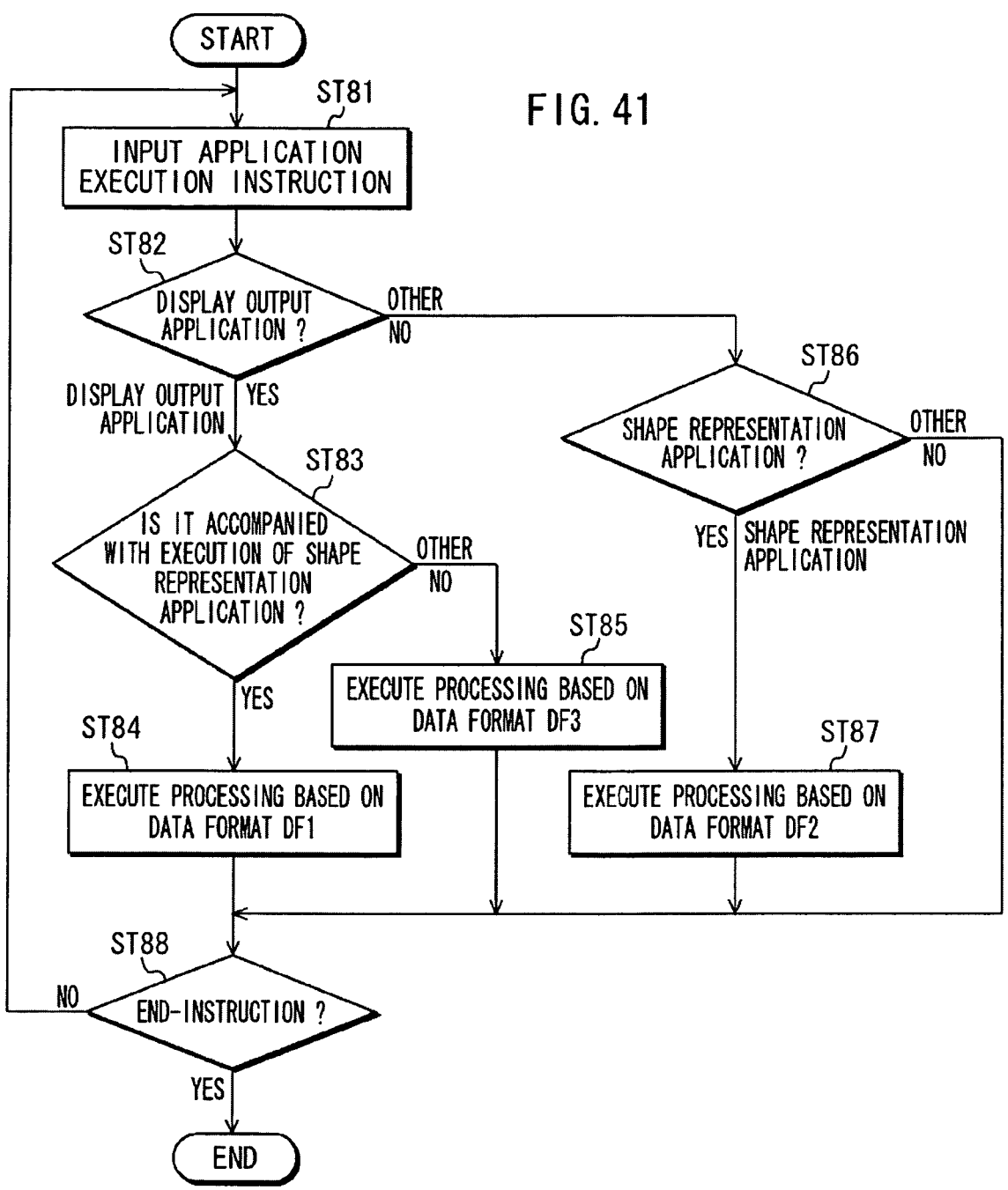
FIG. 41 is an operation flowchart showing a selection example of a sense of touch and/or a display function in the input device 800.

The following will describe an operation example of the input device 800. A selection example of a sense of touch and/or a display function will be explained. FIG. 41 shows the selection example of the sense of touch and/or the display function in the input device 800.

In this example, there is cited a case in which, based on the selection of a display output application or a shape presentation application of the icon images, the input device 800 mounted with the touch-sensitive sheet member 180 displays the operation screen and, by linking with this display, the sense-of-touch-representing unit is built by applying the driving voltage to the electrically conductive rubber 182 in the touch-sensitive sheet member 180 through the electrode 52 and the electrode pattern 29e. In this example, when there is an application execution instruction, a case is illustrated in which a selection candidate is changed over in order of the display output application→the shape presentation application.

In this example, the input device 800 is connected with the control unit 15 shown in FIG. 20, in which the CPU 32 thereof controls the driving power supply 55A, which is not shown, so as to apply the driving voltage through the plurality of electrodes 52 and the electrode pattern 29e of the touch-sensitive sheet member 180 corresponding to the video contents displayed on the display unit 29, and the electrically conductive rubber 182 forms the convex and concave shapes at predetermined positions corresponding to the video contents.

By setting these as the selection condition of the sense of touch and/or the display function, the CPU 32 inputs an application execution instruction at step ST81 of the flowchart shown in FIG. 41. The application execution instruction is given to the CPU 32, for example, by making power switch-ON information as a trigger. Thereafter, the process shifts to step ST82 where the CPU 32 branches the control thereof depending on whether the application execution instruction is an execution instruction of the display output application or other application execution instruction.

If the application execution instruction is an execution instruction of the display output application accompanied with the shape presentation application or only the display output application instruction, the process shifts to step ST83 where the CPU 32 reads the control information of the display output application. The control information is made correspondence with the display output application, the shape presentation application or the like beforehand. The CPU 32 controls the output(s) of the display unit 29 and/or the touch-sensitive sheet member 180 based on the control information.

In this example, because there is assumed a case in which even if the application execution instruction is an execution instruction of the display output application, the shape presentation application is also executed in parallel, the CPU 32 branches the control thereof depending on the contents of the application execution instruction even in step ST83. If accompanying with the execution of the shape presentation application, the process shifts to step ST84 where the CPU 32 controls the display unit 29 and the touch-sensitive sheet member 180 so as to function the display of the icon images for the operation keys and the sense of touch representation by the electrically conductive rubber 182 simultaneously.

For example, the CPU 32 outputs the display data and the shape presentation signals D1, S1, D2, S2, D3, S3, D4, S4, D5, S5, D6, . . . and so on to the input device 800 by the data format DF1 shown in FIG. 40A. The display data D1, D2, D3, . . . and so on and the shape presentation signals S1', S2', S3, . . . and so on are packetized and applied between the electrode pattern 29e and the wiring pattern group 57 alternately. The items of the display data D1, D2, D3 . . . and so on are respectively digital-analogue-converted and made as an image signal Sv. The display unit 29 displays the icon images for the operation keys based on the image signal Sv. The driving power supply 55A, which is not shown, applies the driving voltage to any of the plurality of electrodes 52 and the electrode pattern 29e of the touch-sensitive sheet member 180 at the positions thereof corresponding to the display contents of the icon images for the operation keys. Thus, it is constituted such that the electrically conductive rubber 182 forms the convex and concave shapes at predetermined positions corresponding to the image contents. Thereafter, the process shifts to step ST88.

At the above-mentioned step ST83, if the application execution instruction is an execution instruction of only the display output application, the process shifts to step ST85 where the CPU 32 controls the display unit 29 so as to function only the display of the icon images for the operation keys. For example, the CPU 32 outputs the display data D1, D2, D3, D4, D5, D6 . . . to the input device 800 by the data format DF3 shown in FIG. 40C. The items of the display data D1, D2, D3 . . . are applied between the electrode pattern 29e and the wiring pattern group 57 by using the every other packet or the two packets. The items of the display data D1, D2, D3 . . . are respectively digital-analogue-converted and made as an image signal Sv. The display unit 29 displays the icon images for the operation keys based on the image signal Sv. Thereafter, the process shifts to the step ST88.

Also, at the above-mentioned step ST82, if the application execution instruction is an execution instruction of an application other than the display output application, the process shifts to step ST86 where the control is branched depending on whether the application execution instruction is an execution instruction of the shape presentation application or an execution instruction of the other application. If the application execution instruction is an execution instruction of the shape presentation application, the process shifts to step ST87 where the CPU 32 reads the control information of the shape presentation application. The CPU 32 controls the driving power supply 55A, which is not shown, based on the control information, thus applying the driving voltage to the plurality of electrodes 52 and the electrode pattern 29*e* of the touch-sensitive sheet member 180. This enables the electrically conductive rubber 182 to form the convex and concave shapes at predetermined positions. Thereafter, the process shifts to the step ST88.

In the step ST88 to which the process shifts, the end of the input processing in the input device 800 is judged. For example, the CPU 32 detects the end-instruction outputted from a high rank control system. If the end-instruction is not detected, the process returns to the step ST81 where the above-mentioned processing is repeated. If the end-instruction is detected, the input processing in the input device 800 is ended.

In this manner, the input device 800 as the eighth embodiment is provided with the display device 129 with the touch-sensitive variable sheet function, which has the embodiment of the touch-sensitive sheet member 180, so that even if the display surface is observed to be a flat shape, when the icon images or the like displayed on the display unit 29 are touched with the finger of the operator and the finger is slid on the upper portion of the electrically conductive rubber 182 under the display screen, it becomes possible to present the input operation accompanied with the concave and convex feeling. Thus, it becomes possible to provide the input device 800 with the programmable touch-sensitive variable sheet function for icon touch.

According to the above-mentioned embodiment, the DC driving voltage is applied to the electrodes 52 corresponding to the respective operation keys and the electrode pattern 29*e* from the driving power supply 55A with the voltage-level thereof being changed variably. Such a configuration enables the position, which corresponds to the individual operation key, of the electrically conductive rubber 182 sandwiched between the electrode 52 becoming the key element and the electrode pattern 29*e* to present the programmable sense of touch which gives the concave and convex feeling with respect to operator's finger or the like by the protuberant shape or the cave-in shape of the electrically conductive rubber 182 in which the amount of swelling of the portion of the electrically conductive rubber 182 is adjusted or by the original shape without conducting electricity.

Figure 42:
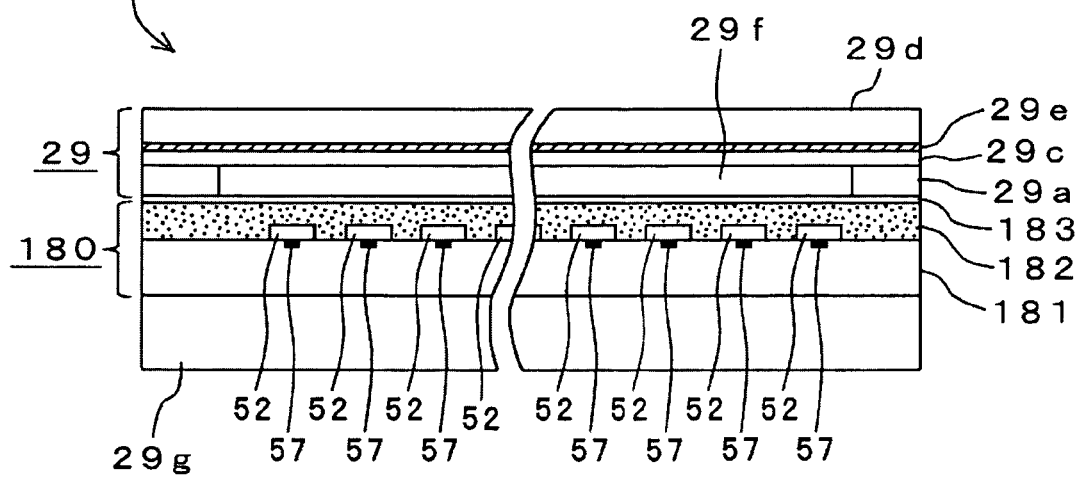
FIG. 42 is a partially cutaway sectional view of a display device 229 with a touch-sensitive variable sheet function, which is applicable to the input device 800, for showing a configuration of the display device 229.

The following will describe a modification example (No. 1) of the display device in the input device 800. FIG. 42 shows a configuration of a display device 229 with a touch-sensitive variable sheet function, which is applicable to the input device 800. The display device 229 shown in FIG. 42 includes the transparent touch-sensitive sheet member 180 constituting the touch-sensitive sheet member and the display unit 29 on the touch-sensitive sheet member 180. The electrode pattern 29*e* and the wiring pattern group 57 which are concurrently used by the touch-sensitive sheet member 180 and the display unit 29 are also included. In this example, as the display unit 29, a liquid crystal display device is used instead of the organic EL device, and a back light 29*g* is provided in the lowest layer. With respect to the other members and functions, the members similar to those of the display device 129 are used and the functions similar to those of the display device 129 are included, so that the explanation thereof will be omitted.

In this example, the touch-sensitive sheet member 180 is provided on the back light 29*g* shown in FIG. 42. The base film 181 is provided on the back light 29*g*, and the electrically conductive rubber 182 and the intermediate layer film 183 are layered on this upper portion. The electrically conductive rubber 182 is bonded on the upper portion of the base film 181 by an adhesive agent or the like. As the electrically conductive rubber 182, a sheet shaped polymer material (artificial muscle) having transparency and also electric conductivity is used.

In the bottom surface of the electrically conductive rubber 182, the electrodes 52 are arranged at the positions each corresponding to the individual operation key, as shown in FIG. 42. The plurality of electrodes 52 are respectively connected to the above-mentioned wiring pattern group 57. The intermediate layer film 183 is bonded on the upper portion of the electrically conductive rubber 182 by an adhesive agent or the like. The display unit 29 which forms the liquid crystal display device is bonded on the upper portion of the intermediate layer film 183 by an adhesive agent or the like.

The display unit 29 includes the sealing layer 29*a*, the liquid crystal material 29*f*, the intermediate layer film 29*c*, the base panel 29*d*, the electrode pattern 29*e* and the back light 29*g*. The sealing layer 29*a* has a frame shape shown in FIG. 38 and is provided on the intermediate layer film 183, which enables the liquid crystal material 29*f* to be sealed up.

The intermediate layer film 29*c* is bonded on the upper portion of the sealing layer 29*a* and the liquid crystal material 29*f* by an adhesive agent or the like. The base panel 29*d* is arranged on the upper portion of the intermediate layer film 29*c*. The electrode pattern 29*e* which is concurrently used by the touch-sensitive sheet member 180 and the display unit 29 is arranged on the lower surface side of the base panel 29*d*. The above-mentioned wiring pattern group 57 together with the electrode pattern 29*e* of the display unit 29 is connected to the driving power supply 55A, not shown, which applies the DC driving voltage to the electrode 52 and the electrode pattern 29*e* of the liquid crystal display device for every individual operation key. At that time, the DC driving voltage may be applied with the voltage-level thereof being changed. In this manner, the display device 229 that is applicable to the input device 800 is configured.

The display device 229 thus configured having the liquid crystal display device on the touch-sensitive sheet member 180 may present the input operation accompanied with the concave and convex feeling when the icon images or the like displayed on the display unit 29 are touched with the operator's finger and the finger slides on the upper portion of the electrically conductive rubber 182 under the display screen, even if the display surface thereof is observed to be a flat shape. Thus, it becomes possible to provide the input device 800 with the programmable touch-sensitive input sheet for icon touch.

Figure 43:
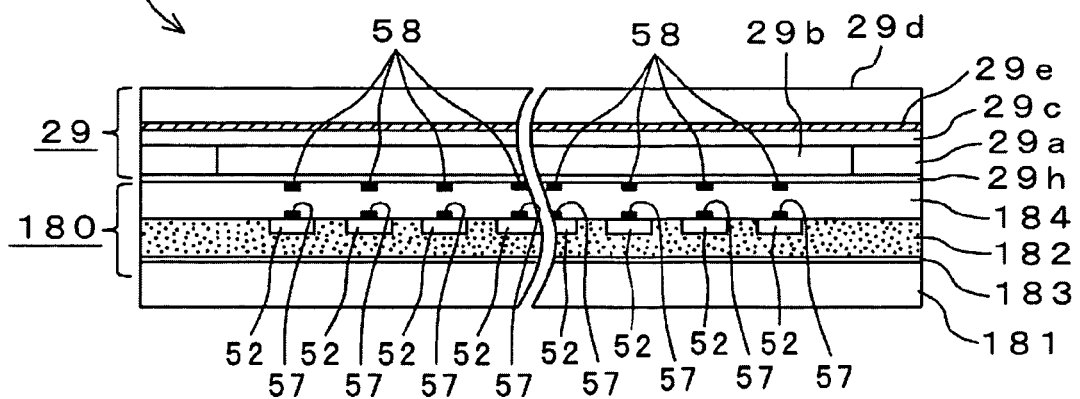
FIG. 43 is a partially cutaway sectional view of a display device 329 with a touch-sensitive variable sheet function, which is applicable to the input device 800, for showing a configuration of the display device 329.

The following will describe a modification example (No. 2) of the display device in the input device 800. FIG. 43 shows a configuration of a display device 329 with a touch-sensitive variable sheet function, which is applicable to the input device 800. The display device 329 shown in FIG. 43 includes the transparent touch-sensitive sheet member 180 and the display unit 29 on the touch-sensitive sheet member 180. The electrode pattern 29e, which is concurrently used by the touch-sensitive sheet member 180 and the display unit 29, and wiring pattern groups 57, 58, which are arranged respectively, are also included. In this example, as the display unit 29, an organic EL device is used instead of a liquid crystal display device.

In this example, the touch-sensitive sheet member 180 includes the base film 181 shown in FIG. 43 and layered intermediate layer film 183 and electrically conductive rubber 182 on the base film 181. The intermediate layer film 183 may be omitted. The intermediate layer film 183 is bonded on the upper portion of the base film 181 by an adhesive agent or the like and the electrically conductive rubber 182 is bonded on the intermediate layer film 183 by the same agent. As the electrically conductive rubber 182, a sheet shaped polymer material (artificial muscle) having transparency and electric conductivity is used.

A film portion 184 for wiring is provided on the upper portion of the electrically conductive rubber 182. As the film portion 184, an insulated and transparent polyimide based film member is used. The wiring pattern group 57 for the touch-sensitive variable sheet is provided on the bottom surface side of the film portion 184 and the wiring pattern group 58 for the organic EL device is provided on the front surface side thereof. In this example, the electrodes 52 shown in FIG. 43 are arranged at the positions each corresponding to the individual operation key image on a front surface side of the electrically conductive rubber 182, and the plurality of electrodes 52 are connected to the wiring pattern group 57 respectively.

The display unit 29 having the organic EL device is bonded on the upper portion of the film portion 184 for wiring by an adhesive agent or the like. The display unit 29 includes the sealing layer 29a, the self-light-emitting organic material 29b, the intermediate layer film 29c, the base panel 29d and the electrode pattern 29e. The sealing layer 29a has a frame shape shown in FIG. 38 and is provided on an intermediate layer film 29h, which enables the self-light-emitting organic material 29b to be sealed up.

The intermediate layer film 29c is bonded on the upper portion of the sealing layer 29a and the self-light-emitting organic material 29b by an adhesive agent or the like. The base panel 29d is arranged on the upper portion of the intermediate layer film 29c. The electrode pattern 29e is arranged on the bottom surface side of base panel 29d and is concurrently used by the touch-sensitive sheet member 180 and the display unit 29. The wiring pattern group 58 of the bottom surface side of the intermediate layer film 29h together with the electrode pattern 29e is used to apply the driving voltage to each pixel of the self-light-emitting organic material 29b.

The above-mentioned wiring pattern groups 57, 58 together with the electrode pattern 29e of the display unit 29 are connected to the driving power supply 55A, not shown, which applies the DC driving voltage to the electrode 52 and the electrode pattern 29e which is concurrently used with the organic EL device, for every individual operation key. At that time, the DC driving voltage may be applied with the voltage-level thereof being changed. In this manner, the display device 329 that is applicable to the input device 800 is configured. With respect to the other members and functions, the members similar to those of the display device 129 are used and the functions similar to those of the display device 129 are included, so that the explanation thereof will be omitted.

The display device 329 thus configured having the organic EL device on the touch-sensitive sheet member 180 may present the input operation accompanied with the concave and convex feeling when the icon images or the like displayed on the display unit 29 are touched with the operator's finger or the like and the finger slides on the upper portion of the electrically conductive rubber 182 under the display screen if the wiring pattern group 58 is provided without concurrently using the wiring pattern group 57, even if the display surface is observed to be a flat shape. Thus, it becomes possible to provide the input device 800 with the programmable touch-sensitive input sheet for icon touch.

Figure 44:
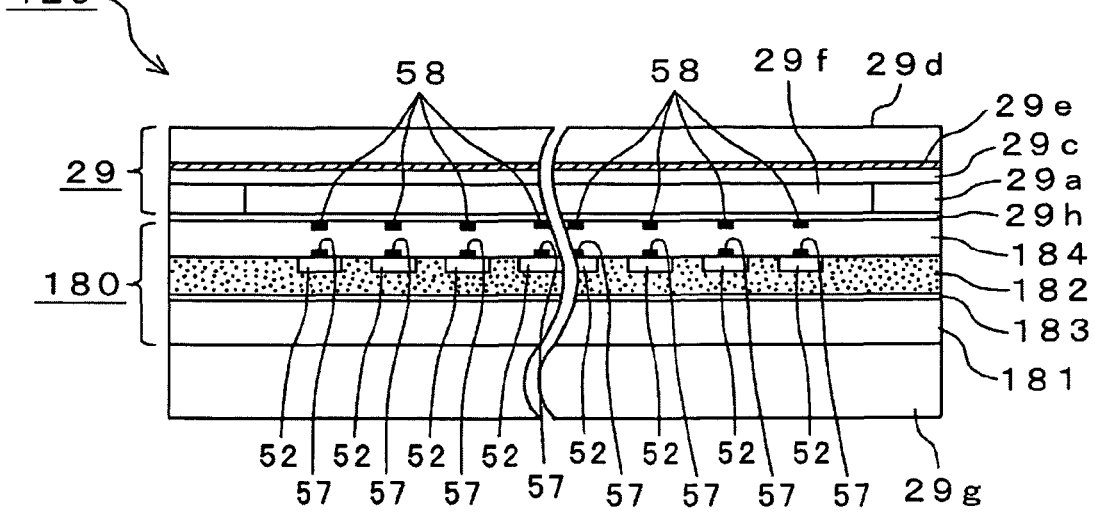
FIG. 44 is a partially cutaway sectional view of a display device 429 with a touch-sensitive variable sheet function, which is applicable to the input device 800, for showing a configuration of the display device 429.

The following will describe a modification example (No. 3) of the display device in the input device 800. FIG. 44 shows a configuration of a display device 429 with a touch-sensitive variable sheet function, which is applicable to the input device 800. The display device 429 shown in FIG. 44 includes the transparent touch-sensitive sheet member 180 and the display unit 29 on the touch-sensitive sheet member 180. The electrode pattern 29e, which is concurrently used by the touch-sensitive sheet member 180 and the display unit 29, and the wiring pattern groups 57, 58, which are arranged respectively, are also included. In this example, as the display unit 29, a liquid crystal display device is used instead of an organic EL device.

In this example, the touch-sensitive sheet member 180 includes a base film 181 on the upper portion of a back light 29g shown in FIG. 44 and layered intermediate layer film 183 and electrically conductive rubber 182 on the base film 181. The intermediate layer film 183, the base film 181 or the like may be omitted. The intermediate layer film 183 is bonded on the upper portion of the base film 181 by an adhesive agent or the like and the electrically conductive rubber 182 is bonded on the intermediate layer film 183 by the same agent. As the electrically conductive rubber 182, a sheet shaped polymer material (artificial muscle) having transparency and electric conductivity is used.

A film portion 184 for wiring is provided on the upper portion of the electrically conductive rubber 182. As the film portion 184, an insulated and transparent polyimide based film member is used. The wiring pattern group 57 for the touch-sensitive variable sheet is provided on the bottom surface side of the film portion 184 and the wiring pattern group 58 for liquid crystal display device is provided on the front surface side thereof. In this example, the electrodes 52 shown in FIG. 44 are arranged at the positions each corresponding to the individual operation key image on a front surface side of the electrically conductive rubber 182, and the plurality of electrodes 52 are connected to the wiring pattern group 57 respectively.

The display unit 29 having the liquid crystal display device is bonded on the upper portion of the film portion 184 for wiring by an adhesive agent or the like. The display unit 29 includes the sealing layer 29a, a liquid crystal material 29f, the intermediate layer film 29c, the base panel 29d and the electrode pattern 29e. The sealing layer 29a has a frame shape shown in FIG. 38 and is provided on an intermediate layer film 29h, which enables the liquid crystal material 29f to be sealed up.

The intermediate layer film 29c is bonded on the upper portion of the sealing layer 29a and the liquid crystal material 29f by an adhesive agent or the like. The base panel 29d is arranged on the upper portion of the intermediate layer film 29c. The electrode pattern 29e is arranged on the bottom surface side of base panel 29d and is concurrently used by the touch-sensitive sheet member 180 and the display unit 29. The wiring pattern group 58 of the bottom surface side of the intermediate layer film 29h together with the electrode pattern 29e applies the driving voltage to each pixel of the liquid crystal material 29f.

The above-mentioned wiring pattern groups 57, 58 together with the electrode pattern 29e of the display unit 29 are connected to the driving power supply 55A, not shown, which applies the DC driving voltage to the electrode 52 and the electrode pattern 29e which is concurrently used by the liquid crystal display device, for every individual operation key. At that time, the DC driving voltage may be applied with the voltage-level thereof being changed. In this manner, the display device 429 that is applicable to the input device 800 is configured. With respect to the other members and functions, the members similar to those of the display device 129 are used and the functions similar to those of the display device 129 are included, so that the explanation thereof will be omitted.

The display device 429 thus configured having the liquid crystal display device on the touch-sensitive sheet member 180 may present the input operation accompanied with the concave and convex feeling when the icon images or the like displayed on the display unit 29 are touched with the operator's finger and the finger slides on the upper portion of the electrically conductive rubber 182 under the display screen if the wiring pattern group 58 is provided without concurrently using the wiring pattern group 57, even if the display surface is observed to be a flat shape. Thus, it becomes possible to provide the input device 800 with the programmable touch-sensitive input sheet for icon touch.

Figure 45:
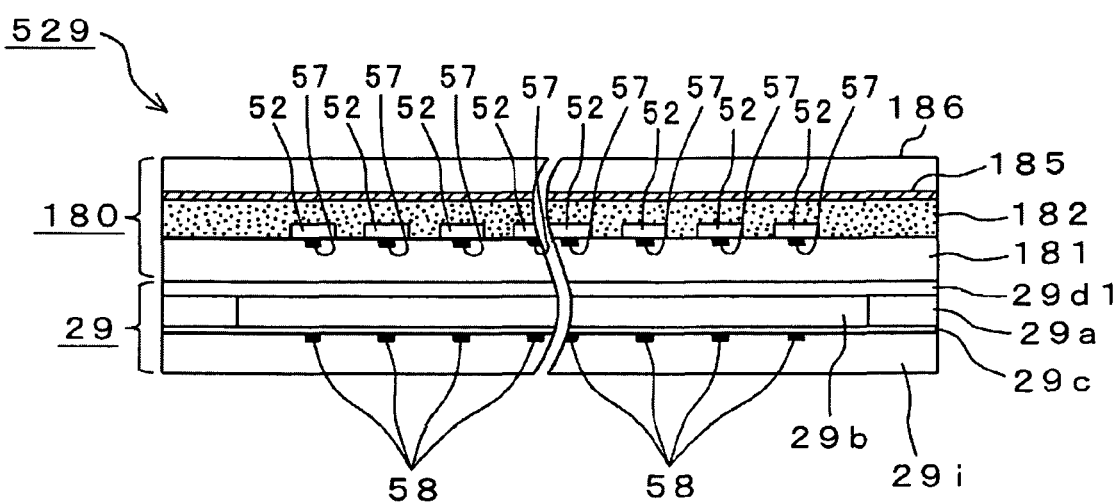
FIG. 45 is a partially cutaway sectional view of a display device 529 with a touch-sensitive variable sheet function, which is applicable to the input device 800, for showing a configuration of the display device 529.

The following will describe a modification example (No. 4) of the display device in the input device 800. FIG. 45 shows a configuration of a display device 529 with a touch-sensitive variable sheet function, which is applicable to the input device 800. The display device 529 shown in FIG. 45 includes the transparent touch-sensitive sheet member 180 and the display unit 29 on the touch-sensitive sheet member 180. An electrode pattern 185, which is concurrently used by the touch-sensitive sheet member 180 and the display unit 29, and the wiring pattern groups 57, 58, which are arranged respectively, are also included. In this example, an organic EL device is used as the display unit 29 instead of a liquid crystal display device and the touch-sensitive sheet member 180 is provided on the upper portion of the display unit 29.

In this example, the display device 529 includes a film portion 29i for the organic EL wiring. As the film portion 29i, an insulated and transparent polyimide based film member is used. The wiring pattern group 58 for organic EL device is provided on the surface side of the film portion 29i. The display unit 29 having the organic EL device is bonded on the upper portion of the film portion 29i by an adhesive agent or the like. The display unit 29 includes the sealing layer 29a, the self-light-emitting organic material 29b, the intermediate layer film 29c and a sealing panel 29d1. The sealing layer 29a has a frame shape shown in FIG. 38 and is provided on the intermediate layer film 29c, which enables the self-light-emitting organic material 29b to be sealed up. The sealing panel 29d1 is arranged on the upper portion of the sealing layer 29a and the self-light-emitting organic material 29b. The touch-sensitive sheet member 180 is provided on the upper portion of the sealing panel 29d1.

In this example, the touch-sensitive sheet member 180 includes the base film 181 shown in FIG. 45, the electrically conductive rubber 182, the electrode pattern 185 and the base panel 186. The electrically conductive rubber 182, the electrode pattern 185 and the base panel 186 are layered on the base film 181. The wiring pattern group 57 is arranged on the front surface side of the base film 181. The electrically conductive rubber 182 is bonded on the upper portion of the base film 181 by an adhesive agent or the like. As the electrically conductive rubber 182, a sheet shaped polymer material (artificial muscle) having transparency and electric conductivity is used.

In this example, the electrodes 52 shown in FIG. 45 are arranged at the positions each corresponding to the individual operation key image on the bottom surface side of the electrically conductive rubber 182. The plurality of electrodes 52 are connected to the wiring pattern group 57, respectively. The electrode pattern 185 is arranged on the upper portion of the electrically conductive rubber 182 and is concurrently used by the touch-sensitive sheet member 180 and the display unit 29. The base panel 186 is provided on the upper portion of the electrode pattern 185. The driving voltage is applied to each pixel of the self-light-emitting organic material 29b via the wiring pattern group 58 of the bottom side of the above-mentioned intermediate layer film 29c and the electrode pattern 185.

The above-mentioned wiring pattern groups 57, 58 together with the electrode pattern 185 of the display unit 29 are connected to the driving power supply 55A, not shown, which applies the DC driving voltage to the electrode 52 and the electrode pattern 185 which is concurrently used by the organic EL device, for every individual operation key. At that time, the DC driving voltage may be applied with the voltage-level thereof being changed. In this manner, the display device 529 that is applicable to the input device 800 is configured. With respect to the other members and functions, the members similar to those of the display device 129 are used and the functions similar to those of the display device 129 are included, so that the explanation thereof will be omitted.

The display device 529 thus configured having the touch-sensitive sheet member 180 on the display unit 29 may present the input operation accompanied with the concave and convex feeling when the icon images or the like displayed on the display unit 29 are touched with the operator's finger and the finger slides on the upper portion of the electrically conductive rubber 182 under the display screen if the wiring pattern group 58 is provided without concurrently using the wiring pattern group 57, even if the display surface is observed to be a flat shape. Thus, it becomes possible to provide the input device 800 with the programmable touch-sensitive input sheet for icon touch.

Figure 46:
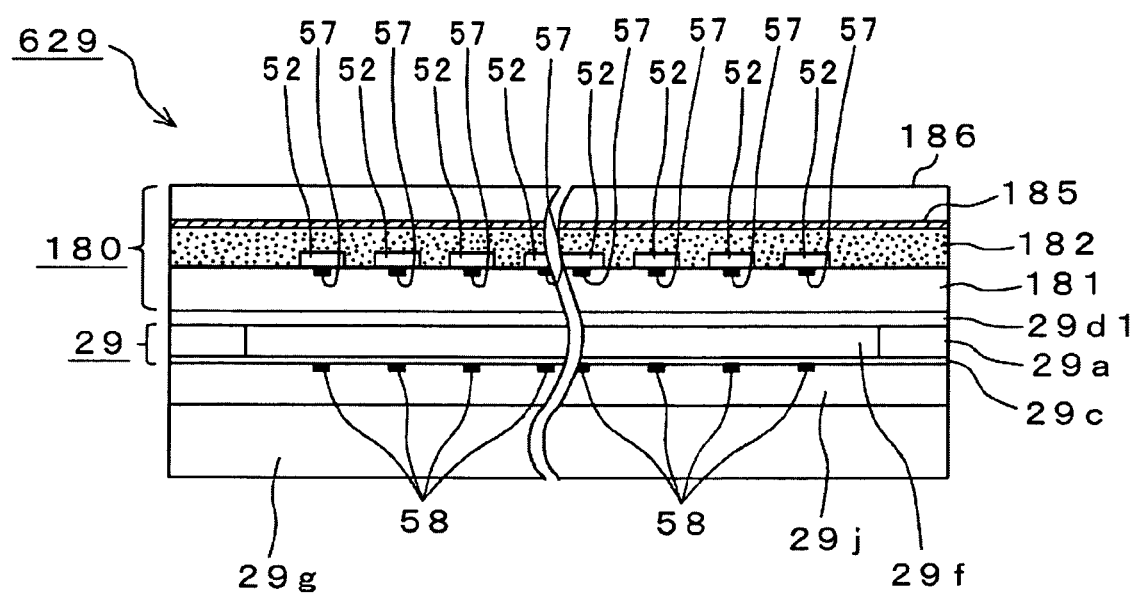
FIG. 46 is a partially cutaway sectional view of a display device 629 with a touch-sensitive variable sheet function, which is applicable to the input device 800, for showing a configuration of the display device 629.

The following will describe a modification example (No. 5) of the display device in the input device 800. FIG. 46 shows a configuration of a display device 629 with a touch-sensitive variable sheet function, which is applicable to the input device 800. The display device 629 shown in FIG. 46 includes the display unit 29 and the transparent touch-sensitive sheet member 180 on the display unit 29. The electrode pattern 29e, which is concurrently used by the touch-sensitive sheet member 180 and the display unit 29, and the wiring pattern groups 57, 58, which are arranged respectively, are also included. In this example, a liquid crystal display device is used as the display unit 29 instead of an organic EL device.

In this example, the display unit 29 includes a film portion 29j for the liquid crystal wiring on the upper portion of the back light 29g shown in FIG. 46. As the film portion 29j, an insulated and transparent polyimide based film member is used. The wiring pattern group 58 for the liquid crystal display device is provided on a front surface side of the film portion 29j.

The display unit 29 having the liquid crystal display device is bonded on the upper portion of the film portion 29j for the wiring by an adhesive agent or the like. The display unit 29 includes the sealing layer 29a, the intermediate layer film 29c, the sealing panel 29d1 and the liquid crystal material 29f. The sealing layer 29a has a frame shape shown in FIG. 38 and is provided on the intermediate layer film 29c, which enables the liquid crystal material 29f to be sealed up. The sealing panel 29d1 is bonded on the upper portion of the sealing layer 29a and the liquid crystal material 29f by an adhesive agent or the like. The touch-sensitive sheet member 180 is provided on the upper portion of the sealing panel 29d1.

In this example, the touch-sensitive sheet member 180 includes the base film 181 shown in FIG. 46, the electrically conductive rubber 182, the electrode pattern 185 and the base panel 186. The electrically conductive rubber 182, the electrode pattern 185 and the base panel 186 are layered on the base film 181. The wiring pattern group 57 is arranged on the front surface side of the base film 181. The electrically conductive rubber 182 is bonded on the upper portion of the base film 181 by an adhesive agent or the like. As the electrically conductive rubber 182, a sheet shaped polymer material (artificial muscle) having transparency and electric conductivity is used.

In this example, the electrodes 52 shown in FIG. 46 are arranged at the positions each corresponding to the individual operation key image on the bottom surface side of the electrically conductive rubber 182. The plurality of electrodes 52 are connected to the wiring pattern group 57, respectively. The electrode pattern 185 is arranged on the upper portion of the electrically conductive rubber 182 and is concurrently used by the touch-sensitive sheet member 180 and the display unit 29. The base panel 186 is provided on the upper portion of the electrode pattern 185. The driving voltage is applied to each pixel of the liquid crystal material 29f via the wiring pattern group 58 of the bottom side of the above-mentioned intermediate layer film 29c and the electrode pattern 185.

The above-mentioned wiring pattern groups 57, 58 together with the electrode pattern 185 of the display unit 29 are connected to the driving power supply 55A, not shown, which applies the DC driving voltage to the electrode 52 and the electrode pattern 185 which is concurrently used by the liquid crystal display device, for every individual operation key. At that time, the DC driving voltage may be applied with the voltage-level thereof being changed. In this manner, the display device 629 that is applicable to the input device 800 is configured. With respect to the other members and functions, the members similar to those of the display device 129 are used and the functions similar to those of the display device 129 are included, so that the explanation thereof will be omitted.

The display device 629 thus configured having the touch-sensitive sheet member 180 on the liquid crystal display device may present the input operation accompanied with the concave and convex feeling when the icon images or the like displayed on the display unit 29 are touched with the operator's finger and the finger slides on the upper portion of the electrically conductive rubber 182 under the display screen if the wiring pattern group 58 is provided without concurrently using the wiring pattern group 57, even if the display surface is observed to be a flat shape. Thus, it becomes possible to provide the input device 800 with the programmable touch-sensitive input sheet for icon touch.

Embodiment 9

Figure 47:
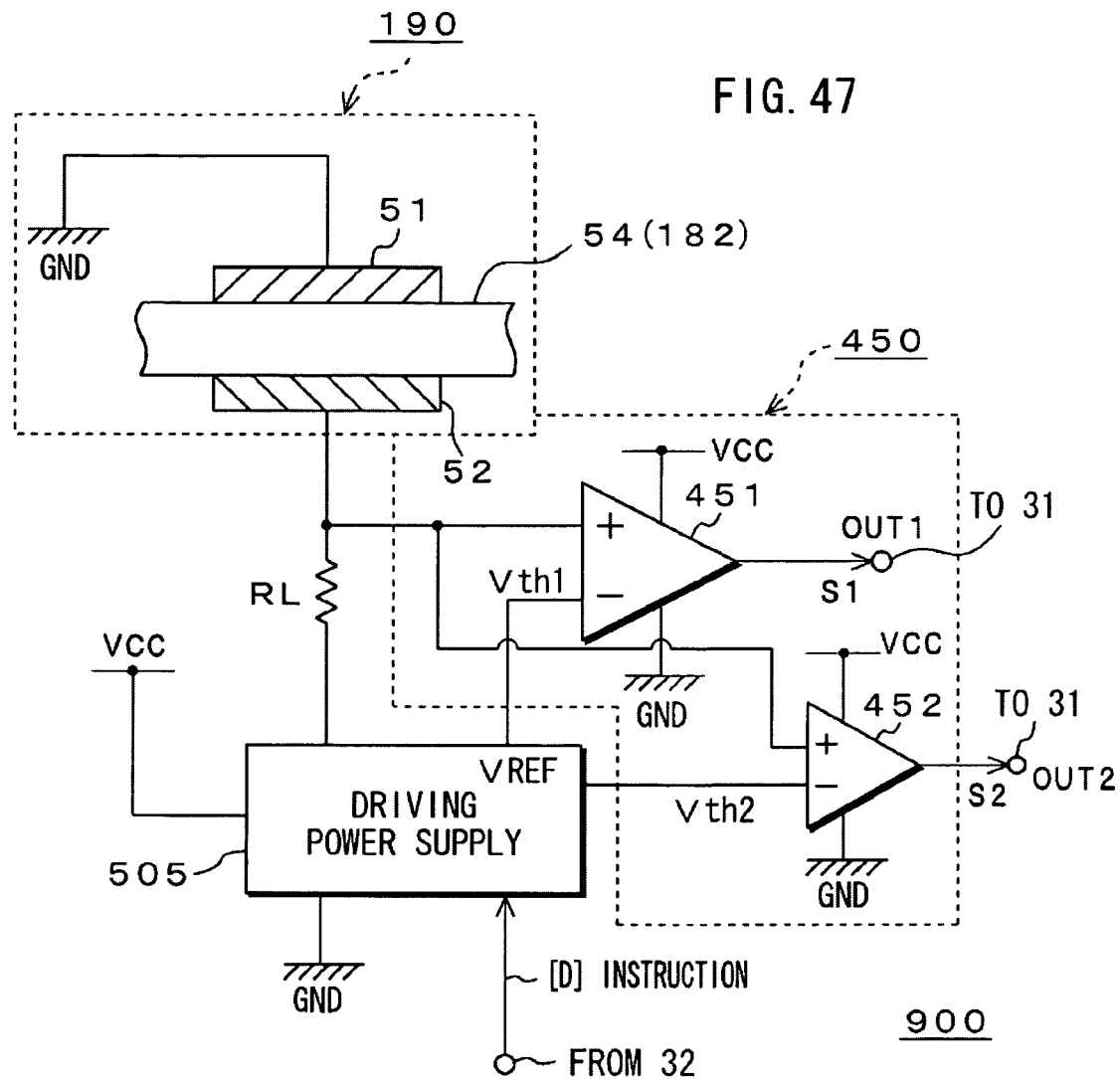
FIG. 47 is a block diagram of an input device 900 as a ninth embodiment for showing a configuration thereof.

FIG. 47 shows a configuration of an input device 900 as a ninth embodiment. In this embodiment, the slide position and the pressing force of the operator's finger 30a or the like are detected by reading a pressing force change of the element muscle portion 54 (electrically conductive rubber 182) in the display device 129, which is different from a case where, as explained in the eighth embodiment, the input detection unit 45 is provided between the film portion 5 of the highest layer and the display device 129 with touch-sensitive variable sheet function.

The input device 900 shown in FIG. 47 includes a touch-sensitive variable sheet unit 190, a load resistance RL, a comparison circuit 450 and a driving power supply 505 in a constitution example in which a portion corresponding to one operation key element is extracted.

The touch-sensitive variable sheet unit 190 has the electrodes 51, 52 and the element muscle portion 54 (it is also allowed to employ the electrically conductive rubber 182). Also in this embodiment, the element muscle portion 54 corresponding to the operation key element are sandwiched between the electrodes 51 and 52. The electrode 51 is connected, for example, to a ground line GND and the electrode 52 is connected to the driving power supply 505 through the load resistance RL.

A connection point of the load resistance RL and the electrode 52 is connected with the comparison circuit 450 also constituting the detection unit, which detects the pressing force of the operation body by reading the pressing force change (displacement) of the element muscle portion 54. In this embodiment, a voltage drop (hereinafter, referred to as output voltage V0) corresponding to the pressing force F which is given to the element muscle portion 54 occurs in the load resistance RL. For the comparison circuit 450, two comparators 451, 452 are used. The respective comparators 451, 452 are connected to a power supply line VCC and the ground line GND. The connection point of the load resistance RL and the electrode 52 is connected to plus (+) terminals of the respective comparators 451, 452.

Minus (−) terminals of the comparators 451, 452 of each stage of the comparison circuit 450 are connected to the driving power supply 505, and a reference voltage VREF is applied to the minus (−) terminals of the comparators 451, 452. The comparator 451 for position detection is supplied with a threshold voltage Vth1 for position detection as the voltage VREF and the comparator 452 for pressing force judgment threshold is supplied with a threshold voltage Vth2 for pressing force judgment. The driving power supply 505 is connected to the power supply line VCC and the ground line GND. The threshold voltages Vth1, Vth2 and the driving voltage Vo are set by the instruction data D from the CPU 32. The comparator 451 compares the threshold voltage Vth1 with the output voltage V0 and outputs a position detection signal S1 to the CPU 32 when the output voltage V0 which exceeds the threshold voltage Vth1 is obtained. The comparator 452 compares the threshold voltage Vth2 with the output voltage V0 and outputs a press detection signal S2 to the CPU 32 when the output voltage V0 which exceeds the threshold voltage Vth2 is obtained.

Figure 48:
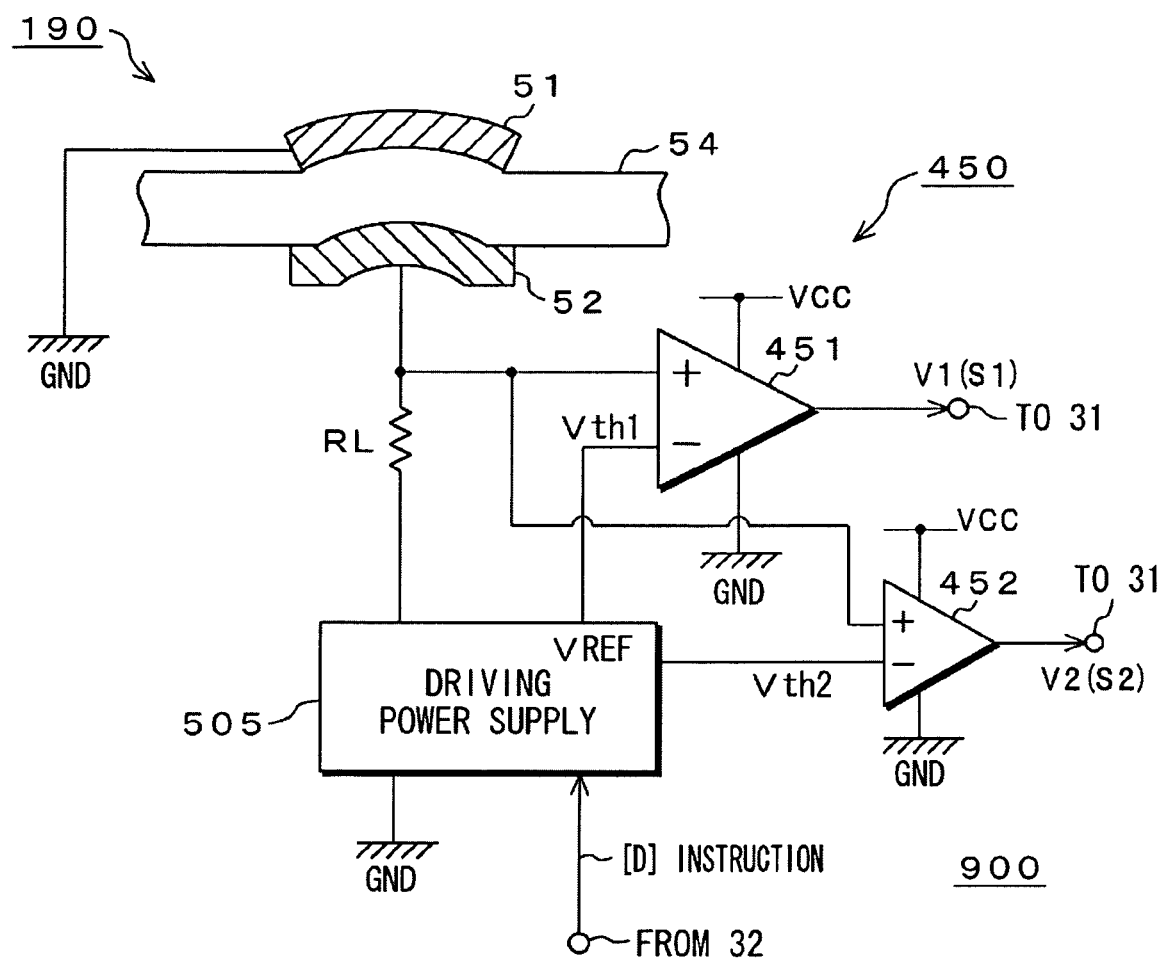
FIG. 48 is a block diagram of the input device 900 explaining an operation example (No. 1) of the input device 900 relating to one operation key element.
Figure 49:
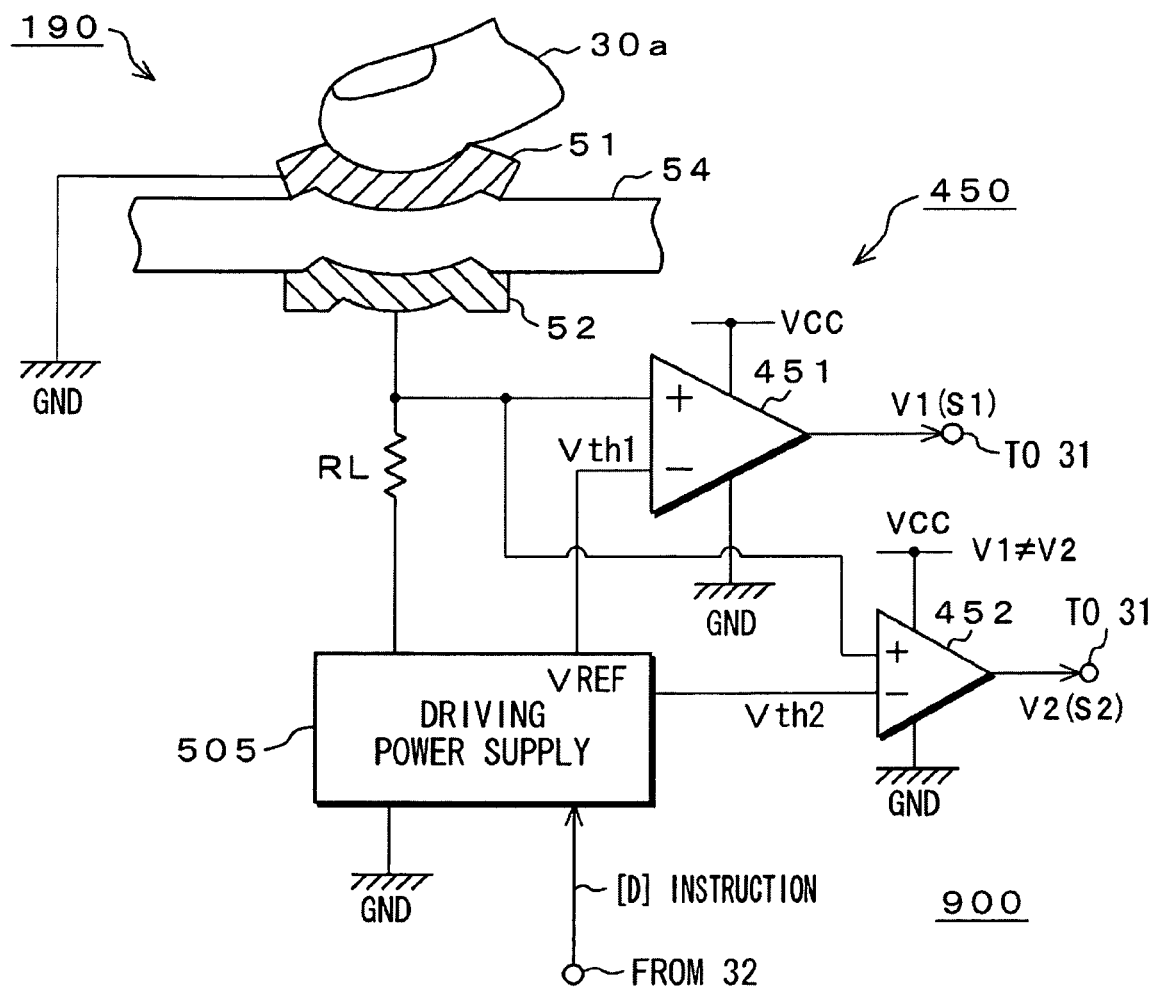
FIG. 49 is a block diagram of the input device 900 explaining an operation example (No. 2) of the input device 900 relating to one operation key element.
Figure 50:
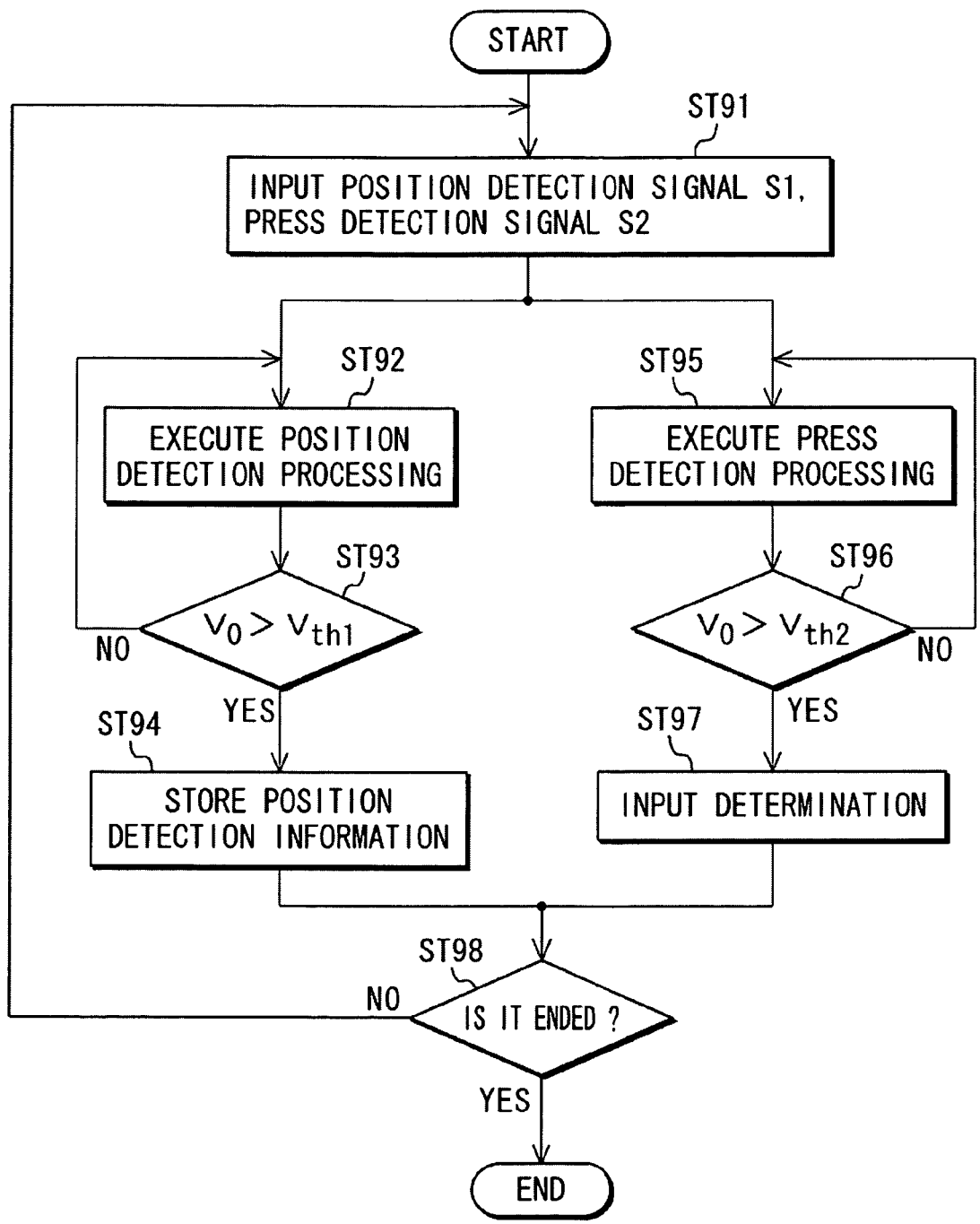
FIG. 50 is a flowchart showing an input processing example of the input device 900.

The following will describe an input processing example of the input device 900. FIGS. 48 and 49 show an operation example (Nos. 1, 2) of one operation key element. FIG. 50 shows the input processing example thereof.

In this embodiment, the driving power supply 505 applies the driving voltage Vo of the voltage-level between the electrode 51 and the electrode 52 based on the instruction data D of the shape presentation which is inputted from the CPU 32. There is cited a case in which the threshold voltage Vth1 is set in the comparator 451 and the threshold voltage Vth2 is set in the comparator 452.

By setting these as the input condition, at step ST91 of the flowchart shown in FIG. 50, the position detection signal S1 and the press detection signal S2 are inputted to an A/D driver 31. According to the touch-sensitive variable sheet unit 190 shown in FIG. 48, the shape of the element muscle portion 54 is changed to a convex shape at a time of the shape presentation. This shape change is based on a fact that the element muscle portion 54 changes the shape thereof to the convex shape by inputting the instruction data D of the shape presentation to the driving power supply 50S from the CPU 32 and by applying the driving voltage Vo of the voltage-level based on the instruction data D to the electrode 51 and the electrode 52. In this state, the comparator 451 does not detect the output voltage V0 exceeding the threshold voltage Vth1, so that the position detection signal S1 is a low level=0. Also, the comparator 452 also does not detect the output voltage V0 exceeding the threshold voltage Vth2, so that the press detection signal S2 is also a low level=0.

Then, the position detection in step ST92 and the press detection in step ST95 are processed in parallel. According to the touch-sensitive variable sheet unit 190 shown in FIG. 49, the shape of the element muscle portion 54 is changed to the concave shape at a time of the shape presentation by pressing the element muscle portion 54 with the operator's finger 30a or the like. The operator's finger 30a or the like presses the element muscle portion 54, so that the electric current "i" flowing in the load resistance RL changes. For example, the electric current decreases or increases as compared with the electric current "i" of a state in which there is no press on the element muscle portion 54. The change of this electric current "i" appears as the voltage drop between both terminals of the load resistance RL.

According to the position detection processing in the step ST92, the slide position of the operator's finger 30a or the like is detected by monitoring the output voltage V0 of the connection point of the load resistance RL and electrode 52. In this embodiment, at step ST93, the comparator 451 compares the threshold voltage Vth1 with the output voltage V0 and monitors the output voltage V0 exceeding threshold voltage Vth1. At this time, when the comparator 451 detects output voltage V0 exceeding the threshold voltage Vth1, for example, the position detection signal S1 of a high level=1 (it is also allowed to be the position detection voltage V1) is outputted to the A/D driver 31. The A/D DRIVER 31 outputs the position detection information D1, in which the position detection signal S1 is analogue-digital-converted, to the CPU 32. When the output voltage V0 exceeding such a threshold voltage Vth1 is detected, the process shifts to step ST94 where the position detection information D1 is stored in the memory unit 35 as shown in FIG. 20.

According to the press detection processing which executes in the step ST95 in parallel with the above-mentioned processing, the pressing force of the operator's finger 30a or the like is detected by monitoring the output voltage V0 of the connection point of the load resistance RL and the electrode 52. In this embodiment, at step ST96, the comparator 452 compares the threshold voltage Vth2 with the output voltage V0 and monitors the output voltage V0 exceeding the threshold voltage Vth2. At this time, when there is a further strong press on the element muscle portion 54, the comparator 452 detects the output voltage V0 exceeding the threshold voltage Vth2, so that, for example, the press detection signal S2 of a high level=1 (it is also allowed to be the position detection voltage V2) is outputted to the A/D DRIVER 31. The position detection voltage V1 and the press detection voltage V2 are the different in the voltage-level (V1≠V2). The A/D driver 31 outputs the position detection information D2, in which the position detection signal S2 is analogue-digital-converted, to the CPU 32.

In the above-mentioned embodiment, when the output voltage V0 exceeding the threshold voltage Vth2 is detected, the process shifts to step ST97 where the input is determined by making the press detection information D2 as a trigger. Thus, in the CPU 32, it becomes possible to detect the slide position and pressing force F of the operator's finger 30a or the like from the position detection information D1 and the press detection information D2.

In this manner, the input device 900 as the ninth embodiment is provided with the touch-sensitive variable sheet unit 190, the load resistance RL and the comparison circuit 450 with respect to the one operation key element, and the output voltage V0 of the connection point of the electrode 52 and the load resistance RL of the touch-sensitive variable sheet unit 190 is monitored by the comparison circuit 450. When, for example, the twenty operation keys exist, it is enough if the twenty circuits each for monitoring the above-mentioned output voltage V0 are provided.

Consequently, it is possible to build the function of the input detection unit 45 by the element muscle portion 54 (electrically conductive rubber 182) and the comparison circuit 450 of the touch-sensitive variable sheet unit 190, thereby enabling to be omitted the resistive touch panel or the capacitive touch panel which constitutes the input detection unit 45 in the fifth to eighth embodiments. The comparison circuit 450 is not necessary to be arranged on the display screen and can be arranged on a circuit board apart from the display screen, so that it becomes possible to improve the design restriction of the input detection unit 45.

Moreover, it is possible to execute the convex and concave shape representation through the sense of touch on the display screen as compared with the past system. Further, it is possible to change the representation place thereof depending on the state of the application of the operation key screen, so that the user can obtain the sense of touch information (simple concavity and convexity or skin touch of cloth) which is obtained by touching the key board of the past or the material having the convex and concave shape of the existent world from the operation plane. Further, it becomes possible to improve the operability incredibly.

Embodiment 10

Figure 51A:
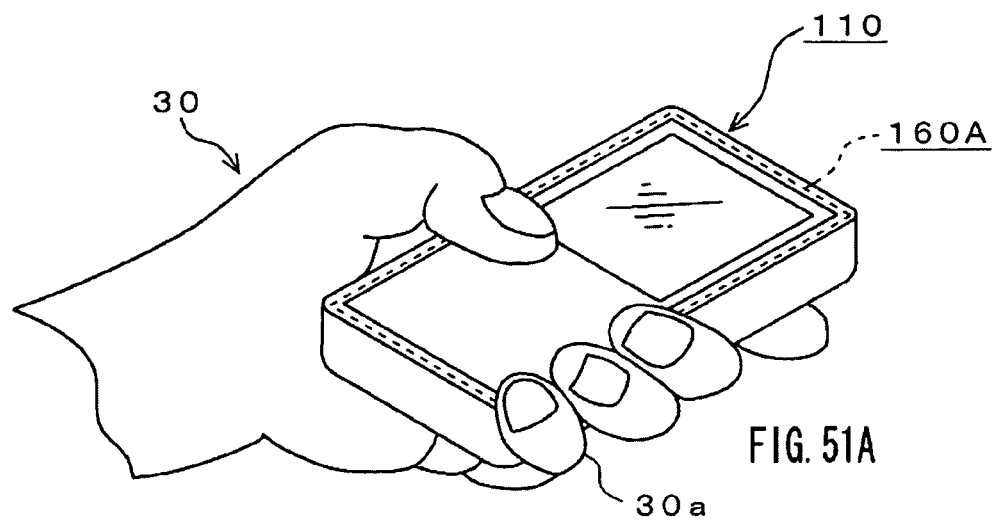
FIGS. 51A to 51C are perspective and cross-sectional views of a mobile phone 110 as a tenth embodiment for showing a configuration thereof.
Figure 51B:
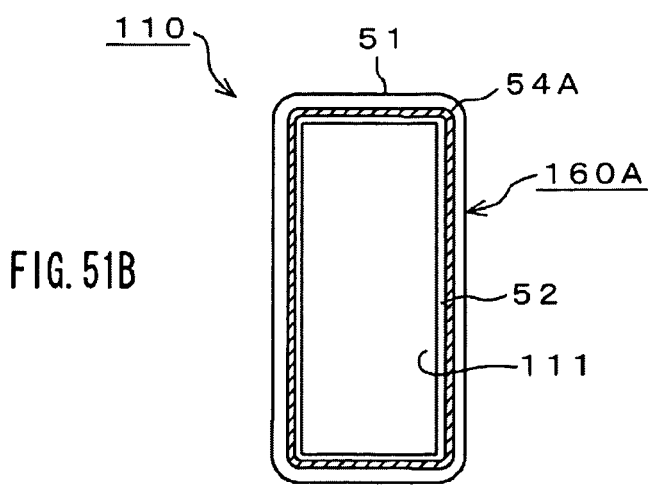
Figure 51C:
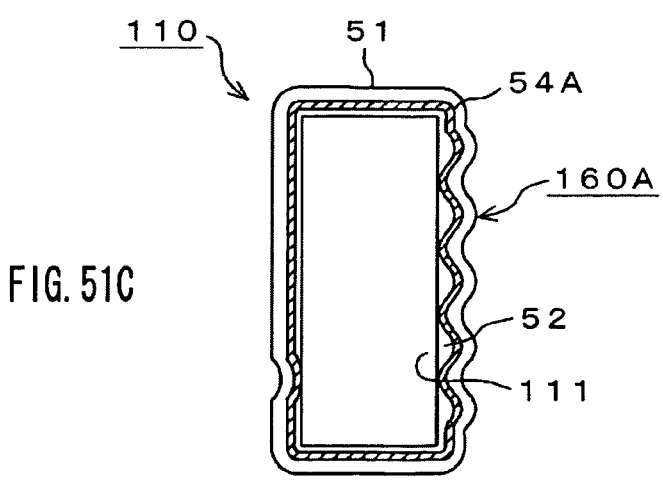

FIGS. 51A to 51C show a configuration of a mobile phone 110 as a tenth embodiment.

The mobile phone 110 shown in FIG. 51A is provided with a nonskid sheet 160A to which the touch-sensitive sheet member 160 explained in the sixth embodiment is applied. The nonskid sheet 160A is provided so as to surround the side surface region that the operator grasps in the mobile phone 110, for example.

The mobile phone 110 shown in FIG. 51B has a housing 111, and for example, the electrode 52, the muscular sheet portion 54A and the electrode 51 are layered so as to surround this housing 111. With reference to the driving example shown in FIG. 35, this is a case (OFF) in which there is no the shape presentation instruction for executing the shape presentation from the high ranking CPU 32 to the driving power supply 55A. In this case, the change of the convex and concave shape is not seen in a periphery of the side surface of the housing 111. There is no difference from the state of a periphery of the side surface of the mobile phone of the past system.

The mobile phone 110 shown in FIG. 51C indicates a case (ON) where there is the shape presentation instruction for executing the shape presentation from the high ranking CPU 32 to the driving power supply 55A. In this case, the convex and concave shape appears in the periphery of the side surface of housing 111. In this case, the side surface portion of the housing of the mobile phone 110 on which the operator grasps changes to the waveform-like or the convex and concave shapes. With respect to the control for changing only the grasping portion to the convex and concave shape, it may employ the control method explained in the ninth embodiment. Thus, a grip feeling come to be given as compared with the state of the periphery of the side surface of the mobile phone of the past system.

Embodiment 11

Figure 52A:
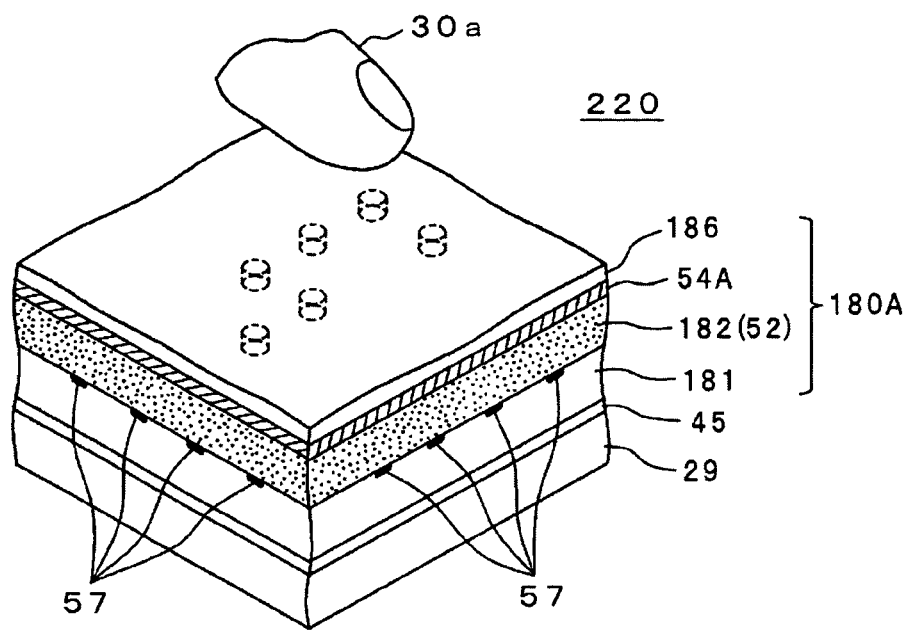
FIGS. 52A to 52C are perspective and cross-sectional views of a variable sheet device 220 for braille as an eleventh embodiment for showing a configuration thereof.
Figure 52B:
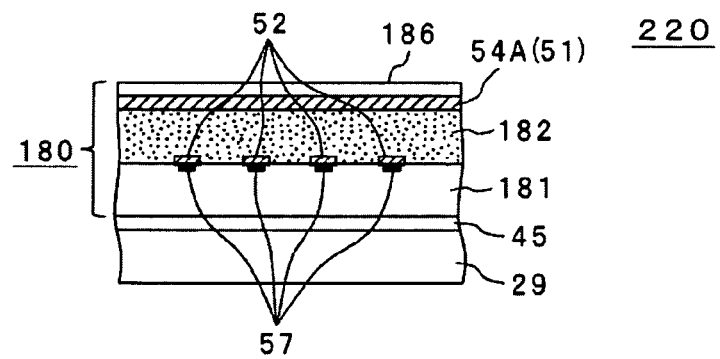
Figure 52C:
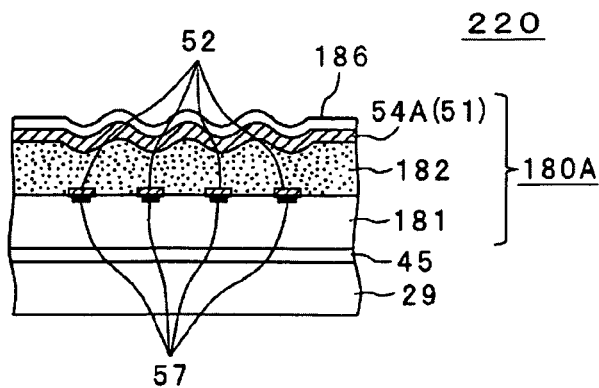

FIGS. 52A to 52C show a configuration of a variable sheet device 220 for braille as an eleventh embodiment. The variable sheet device 220 for braille shown in FIG. 52A is provided with a variable sheet 180A for braille to which the touch-sensitive sheet member 180 explained in the eighth embodiment is applied. The variable sheet 180A for braille is provided, for example, on the operation screen which the operator touches in the variable sheet device 220 for braille. In FIG. 52A, cylinder shapes shown with the broken lines form braille elements, and are portions in which the muscular sheet portion 54A raise in the convex shape by reflecting the shape of each of the circular shaped electrodes 51 which is not shown.

The variable sheet device 220 for braille shown in FIG. 52B includes the display unit 29 and layered input detection unit 45 and variable sheet 180A for braille in this order on the display unit 29. For example, the variable sheet 180A for braille includes the base film 181 having the wiring pattern group 57, the muscular sheet portion 54A bonded on this base film 181, the electrode 51 provided on the rear surface side of this muscular sheet portion 54A and the base panel 186 on the electrode 51, which are layered. It should be noted that the display unit 29 and the input detection unit 45 may be omitted.

Also in this embodiment, with reference to the driving example shown in FIG. 35, the shape presentation instruction for executing the shape presentation of the braille element is supplied to the driving power supply 55A from the high rank CPU 32. This is a case (OFF) in which there is no the shape presentation instruction. In this case, the change of the convex and concave shape is not seen on the operation screen which the operator touches by his or her finger or the like.

The braille variable sheet device 220 shown in FIG. 52C indicates a case (ON) in which there is the shape presentation instruction from the high rank CPU 32 to the driving power supply 55A. In this case, the convex and concave shape appears on the operation screen which the operator touches. In this case, a side surface portion of a housing of the variable sheet device 220 for braille which the operator touches changes to the cylindrical protrusive (convex) shape. With respect to the braille appearance control for changing the convex portion constituting the braille block to the convex shape, it may employ the control method explained in the ninth embodiment. Thus, it becomes possible to provide the braille-talkable variable sheet device 220 for braille in which the braille block changes and appears based on the control information as compared with a fixation type braille block of the past system.

Although, in the above-mentioned first to eleventh embodiments, the touch-sensitive sheet members having the individual function respectively have been described, they are not limited to those; any combination of the touch-sensitive sheet members having the individual function respectively may be used. For example, there may be used a combination of the first touch-sensitive sheet member in which the sense-of-touch-representing unit forms the apertures p1 to p25 for presenting a sense of touch each having a predetermined size aperture diameter and being perforated at a predetermined position in the base member 1 and the medium-supplying unit has the air-circulation unit 3 for sending air to the apertures p1 to p25 or for taking in air from the aperture p1 to p25; the second touch-sensitive sheet member in which the sense-of-touch-representing unit forms bag portions q1 to q25 for presenting a sense of touch each having a predetermined size and being arranged at a predetermined position of the base member 11 and the medium-supplying unit has the ventilation unit for sending air to the bag portions q1 to q25; and the third touch-sensitive sheet member in which the sense-of-touch-representing unit includes the electric conductive element bag portions E1 to E25, the electrically conductive rubber 82 or the like for presenting a sense of touch each having a predetermined sized electrodes 51, 52 and being arranged at a predetermined position of the insulated and transparent member and the medium-supplying unit has the driving power supply 55A for supplying the driving voltage Vo to the electrodes 51, 52 of the element bag portions E1 to E25, the electrically conductive rubber 182 or the like.

The present application is preferably applied to an electronic apparatus of a digital camera, a video camera, a mobile phone, a mobile terminal device, a desk-top type PC, a note type PC, a braille block device, an automatic teller machine or the like including a touch-sensitive input function for presenting a sense of touch when touching an icon screen with the operator's finger or the like.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input device that inputs information by any one of a slide operation and a press operation of an operation body, the input device comprising:

a display unit having an operation surface;

a detection unit that detects any one of a slide position and a press position of the operation body, the detection unit being provided at the display unit; and a transparent touch-sensitive sheet member on which any one of slide operation along the operation surface of the display unit and the press operation to the operation surface of the display unit is executed, the touch-sensitive sheet member covering at least a portion of the detection unit, wherein the touch-sensitive sheet member includes:

a body having a predetermined hardness and a sheet shape;

a sense-of-touch-representing unit that represents a sense of touch, the sense-of-touch-representing unit having a predetermined size and being arranged at positions of the body or at a predetermined position of the body; and a medium-supplying unit that supplies a medium to the sense-of-touch-representing unit, wherein the sense-of-touch-representing unit contains an aperture having an aperture diameter of a predetermined size, the aperture being perforated at a predetermined position of the body and being used for representing the sense of touch, wherein the medium-supplying unit includes an air-circulating unit that sends air to the aperture or takes in air from the aperture, wherein the air-circulating unit contains a programmable function that sends the air to the apertures perforated in the body individually or for every group or takes in the air from the apertures individually, wherein the body includes a flow channel panel that introduces the air to the apertures perforated at the body, wherein the air-circulation unit includes an air pressure adjustor using a piezoelectric device, wherein the air pressure adjustor is connected to the flow channel panel, and wherein the air pressure adjustor sends the air to the apertures of the body individually or for every group through the flow channel panel or takes in the air from the apertures individually or for every group through the flow channel panel.

2. An input device that inputs info illation by any one of a slide operation and a press operation of an operation body, the input device comprising:

a display unit having an operation surface;

a detection unit that detects any one of a slide position and a press position of the operation body, the detection unit being provided at the display unit; and a transparent touch-sensitive sheet member on which any one of slide operation along the operation surface of the display unit and the press operation to the operation surface of the display unit is executed, the touch-sensitive sheet member covering at least a portion of the detection unit, wherein the touch-sensitive sheet member includes:

a body having a predetermined hardness and a sheet shape;

a sense-of-touch-representing unit that represents a sense of touch, the sense-of-touch-representing unit having a predetermined size and being arranged at positions of the body or at a predetermined position of the body; and a medium-supplying unit that supplies a medium to the sense-of-touch-representing unit, wherein the sense-of-touch-representing unit includes a bag portion that represents the sense of touch, the bag portion having a predetermined size and being arranged at a predetermined position of the body, wherein the medium-supplying unit includes a ventilation unit that ventilates air to the bag portion, wherein the ventilation unit contains a programmable function that sends the air to a plurality of bag portions arranged at the body individually or for every group, wherein the body includes a flow channel panel that introduces the air to the plurality of bag portions arranged at the body, wherein the ventilation unit includes an air pressure generator using a piezoelectric device, wherein the air pressure generator is connected to the flow channel panel, and wherein the air pressure generator sends compressed air to the plurality of bag portions arranged at the body individually or for every group through the flow channel panel.

3. An input device that inputs information by any one of a slide operation and a press operation of an operation body, the input device comprising:

a display unit having an operation surface;

a detection unit that detects any one of a slide position and a press position of the operation body, the detection unit being provided at the display unit; and a transparent touch-sensitive sheet member on which any one of slide operation along the operation surface of the display unit and the press operation to the operation surface of the display unit is executed, the touch-sensitive sheet member covering at least a portion of the detection unit, wherein the touch-sensitive sheet member includes:

a body having a predetermined hardness and a sheet shape;

a sense-of-touch-representing unit that represents a sense of touch, the sense-of-touch-representing unit having a predetermined size and being arranged at positions of the body or at a predetermined position of the body; and a medium-supplying unit that supplies a medium to the sense-of-touch-representing unit, the input device includes a combination of:

a first touch-sensitive sheet member in which the sense-of-touch-representing unit contains an aperture having an aperture diameter of a predetermined size, the aperture being perforated at a predetermined position of the body and being used for representing the sense of touch, and the medium-supplying unit includes an air-circulating unit that sends air to the aperture or takes in air from the aperture, a second touch-sensitive sheet member in which the sense-of-touch-representing unit includes a bag portion that represents the sense of touch, the bag portion having a predetermined size and being arranged at a predetermined position of the body, and the medium-supplying unit includes a ventilation unit that ventilates air to the bag portion, and a third touch-sensitive sheet member in which the sense-of-touch-representing unit includes conductive polymer material that represents the sense of touch, the polymer material having predetermined sized electrodes and being arranged at a predetermined position of the body, and the medium-supplying unit includes a power supply unit that applies a driving voltage to the electrodes of the polymer material.

* * * * *

UNITED STATES PATENT AND TRADEMARK OFFICE
CERTIFICATE OF CORRECTION

PATENT NO. : 8,547,341 B2  Page 1 of 1
APPLICATION NO. : 12/340063
DATED : October 1, 2013
INVENTOR(S) : Takashima et al.

It is certified that error appears in the above-identified patent and that said Letters Patent is hereby corrected as shown below:

ON THE TITLE PAGE:

Please replace

"Sony Corporation, Tokyo (JP)" with

--Sony Corporation, Tokyo (JP) and Sony Mobile Communications Japan, Inc., Tokyo (JP)--.

Signed and Sealed this
Twenty-fifth Day of November, 2014

Michelle K. Lee
*Deputy Director of the United States Patent and Trademark Office*